United States Patent [19]

Oono et al.

[11] Patent Number: 5,553,052
[45] Date of Patent: Sep. 3, 1996

[54] INCLINATION OF AN OBJECTIVE LENS IN AN OPTICAL INFORMATION SYSTEM

[75] Inventors: Masahiro Oono; Hisashi Konno; Toshiyuki Kase; Katsuki Hayashi; Hiroshi Nishikawa, all of Tokyo, Japan

[73] Assignee: Asahi Kogaku Kogyo Kabushiki Kaisha, Tokyo, Japan

[21] Appl. No.: 204,655

[22] Filed: Aug. 2, 1994

[30] Foreign Application Priority Data

| Mar. 2, 1993 | [JP] | Japan | 5-066009 |
| Mar. 2, 1993 | [JP] | Japan | 5-066010 |
| Mar. 2, 1993 | [JP] | Japan | 5-066011 |
| Mar. 2, 1993 | [JP] | Japan | 5-066012 |
| Mar. 19, 1993 | [JP] | Japan | 5-085637 |
| Apr. 14, 1993 | [JP] | Japan | 5-111103 |

[51] Int. Cl.⁶ .............................. G11B 7/00; G02B 7/00
[52] U.S. Cl. ................... 369/112; 369/44.15; 369/219; 359/813
[58] Field of Search .......................... 369/44.16, 44.14, 369/44.15, 112, 219, 215; 359/811, 813, 814, 819, 823

[56] References Cited

U.S. PATENT DOCUMENTS

| 3,791,739 | 2/1974 | Kawasaki | 356/358 |
| 4,948,243 | 8/1990 | Saito | 359/881 |
| 5,056,891 | 10/1991 | Masunaga | 359/813 |
| 5,068,844 | 11/1991 | Tanaka | 369/44.16 |
| 5,157,459 | 10/1992 | Oono et al. | 356/359 |
| 5,191,483 | 3/1993 | Takizawa et al. | 359/819 |
| 5,222,056 | 6/1993 | Tanaka | 369/44.22 |
| 5,257,145 | 10/1993 | Kanazawa et al. | 359/819 |
| 5,367,511 | 11/1994 | Aldenhouen et al. | 369/44.14 |
| 5,414,563 | 5/1995 | Tanaka | 369/44.15 |
| 5,414,680 | 5/1995 | Ikegame | 359/813 |
| 5,418,772 | 5/1995 | Tanaka | 369/219 |

FOREIGN PATENT DOCUMENTS

| 3119524 | 5/1991 | Japan . |
| 4-46370 | 7/1992 | Japan . |

*Primary Examiner*—Georgia Y. Epps
*Assistant Examiner*—Kim-Kwok Chu
*Attorney, Agent, or Firm*—Greenblum & Bernstein P.L.C.

[57] ABSTRACT

A detecting apparatus which detects an inclination of an objective lens relative to a reference surface is provided. The objective lens is part of an optical data recording and reproducing apparatus in which data is optically recorded on and reproduced from a recording medium which is placed parallel to the reference surface. The apparatus includes a transparent parallel plate which is opposite the objective lens, parallel to the reference surface, and made of a material that is substantially optically equivalent to a transparent material of the recording medium. The apparatus further includes a reflecting mechanism for reflecting coherent light which has passed through the objective lens and the transparent parallel plate back towards the transparent parallel plate and the objective lens, and a beam splitting mechanism for splitting the coherent light into a first beam and a second beam. The apparatus further includes a wavefront rotating mechanism for rotating the first beam and the second beam about an optical axis in a manner such that the first beam and the second beam are rotated through 180 degrees with respect to one another, and a mechanism for superposing the first beam and the second beam to produce an optical interference.

50 Claims, 32 Drawing Sheets

Wave Aberration (PV)

Wave Aberration (rms)

INCLINATION OF AN OBJECTIVE LENS IN AN OPTICAL INFORMATION SYSTEM

BACKGROUND OF THE INVENTION

1. Field of the Invention

The present invention relates to an apparatus and method for adjusting an optical system.

2. Description of Related Art

In a conventional optical data recording and reproducing apparatus in which a laser beam is used to record data onto a recording medium, such as a photo magnetic disc (magneto-optical disc), and to read and reproduce the recorded data from the recording medium, it is necessary to converge the laser beam onto the recording medium so as to form a beam spot. The beam spot is made as small as possible to thereby correctly write data onto and read data from the recording medium. However, if the optical axis of the objective lens is not normal to the recording medium, coma occurs. The coma makes it impossible to correctly converge the laser beam onto the recording medium to form a small beam spot, resulting in a restriction of the amplitude of reading signals or an increase of jitters, and thus leading to a failure to correctly reproduce the recorded data.

To this end, it is necessary to precisely adjust the posture of the objective lens so that the optical axis thereof is normal to the recording medium, in the course of the manufacturing process of the optical data recording and reproducing apparatus. The allowable inclination of the optical axis of the objective lens with respect to the recording medium decreases as the numerical aperture (NA) of the objective lens increases. The objective lens used in recent optical data recording and reproducing apparatuses has a large numerical aperture to enhance the data recording density.

The U.S. Pat. No. 5,157,459 has disclosed an inclination adjusting device of an objective lens for adjusting an inclination of the objective lens relative to a recording medium. The adjusting device can be attached to the optical data recording and reproducing apparatus. The device is positioned opposite to the objective lens of the data recording and reproducing apparatus. In other words, adjustment can be performed with a master glass, which corresponds to an optical disc (i.e., the recording medium), positioned opposite to the objective lens. This inclination adjusting device takes in coherent light that is emitted from a laser light source in the optical data recording and reproducing apparatus, and enables the adjustment of the objective lens inclination relative to the master glass in accordance with the interference fringes of the coherent light.

The device, however, cannot adjust the inclination of the objective lens while monitoring the inclination from the recording medium side because a comatic aberration detecting system having a plurality of optical elements is positioned opposite and close to the objective lens. In other words, since there is little space between the comatic aberration detecting system and the objective lens, the comatic aberration detecting system prevents the device from being capable of adjusting the inclination of the objective lens while monitoring the inclination of the objective lens. Due to this inconvenience in prior art, after the inclination of the objective lens is detected in accordance with the interference fringes, the inclination adjusting device has to be removed from the optical data recording and reproducing apparatus to actually adjust the objective lens. This means that it was impossible to adjust the inclination of the objective lens while monitoring the inclination of the objective lens, i.e., whenever an inclination adjustment was carried out, the adjusting device is first attached to the optical data recording and reproducing apparatus, and then removed after the inclination data is obtained to carry out the actual adjustment of the inclination of the objective lens.

The optical system in the optical data recording and reproducing apparatus is usually comprised of various optical elements. It is necessary for the optical system to have an extremely high performance with respect to the diffraction limit (resolution limit). Accordingly, the optical elements which constitute the optical system must be extremely precisely machined or produced. For instance, a single aspherical objective lens, which is provided on opposite sides thereof with aspherical lens surfaces and which has a numerical aperture NA of about 0.55, the wavefront aberration (coma) of the objective lens caused by the deviation of the optical system, etc., would amount to around 0.9 $\lambda$ ($\lambda$=wavelength of light) which is represented by the PV value (difference between the maximum value and the minimum value), assuming that the parallel or transverse deviation (decentering) of one of the aspherical lens surfaces is 10 μm.

To prevent such a large wavefront aberration from occurring, not only must high precision machines be employed to produce or machine the optical elements, but the optical system also must be very carefully assembled. This increases the manufacturing cost of the optical system in the optical data recording and reproducing apparatus. Moreover, the assembling and adjustment of the optical system require a long time and a highly skilled artisan.

SUMMARY OF THE INVENTION

The primary object of the present invention is to provide a detecting apparatus which detects an inclination of an objective lens to adjust the same. In particular, the present invention is directed to a detecting apparatus in which an inclination adjustment of the objective lens can be easily performed from a position opposite the objective lens.

To achieve the object mentioned above, according to the present invention, there is provided a detecting apparatus which detects an inclination of an objective lens relative to a reference surface, the objective lens being part of an optical data recording and reproducing apparatus in which data is optically recorded on and reproduced from a recording medium which is placed parallel to the reference surface. The apparatus includes a transparent parallel plate which is opposite the objective lens, parallel to the reference surface, and made of a material that is substantially optically equivalent to a transparent material of the recording medium; a reflecting mechanism for reflecting coherent light which has passed through the objective lens and the transparent parallel plate back towards the transparent parallel plate and the objective lens; a beam splitting mechanism for splitting the coherent light into a first beam and a second beam; a wavefront rotating mechanism for rotating the first beam and the second beam about an optical axis in a manner such that the first beam and the second beam are rotated through 180 degrees with respect to one another; and, a mechanism for superposing the first beam and the second beam to produce an optical interference.

Another object of the present invention is to provide a lens supporting apparatus which makes it possible to reduce the number of components of an optical pickup to thereby reduce the weight of the same and enable a fast tracking operation (i.e., high-speed tracking).

To achieve the object mentioned above, there is provided a lens supporting apparatus which supports an objective lens of an optical data recording and reproducing apparatus, in which data is optically recorded on and reproduced from a recording medium placed parallel to a reference surface. The apparatus includes an oblique annular lens supporting surface which is inclined relative to a peripheral edge of the objective lens. The annular lens supporting surface supports the objective lens in a manner such that the inclination of the objective lens can be adjusted with respect to the reference surface. The apparatus further includes a mechanism for moving the lens supporting surface to bring a peripheral edge of the objective lens into contact with an external object to thereby move the objective lens along the lens supporting surface in order to vary an inclination of the objective lens relative to the reference surface.

Still another object of the present invention is to provide a lens adjusting method for adjusting the inclination of a lens with respect to a lens holder.

To achieve the object mentioned above, there is provided an inclination adjusting method for adjusting an inclination, relative to a reference surface, of an objective lens of an optical data recording and reproducing apparatus in which data is optically recorded on and reproduced from a recording medium which is positioned parallel to the reference surface. The inclination adjusting method includes the steps of positioning a lens supporting member which supports the objective lens at a predetermined position; placing the objective lens on the lens supporting member; adjusting the inclination of the objective lens while observing interference fringes to reduce a coma, the interference fringes being caused by an inclination of the objective lens relative to a transparent plate, and the transparent plate being positioned parallel to the reference surface and made of a material that is substantially optically equivalent to the recording medium; and, fixing the objective lens to the lens supporting member.

Yet another object of the present invention is to provide a lens positioning apparatus, a lens adjusting apparatus and a method for smoothly adjusting the inclination of a lens supported on a lens holder.

To achieve the object mentioned above, a positioning apparatus, which positions a lens relative to a lens supporting member, is provided. The position apparatus includes a sucking tube which holds the lens by a vacuum force, and a guide portion which has a circular hole. An inner surface of the circular hole guides the lens in a radial direction of the sucking tube so as to position the lens in the radial direction when the sucking tube is inserted into the circular hole. The circular hole is formed in a manner such that a diameter of the circular hole is larger than a diameter of the sucking tube and substantially corresponds to a diameter of the lens.

According to still another aspect of the present invention, an inclination adjusting apparatus is provided with a body, and an oblique annular lens supporting surface which is inclined relative to a peripheral edge of the objective lens and which supports the objective lens in a manner such that the objective lens can be inclined with respect to the lens supporting surface. The inclination adjusting apparatus includes a rotational portion which is rotatably supported by the body in a manner such that a rotational center of the rotational portion is positioned in the vicinity of a rotational center of the lens when the lens is inclined with respect to the lens supporting surface. An adjusting pawl, which is supported by the rotational portion for engaging with a peripheral edge of the lens, is also provided.

According to yet another aspect of the present invention, there is provided an inclination adjusting method for adjusting an inclination of a lens which is supported on ah oblique annular lens supporting surface inclined relative to a peripheral edge of the lens. The lens is displaced by an inclination adjusting member on the oblique annular lens supporting surface thereby inclining the lens at a predetermined angle. The inclination adjusting method includes a first step of determining an angle at which the lens is to be inclined; a second step of inclining the inclination adjusting member at the angle; a third step of bringing the inclination adjusting member into contact with the lens; and, a fourth step of moving the oblique annular lens supporting surface toward the inclination adjusting member to abut the lens against the inclination adjusting member.

According to yet another aspect of the present invention, there is provided an inclination adjusting apparatus which adjusts an inclination of a lens. The inclination adjusting apparatus includes a lens supporting member having an oblique annular supporting surface which supports the lens in a manner such that the lens can be inclined with respect to the supporting surface. The inclination adjusting apparatus further includes an inclination adjusting member which comes into contact with a surface of the lens, the surface being located opposite to the lens supporting member. An inclination defining member for defining an inclination of the inclination adjusting member, and a biasing mechanism for biasing the lens supporting member towards the inclination adjusting member while bringing a part of the inclination adjusting member into contact with the lens to thereby abut the lens against the inclination adjusting member.

Another object of the present invention is to provide a coma compensating method in which imprecise optical elements, such as a lens which has been incorrectly manufactured, can be used, and in which assembling operation of the optical system can be simplified.

To achieve the object mentioned above, a lens adjusting method, in an optical apparatus in which coherent light emitted from a light source is made incident upon a recording medium through an optical system including an objective lens and a plurality of optical elements so as to reproduce data recorded on the recording medium based upon light reflected by the recording medium, is provided. The lens adjusting method includes a first step of adjusting a relative inclination between the objective lens and the recording medium on a lens supporting member which supports the objective lens to compensate a coma occurring in the optical system; and, a second step of securing the objective lens to the lens supporting member by an adhesive applied between the objective lens and the lens supporting member.

The present disclosure relates to subject matter contained in Japanese patent application Nos. 5-66009, 5-66010, 5-66011, 5-66012 (all filed on Mar. 2, 1993), 5-85637 (filed on Mar. 19, 1993), and No. 5-111103 (filed on Apr. 14, 1993) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
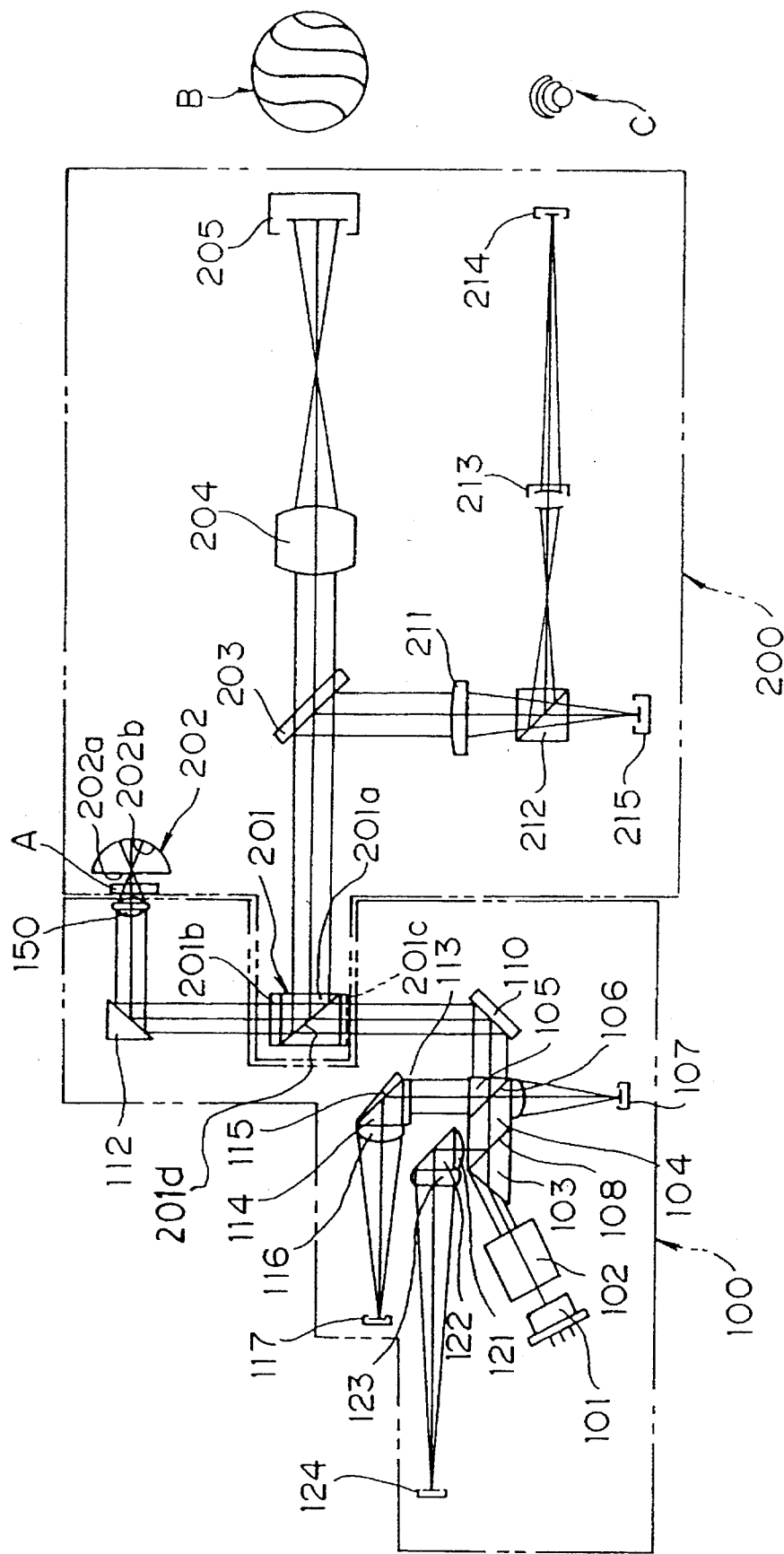
FIG. 1 is a conceptual view of a first embodiment of a lens inclination detecting apparatus according to the present invention.

FIG. 1 shows a first embodiment of a lens inclination detecting apparatus 200 which detects an inclination of an objective lens 150 in a photo magnetic disc apparatus 100.

The photo magnetic disc apparatus 100 constitutes an optical data recording and reproducing apparatus which records (or writes) data onto a recording medium which is in the form of a photo magnetic disc(magneto-optical disc), and reads and reproduces the recorded data from the photo magnetic disc. The optical system of the optical data recording and reproducing apparatus will be discussed below.

A divergent laser beam (i.e., coherent light) emitted from a light source 101, such as a semiconductor laser or laser diode (LD), is collimated by a collimating lens 102. The cross sectional shape of the collimated light is converted to a circular shape by a beam shaping prism (i.e., anamorphic prism) 103. The beam shaping prism 103 is provided with beam splitting prisms 104 and 105 secured thereto. The laser beam transmitted through the beam shaping prism 103 and reflected by a beam splitter 106, which is defined between the beam splitting prisms 104 and 105, is made incident upon a light sensor 107 which detects the quantity of light outputted from the LD 101, so that the adjustment is carried out until the quantity of light received by the light sensor 107 is a predetermined value.

The laser beam transmitted through the beam splitter 106 is reflected by a mirror 110; transmitted through an insertion prism 201 (beam splitting means) of the inclination detecting apparatus 200; reflected by a mirror 112; and made incident upon an objective lens 150.

The objective lens 150 is opposite a glass cover (i.e., transparent parallel plate) "A". The glass cover "A" is made of a material which is optically equivalent to that of a transparent plate K1 of the photo magnetic disc K shown in FIG. 12. When the inclination of the objective lens 150 is adjusted, the cover glass "A" is disposed at a position that is substantially equivalent to the location where transparent plate K1 of the photo magnetic disc K is disposed during normal use of the photo magnetic disc apparatus 100. In normal use, the photo magnetic disc K is set when the recording and reproducing operation are performed by the photo magnetic disc apparatus 100. When the photo magnetic disc K is set in during normal use, the disc K is disposed parallel to a reference plane of the photo magnetic disc apparatus 100. Accordingly, when the cover glass "A" is disposed during the adjustment of the objective lens 150, the cover glass "A" is oriented parallel to the reference plane.

The signal detecting system of the photo magnetic disc apparatus 100 will be explained hereinafter in the state in which the glass cover "A", instead of a magnetic disc, is positioned opposite the objective lens 150.

The laser beam reflected by the photo magnetic disc is transmitted through the objective lens 150; reflected by the mirror 112 and the mirror 110; and made incident upon the beam splitting prisms 104 and 105. The laser beam reflected by the beam splitter 106 provided between the beam splitting prisms 104 and 105 is transmitted through a ½ wave plate 113 where the direction of polarization thereof is rotated by 45 degrees. Thereafter, the light is incident upon a polarization beam splitter which is comprised of a prism 114 and a wedge prism 115. The light incident upon the polarization beam splitter is split into P-polarized and S-polarized light components that are transmitted through a condenser lens 116 and converged onto a signal detector 117 having two data sensors for obtaining photo magnetic signals, etc.

The light transmitted through the beam splitter 106 is reflected by a beam splitter 108 located between the beam shaping prism 103 and the beam splitting prism 104 and is received by a condenser lens 121. The light is then reflected by a prism 122; transmitted through a cylindrical lens 123; and received by an error detector 124. Namely, the light has an astigmatic difference caused by the condenser lens 121 and the cylindrical lens 123 and is converged onto the error detector 124 where tracking error signals and focusing error signals are obtained by a push-pull method and an astigmatism correction method, respectively.

The following discussion will be directed to the optical system of the lens inclination detecting apparatus 200.

The hemispherical lens 202 is located next to the glass cover "A" on the side opposite; to the objective lens 150 with respect to the glass cover "A". The insertion prism 201 is inserted between the mirrors 110 and 112 of the photo magnetic disc apparatus, i.e., within the optical path of the collimated light. The insertion prism 201 includes a polarization beam splitter (PBS) 201a which is precisely machined so as not to produce a wavefront aberration, and a ¼ wave plate 201b which is located on the side of the PBS 201a next to the objective lens 150. Of the linearly polarized light incident upon the insertion prism 201, light that is linearly polarized in the same plane as the P polarized light is converted to circularly polarized light by the ¼ wave plate 201b. The circularly polarized light is reflected by the hemispherical lens 202 and is transformed back into linearly polarized light when the circularly polarized light again passes through the ¼ wave plate 201b. This change of circularly polarized light to linearly polarized light causes a total internal reflection of the linearly polarized light at the insertion prism 201 towards the lens inclination detecting apparatus 200 because the phases of the circularly polarized light and the linearly polarized light differ by 180 degrees. This is a result of the light passing through the ¼ wave plate 201b twice. Therefore, there is no return light towards the LD 101 from the insertion prism 201, and no occurrence of noise due to the return light.

It is possible to provide a ½ wave plate 201c on the side of the polarization beam splitter 201a nearest the LD 101. Since the polarization direction of light from the LD 101 can be optionally selected by properly selecting the mounting state of the ½ wave plate 201c to the PBS 201a, the light reflected from the hemispherical lens 202 can be appropriately received by the detecting apparatus 200 regardless of the location of the detecting apparatus 200, even if the direction of the incident polarized light lies on a plane which includes the optical axis and the line normal to the reflecting surface of the insertion prism.

The light reflected by the insertion prism 201 is partly transmitted through a half mirror 203 and is made incident upon an interference fringe viewing portion 205 through an imaging lens 204. The interference fringe viewing portion 205 is provided with, for example, a CCD camera and a monitor (not shown). In the interference fringe viewing portion 205, interference fringes B which are caused by an interference of the beam transmitted through the objective lens 150 and the glass cover "A" and reflected by the flat surface 202a of the hemispherical lens 202, and the beam transmitted through the objective lens 150 and the glass cover "A" and reflected by the spherical surface 202b of the hemispherical lens 202 are viewed. A reflecting mechanism includes the flat surface 202a and the spherical surface 202b. A beam splitting mechanism includes the flat surface 202a and the spherical surface 202b. An superposing mechanism includes the flat surface 202a and the spherical surface 202b. A wavefront rotating mechanism includes the flat surface 202a. The distortion of the interference fringes B is due to a coma which is in turn caused by the inclination of the objective lens 150 with respect to the glass cover "A".

The light reflected by the half mirror 203 is made incident upon a condenser lens 211. The light transmitted through the condenser lens 211 is split into two beams by a beam splitter 212. One of the beams is received by a image point viewing portion 214 through a magnifying lens 213, and the other beam is received by an alignment detector 215. The image point viewing portion 214 and the alignment detector 215 are each provided with, for example, a CCD camera and a monitor (not shown).

In the image point viewing portion 214, the magnified image (point image) of light reflected by the flat surface 202a of the hemispherical lens 202 and the magnified image (point image) C of light reflected by the spherical surface 202b of the hemispherical lens 202 are viewed. The image point formed by the flat surface 202a does not contain a coma component which is asymmetrical in 180 degree directions with respect to the optical axis. However, the image point C formed by the spherical surface 202b contains the coma component.

The alignment detector 215 is provided to adjust the relative positional relationship among the convergence point of the beam incident upon the objective lens 150, the flat surface 202a of the hemispherical lens 202, and the center of curvature of the spherical surface 202b of the hemispherical lens 202, the center being located on the flat surface 202a so as to effectively view the interference fringes and the image points. As will be discussed hereinafter, the alignment detector 215 is used, for example, upon commencement of the adjustment of the inclination of the objective lens 150, upon setting the relative position between the hemispherical lens 202 and the photo magnetic disc apparatus 100, or upon the adjustment of the inclination of the objective lens 150, etc.

The detection sensitivity of the coma component of the wavefront aberration (referred to as coma) will be discussed below with reference to FIG. 2.

Figure 2:
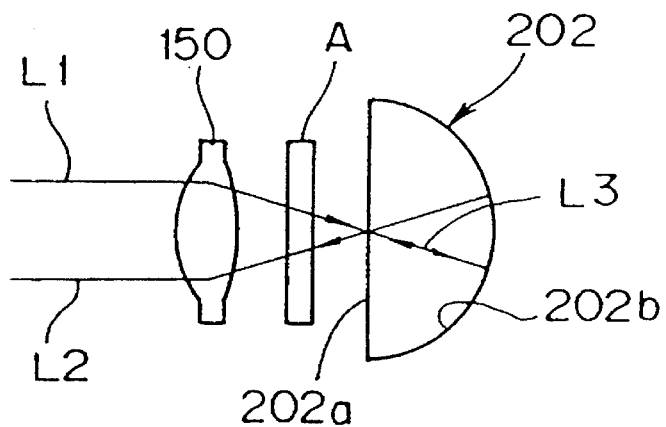
FIG. 2 is a conceptual view of an optical path of an optical system including an objective lens, a glass cover, and a hemispherical lens.

In FIG. 2, the light L1 transmitted through the objective lens 150 and the glass cover "A" is partly reflected by the flat surface 202a of the hemispherical lens 202 in a direction symmetrical thereto with respect to the optical axis of the objective lens 150. The reflected light is indicated at L2. Of the coherent light which has passed through the objective lens 150 and the glass cover "A" once, all the rays which are reflected by the flat surface 202a are reflected back through the glass cover "A", the objective lens 150, and along a path that is symmetrical to the incoming path with respect to the optical axis. Due to this reflection, if the flat surface 202a is viewed from the objective lens 150 along the light path, the wavefront of the reflected coherent light is observed as being turned by 180 degrees.

The light transmitted through the flat surface 202a is partly reflected by the spherical surface 202b of the hemispherical lens 202, as indicated at L3. The reflected light L3 is transmitted along the same optical path as the incident light and emitted from the objective lens 150. Of the coherent light having passed once through the objective lens 150 and the glass cover "A", the rays that are reflected by the spherical surface 202b are reflected by the spherical surface 202b back through the glass cover "A", the objective lens 150, and along the same light path as the incoming light path. As a result of this reflection by the spherical surface 202b, the wavefront of the reflected coherent light is observed from the objective lens 150 along the light path as being returned to the objective lens 150 without being rotated. The two wavefronts of reflected light at the flat surface 202a and at the spherical surface 202b are rotated relative to one another through 180 degrees around the optical axis of the objective lens 150. Accordingly, the only aberration that is observed is the comatic aberration.

A coma, which is rotationally symmetrical with respect to the optical axis, does not appear in the wavefront which has been transmitted through the. objective lens 150 and the glass cover "A", and reflected by the flat surface 202a back towards and through the glass cover "A" and the objective lens 150. On the other hand, the wavefront reflected by the spherical surface 202b of the hemispherical lens 202 and transmitted again through the objective lens 150 contains a coma that is double that of the coma of the wavefront that passes the objective lens 150 and the glass cover "A" once, since the first-mentioned wavefront passes the objective lens 150 and the glass cover "A" twice. The interference fringes are caused by the interference of the two kinds of wavefront mentioned above. Thus, the coma caused by the passage through the objective lens 150 and the glass cover "A" can be viewed with double sensitivity in the interference fringe viewing portion 205. In other words, one interference fringe appears in the interference fringe viewing portion 205 when the coma, which is caused due to the inclination of the objective lens 150 with respect to the glass cover "A", is $\lambda/2$ ($\lambda$=wavelength of light transmitted through the objective lens).

Figure 3:
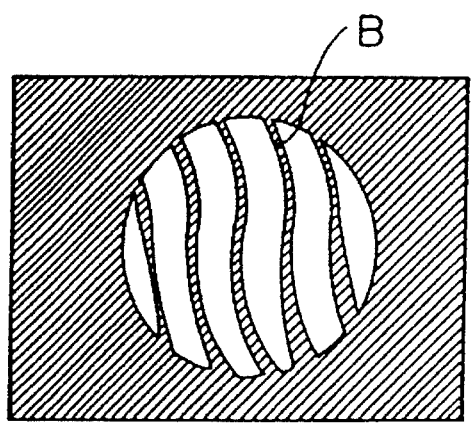
FIG. 3 is a schematic view of interference fringes indicated in a monitor of an interference fringe viewing portion.
Figure 4:
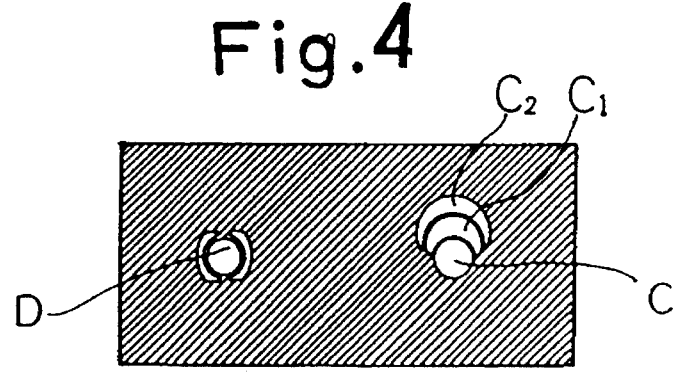
FIG. 4 is a schematic view of image points indicated in a monitor of a image point viewing portion.

The following discussion will be addressed to the adjustment of the inclination of the objective lens, with reference to FIGS. 1, 3 and 4, according to the present invention. The objective lens 150 is disposed on a lens holder (not shown), and the glass cover "A" is disposed at an appropriate position with reference to a contacting surface 131b (FIG. 25) of the spindle motor 131.

Thereafter, the relative position of the hemispherical lens 202 and the objective lens 150 in the optical axis direction is adjusted so as to obtain a clear image point of light condensed by the objective lens 150 and reflected by the flat surface 202a of the hemispherical lens 202, while observing the image point viewed in the alignment detector 215 and the image point viewing portion 214. After that, the relative position of the hemispherical lens 202 and the objective lens 150 in the direction perpendicular to the optical axis is adjusted so that the image point of light condensed by the objective lens 150 and reflected by the spherical surface 202b of the hemispherical lens 202 is located at the position of the image point formed by the flat surface 202a of the hemispherical lens 202, while observing the image point in the alignment detector 215. When the glass cover "A" is arranged adjacent to the flat surface 202a, the positional relationship between the glass cover "A" and the flat surface 202a becomes similar to the relationship between the transparent plate K1 and the data recording surface K2 (see FIG. 12) of an actual photo magnetic disc. If the glass cover "A" is brought into contact with the flat surface 202a, additional light reflection may occur other than the reflection at the flat surface 202a and the flat surface 202b. This additional reflection at the contacting surface may bring about an adverse effect on the interference fringe observation. To prevent such from occurring, in the present embodiment, the glass cover "A" and the flat surface 202a are disposed with a predetermined distance therebetween.

The interference fringes B, as shown in FIG. 3, are displayed in the monitor of the interference fringe viewing portion 205. The image points C and D, as shown in FIG. 4, are indicated in the monitors of the alignment detector 215 and the image point viewing portion 214. The distortion of the interference fringes B is caused by the coma and increases as the inclination of the objective lens 150 relative to the glass cover "A" increases. The image point C is formed by light reflected by the spherical surface 202b of the hemispherical lens 202 and has an outstanding coma. The image point D is formed by light reflected by the flat surface 202a of the hemispherical lens 202 and has no coma. There is a difference in magnification of the image to be viewed between the alignment detector 215 and the image point viewing portion 214. Both the image points C and D are magnified at a large magnification rate in the image point viewing portion 214 and can be clearly viewed.

If the distortion of the interference fringes B is above a predetermined value (e.g., $\lambda/4$, in other words ½ fringe), the inclination of the objective lens 150 is adjusted to substantially eliminate the distortion, so that the interference fringes are linear. If the adjustment of the objective lens 150 causes the convergence point of light by the objective lens 150 to be considerably deviated from the center of curvature of the spherical surface 202b of the hemispherical lens 202, there will be too many tilt fringes, making it difficult to determine the degree of the distortion of the interference fringes B. In such case, the objective lens 150 (or the whole photo magnetic disc apparatus 100) or the hemispherical lens 202 is displaced in a direction perpendicular to the optical axis of the objective lens 150 to reduce the number of the tilt fringes B to an appropriate number (for example, 3 or 4 fringes). Thereafter, coma caused by the relative inclination of the objective lens with respect to the glass cover is observed. Consequently, the inclination of the objective lens 150 is adjusted so that the interference fringes B become linear again. The above-mentioned operations are repeated to correctly adjust the inclination of the objective lens 150.

In the above-mentioned embodiment, the hemispherical lens 202 is provided on the side opposite to the objective lens 150 with respect to the glass cover "A", so that the relative inclination between the objective lens 150 and the glass cover "A" is detected in accordance with the interference fringes B caused by the light reflected by the hemispherical lens 202. Accordingly, it is substantially only the hemispherical lens 202 which serves as the optical system to obtain the interference fringes B on the right side of the glass cover "A" in FIG. 5. Consequently, the portion of the detecting apparatus 200 containing the hemispherical lens 202 is made small. This makes it possible to adjust the objective lens 150 from the side of the hemispherical lens 202. Accordingly, there is no restriction to the mounting mechanism of the objective lens 150 to a lens holder or support (not shown). Namely, if a mounting structure of the objective lens 150 to the focusing and tracking mechanism, as shown in FIGS. 11 through 14 is used to lighten the whole focusing and tracking device in the photo magnetic disc apparatus, it is possible to easily adjust the inclination of the objective lens 150.

In the above-mentioned embodiment, the light transmitted through the objective lens 150 is reflected and split by the hemispherical lens 202, so that the light is separated into the above-noted two bundles of rays. The wavefronts of the two bundles of rays which are rotated through 180 degrees around the optical axis in a relative manner are superposed to thereby produce the interference fringes. Namely, the reflection, separation, rotation and superimposition of beams are effected by the single member. Consequently, no harmful external light tends to enter the above-noted superimposed bundles of rays. Accordingly, stable interference fringes B are obtained, resulting in an easy adjustment of the inclination, in comparison with an arrangement in which a concave mirror and a Dove prism are used in combination, as will be discussed hereinafter.

Also, in this embodiment, since the hemispherical lens 202 is used, the adjustment of the relative position between the hemispherical lens 202 and the objective lens 150 (i.e., the alignment adjustment) can be easily effected. Namely, since the center of curvature of the spherical surface portion 202b of the hemispherical lens 202 is located on the flat surface portion 202a, the adjustment of the hemispherical lens 202 in the axial direction can be completed only by making the convergence point of the objective lens 150 coincidental with the flat surface portion 202a. Thereafter, the adjustment of the hemispherical lens 202 or the objective lens 150 (or, the photo magnetic disc apparatus 100) with respect to the optical axis in the vertical direction (i.e., perpendicular to the optical axis) is carried out by making the convergence point of the objective lens 150 coincidental with the center of curvature of the spherical surface 202b.

In the first embodiment, the coma produced in the optical system of the photo magnetic disc apparatus 100 and the lens inclination detecting apparatus 200 can be substantially eliminated only by adjusting the relative inclination of the objective lens 150 and the glass cover "A" provided in the terminal stage of the optical system. Namely, in this embodiment, the coma produced in the optical system can be eliminated by adjusting the relative inclination of the objective lens 150 and the glass cover "A" without increasing the assembly accuracy of the optical elements of the optical system, according to the first embodiment.

When the adjustment of the inclination of the objective lens 150 is completed, as mentioned above, the photo magnetic disc apparatus is moved to a subsequent assembling or checking station.

Figure 5:
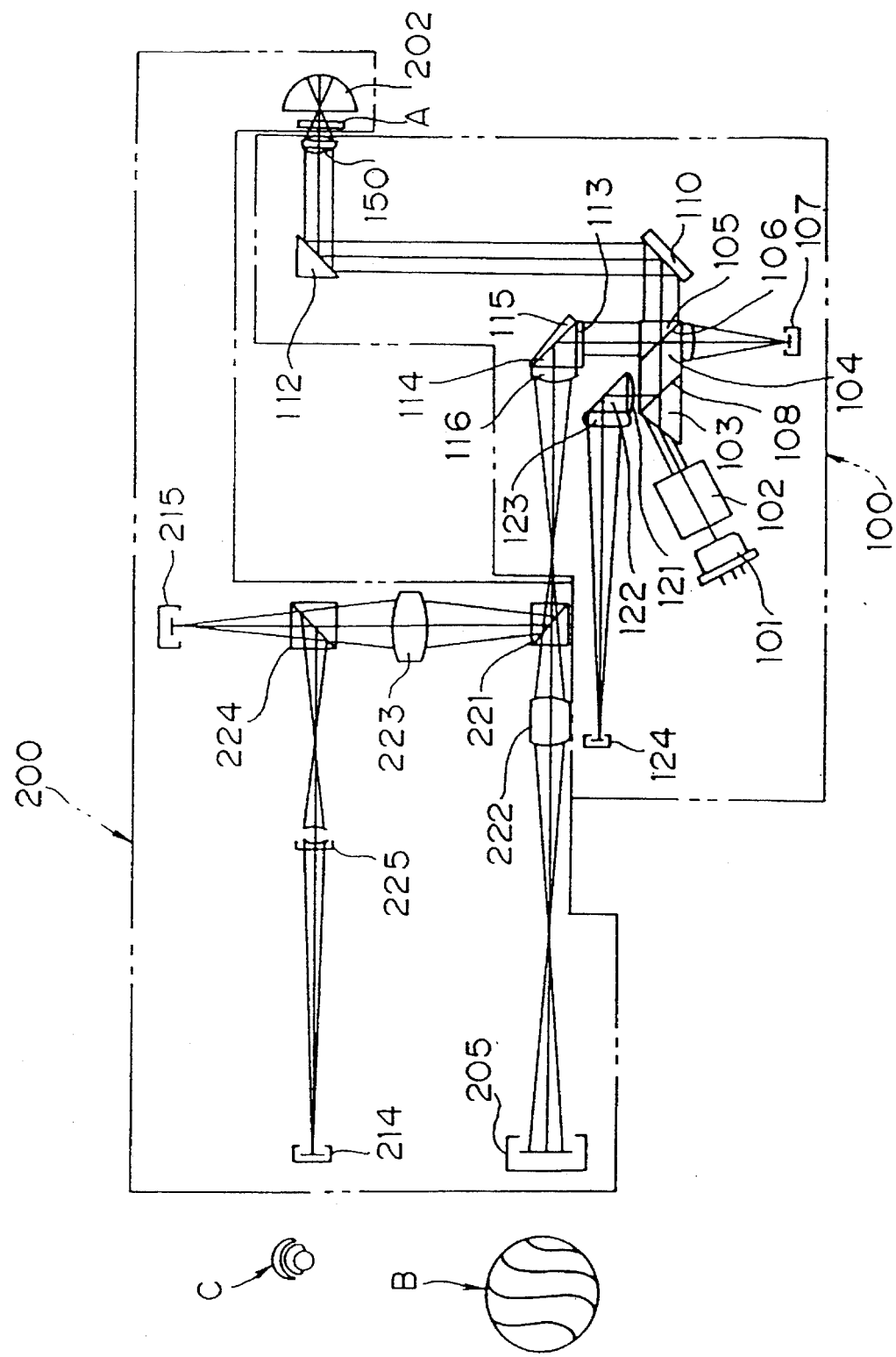
FIG. 5 is a conceptual view of a second embodiment of a lens inclination detecting apparatus according to the present invention.

FIG. 5 shows a second embodiment of a lens inclination detecting apparatus 200, according to the present invention.

In the second embodiment, the insertion prism of the first embodiment is not provided, so that the light reflected from the hemispherical lens 202 is detected by the signal detecting system of the photo magnetic disc apparatus 100. Namely, the light reflected from the hemispherical lens 202 is reflected by the prism 114 and introduced into the inclination detecting apparatus 200. The light is split into two beams by the beam splitter 221 in the lens inclination detecting apparatus 200. One of the split beams is made incident upon the interference fringe viewing portion 205 through the image forming lens 222 and the other split beam is transmitted through the condenser lens 223 and is made incident upon the beam splitter 224. One of the beams split by the beam splitter 224 is introduced into the image point viewing portion 214 through the magnifying lens 225, and the other split beam is made incident upon the alignment detecting portion 215.

The remaining structure of the optical arrangement shown in FIG. 5 is same as the first embodiment.

In the second embodiment, the absence of the insertion prism between the mirrors 110 and 112 attenuates the disturbance of the wavefront of light towards the hemispherical lens 202. Consequently, the inclination of the objective lens 150 can be more accurately detected in the second embodiment than the first embodiment.

Figure 6:
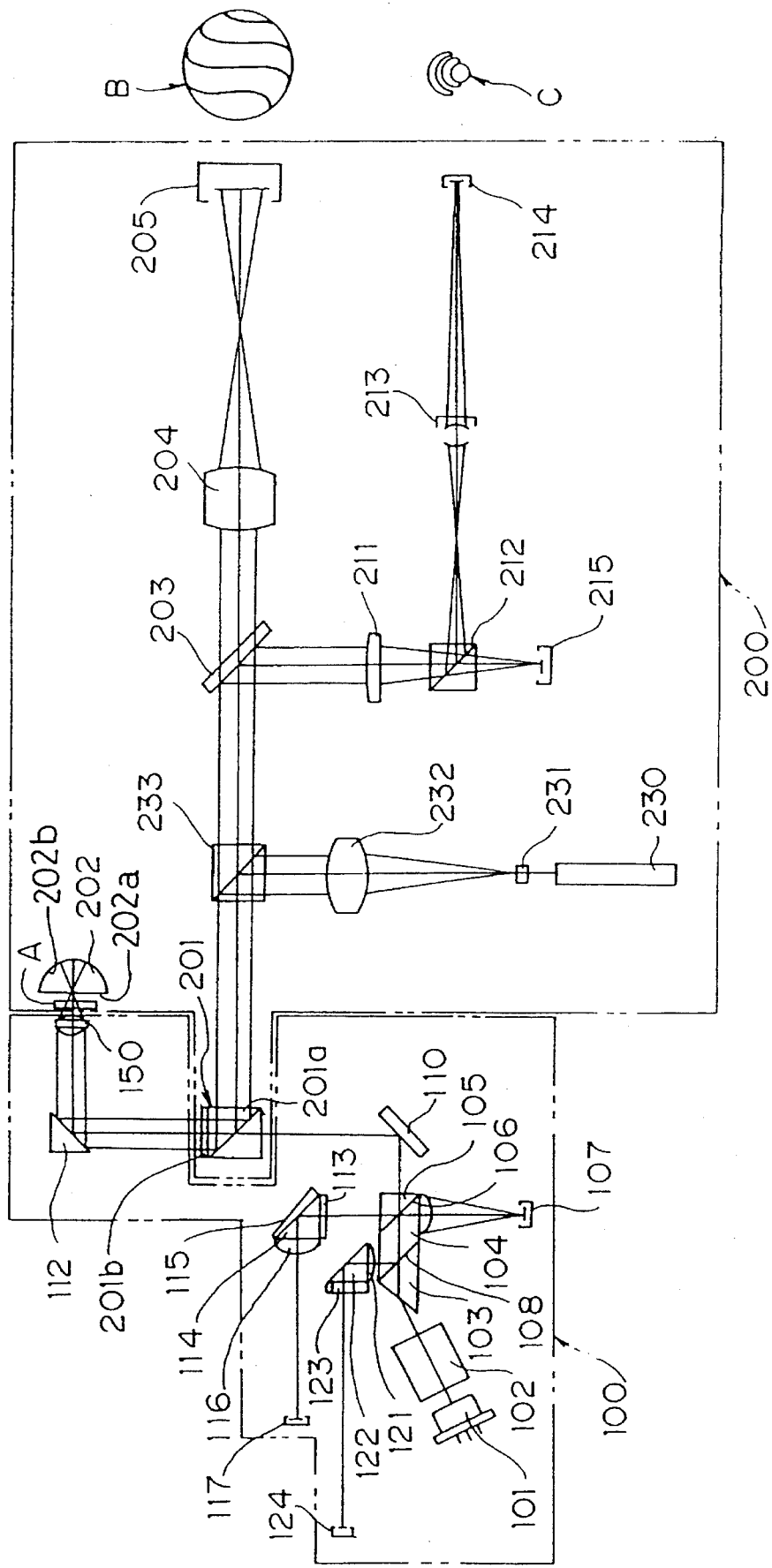
FIG. 6 is a conceptual view of a third embodiment of a lens inclination detecting apparatus according to the present invention.

FIG. 6 shows a third embodiment of a lens inclination detecting apparatus 200, according to the present invention.

In the third embodiment, the interference fringes B, which are employed to detect the inclination of the objective lens 150, are formed by the laser beam emitted from the He-Ne (helium-neon) laser source 230 provided in the lens inclination detecting apparatus 200, unlike the first embodiment. Namely, the laser beam emitted from the He-Ne laser source 230 is converted to divergent light by a beam expander 231 and collimated by the collimating lens 232, and is then made incident upon the insertion prism 201 (which has the same function as a mirror in this embodiment) through the beam splitter 233.

The remaining structure of the third embodiment is the same as the first embodiment. Namely, the light incident upon the lens inclination detecting apparatus 200 through the insertion prism 201 is partly transmitted through the half mirror 203 to reach the interference fringe viewing portion 205 through the image forming lens 204, and is partly reflected by the half mirror 203 to be made incident upon the condenser lens 211. The light emitted from the condenser lens 211 is split into two bundles of rays by the beam splitter 212. One of the split beams is made incident upon the image point viewing portion 214 through the magnifying lens 213 and the other split beam is made incident upon the alignment detector 215. The thickness of the glass cover "A" in the third embodiment is determined in accordance with the wavelength of the laser beam emitted by the He-Ne laser source 230.

According to the third embodiment, since the visible light is emitted from the laser source 230, the interference fringes B and the image points C and D can be directly viewed by a viewer without relying upon the CCD camera. Consequently, the adjustment of the inclination of the objective lens 150 can be much more simplified. Moreover, in comparison with the arrangement in which the semiconductor laser source 101 within the photo magnetic disc apparatus 100 is employed, no aberration is caused in the light path between the LD source 101 and the insertion prism 201. Accordingly, a higher detection accuracy of the inclination of the objective lens 150 is obtained.

Figure 7:
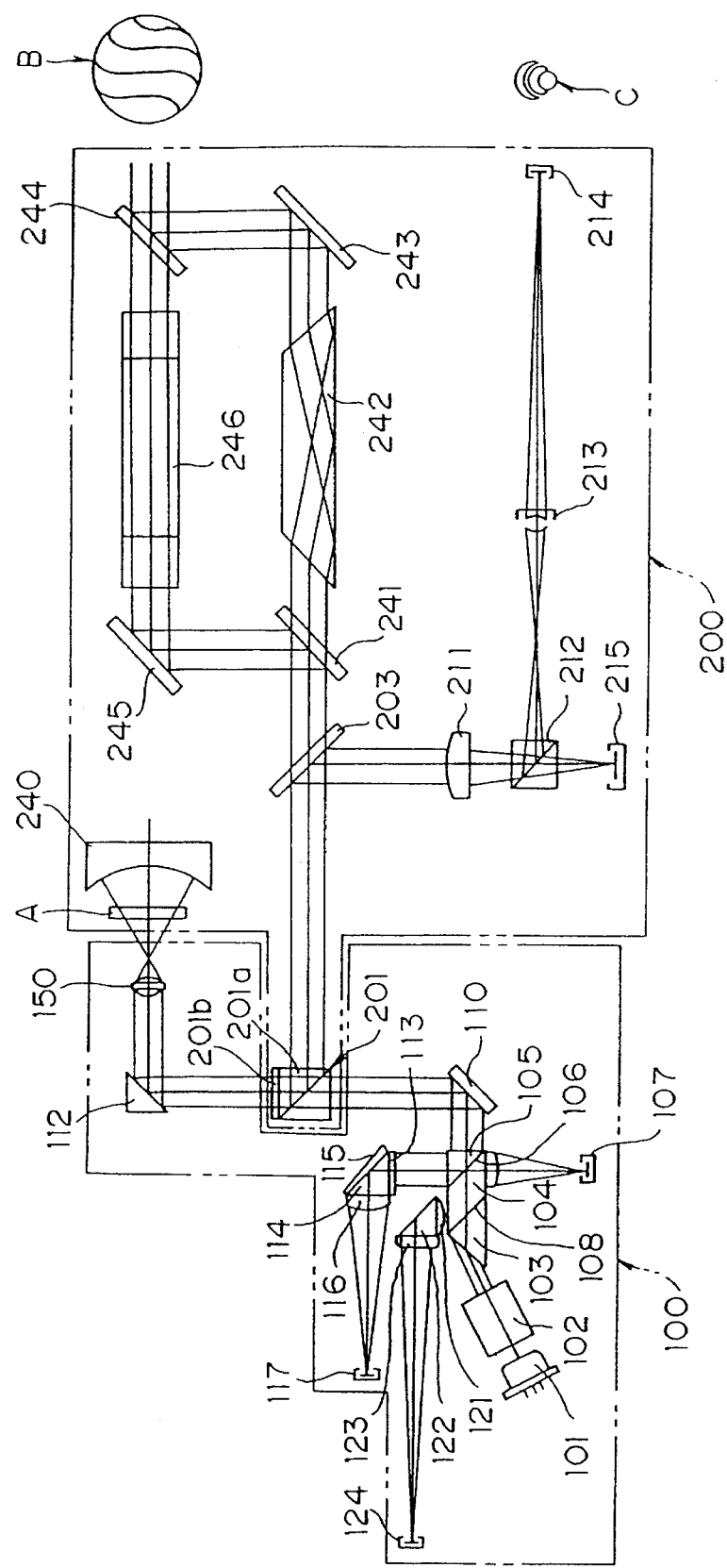
FIG. 7 is a conceptual view of a fourth embodiment of a lens inclination detecting apparatus according to the present invention.

FIG. 7 shows a fourth embodiment of a lens inclination detecting apparatus 200, according to the present invention.

In the fourth embodiment, there is provided a concave mirror 240 instead of the hemispherical lens. The light reflected by the concave mirror 240 is transmitted through the glass cover "A" and the objective lens 150 and is made incident upon the mirror 112.

The light reflected by the beam splitter of the insertion prism 201 is partly transmitted through the half mirror 203 where the light is split. A half mirror (i.e., a reflecting means) 241 is provided for partially transmitting and partially reflecting light. A beam splitting means includes the half mirror 241. The light transmitted through the half mirror 241 is incident upon the first Dove prism 242 which is per se known. Namely, when the light passes through the Dove prism 242, the beam is inverted with respect to the first axis normal to the sheet of the drawings. The beam is then reflected by the mirror 243 and made incident upon the half mirror (i.e., a superposing means) 244. The first Dove prism 242 and the second Dove prism 246 together constitute a wavefront rotating means. Light reflected by the half mirror 241 is reflected by the mirror 245 and is transmitted through the second Dove prism 246, so that the beam is inverted with respect to the vertical axis (i.e., a second axis perpendicular to the first axis of the first Dove prism 242) in FIG. 7 to reach the half mirror 244.

The two beams are rotated by approximately 180 degrees about the optical axis by the first and second Dove prisms 242 and 246, so that the two bundles are superimposed. Consequently, the interference fringes B are produced due to the coma which is the asymmetric aberration in 180 degrees directions with respect to the optical axis. The interference fringes B are converged as an image in the interference fringe viewing portion (not shown).

The remaining structure of the fourth embodiment is the same as the first embodiment.

The detection sensitivity of the coma in the fourth embodiment will be discussed below with reference to FIG. 8.

Figure 8:
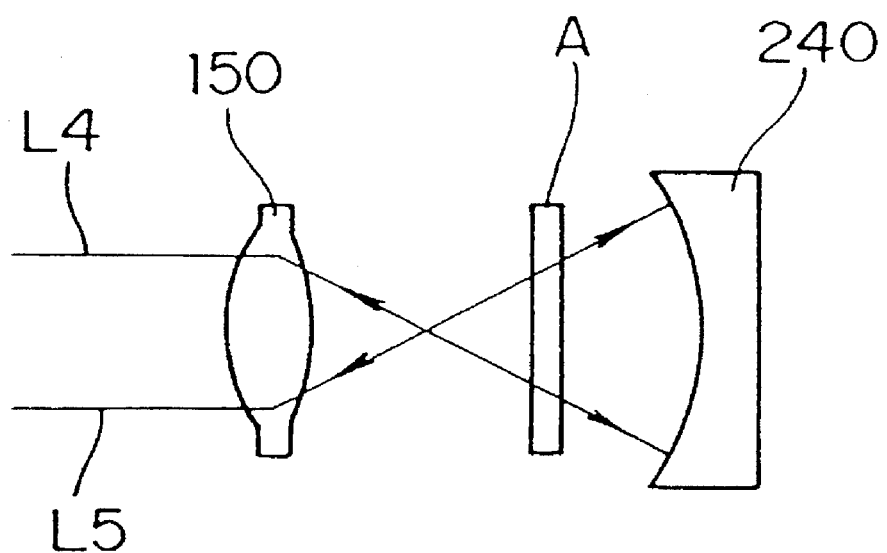
FIG. 8 is a conceptual view of an optical path of an optical system including an objective lens, a glass cover, and a concave mirror.

In FIG. 8, the light rays L4 and L5 transmitted through the objective lens 150 and the glass cover "A" are reflected by the concave mirror 240 and are returned along the same optical paths and emitted from the objective lens 150.

The degree of coma contained in the wavefront reflected by the concave mirror 240 and transmitted through the objective lens 150 is twice that of the wavefront transmitted once through the objective lens 150 and the glass cover "A", since the return light passes twice through the objective lens 150 and the glass cover "A". The wavefront containing the "double" coma is split into two wavefronts which are relatively turned by 180 degrees with respect to the optical axis by the Dove prisms to be superimposed. Consequently, the coma caused by the transmission of the wavefront through the objective lens 150 and the glass cover "A" can be viewed at a fourfold sensitivity. Namely, one interference fringe is viewed when the coma caused by the inclination of the objective lens 150 with respect to the glass cover "A" is λ/4. Thus, the coma can be detected at very high sensitivity.

Figure 9:
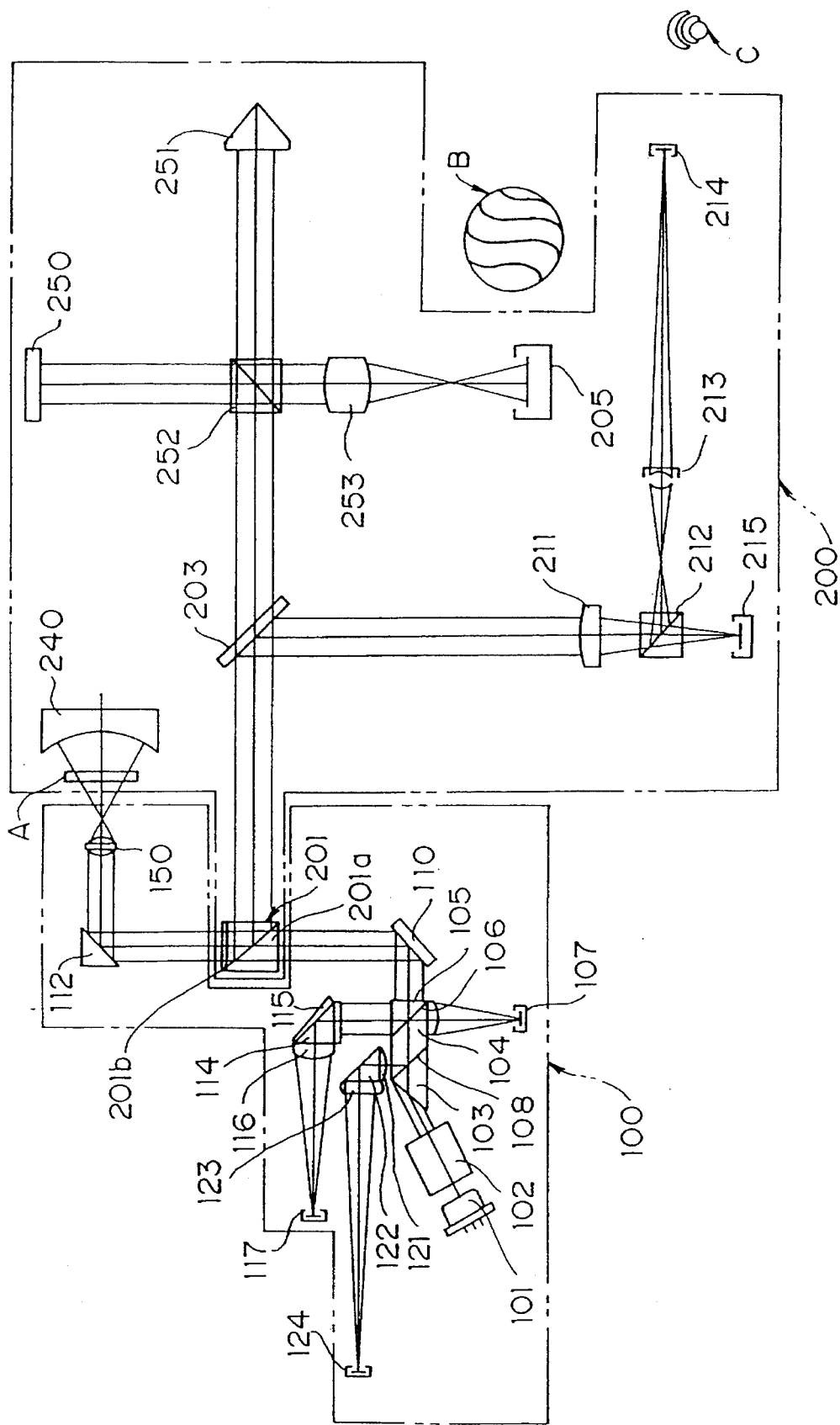
FIG. 9 is a conceptual view of a fifth embodiment of a lens inclination detecting apparatus according to the present invention.

FIG. 9 shows a fifth embodiment of a lens inclination detecting apparatus 200, according to the present invention.

The fifth embodiment is different from the fourth embodiment in that light transmitted through the half mirror 203 is split into two bundles or rays by the beam splitter 252. The two types of bundle of rays are made incident upon the reflecting mirror 250 and the corner-cube prism 251, respectively.

The bundle of rays reflected by the reflecting mirror 250 has the same direction as the light reflected by the concave mirror 240 with respect to the optical axis and is transmitted through the beam splitter 252 (i.e., a beam splitting means and a beam superposing means) to be made incident upon the image forming lens 253. The bundle of rays reflected by the corner-cube prism (i.e., a wavefront rotating means) 251 corresponds to light reflected by the concave mirror 240 and the wavefront of the bundle of rays is rotated by 180 degrees with respect to the optical axis and is reflected by the beam splitter 252 to be made incident upon the image forming lens 253. Consequently, the interference fringes B caused by the coma can be viewed in the interference fringe viewing portion 205. The coma can be detected at high sensitivity similar to the fourth embodiment.

Figure 10:
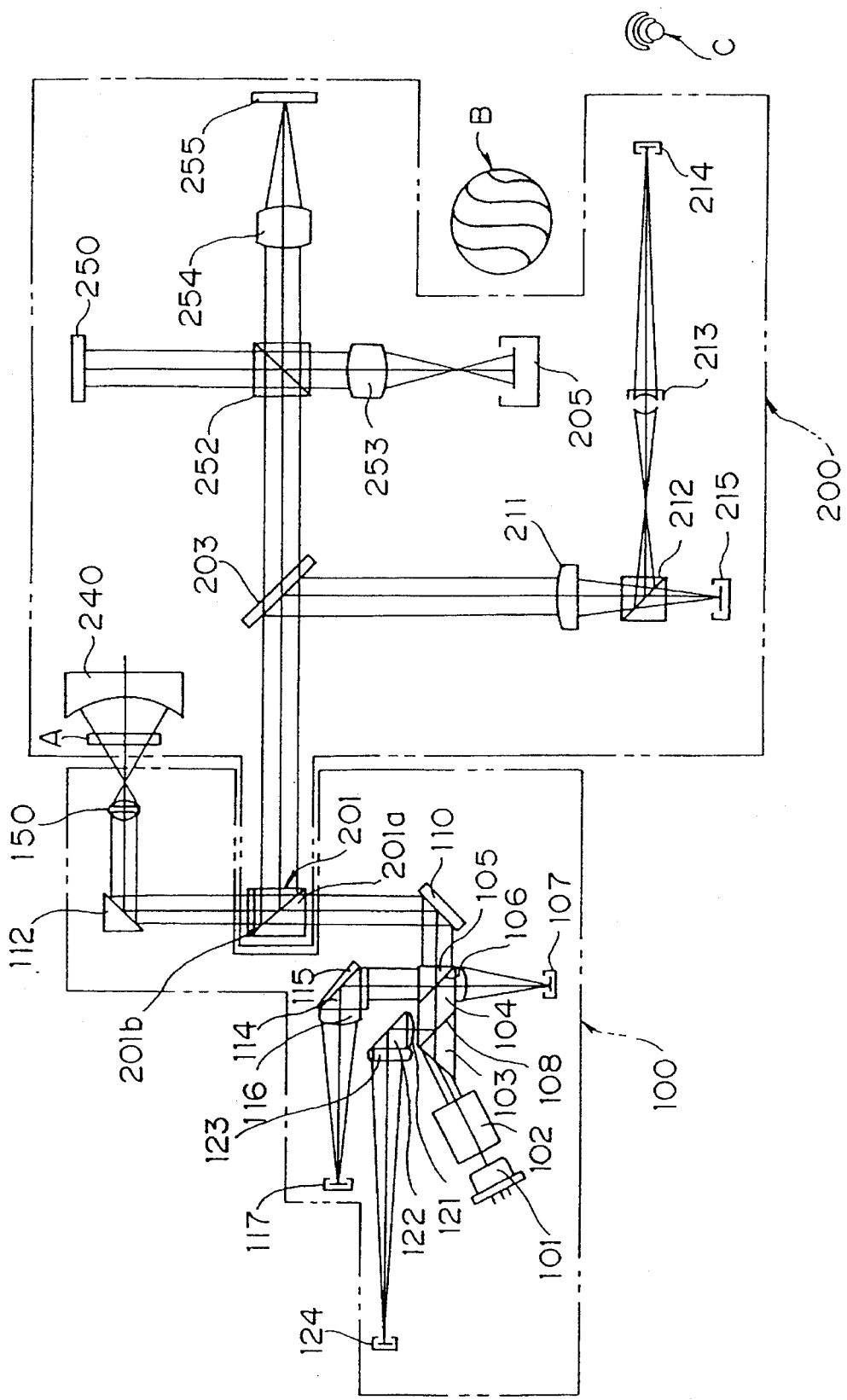
FIG. 10 is a conceptual view of a sixth embodiment of a lens inclination detecting apparatus according to the present invention.

FIG. 10 shows a sixth embodiment of a lens inclination detecting apparatus 200, according to the present invention.

In the sixth embodiment, the corner-cube prism 251 in the fifth embodiment is replaced with the condenser lens 254 and the reflecting mirror 255. Namely, the condenser lens 254 and the reflecting mirror 255 has the same function as the corner-cube prism 251 in the fifth embodiment.

Consequently, one of the bundles of rays obtained by splitting light incident upon the beam splitter 252 is rotated through 180 degrees about the optical axis by the condenser lens 254 and the reflecting mirror 255. This bundle of rays is superposed with another bundle of rays which is reflected by the reflecting mirror 250 at the beam splitter 252. The superposition of the bundles of rays produces interference fringes. The condenser lens 254 and reflecting mirror 255 together constitute a wavefront rotating means. The other structure and operation of the sixth embodiment are the same as those in the fifth embodiment. Namely, the coma can be detected at high sensitivity similar to the fifth embodiment.

FIGS. 11 through 14 show the mounting structure of the objective lens 150 to the focusing and tracking mechanism of the photo magnetic disc apparatus 100.

Figure 11:
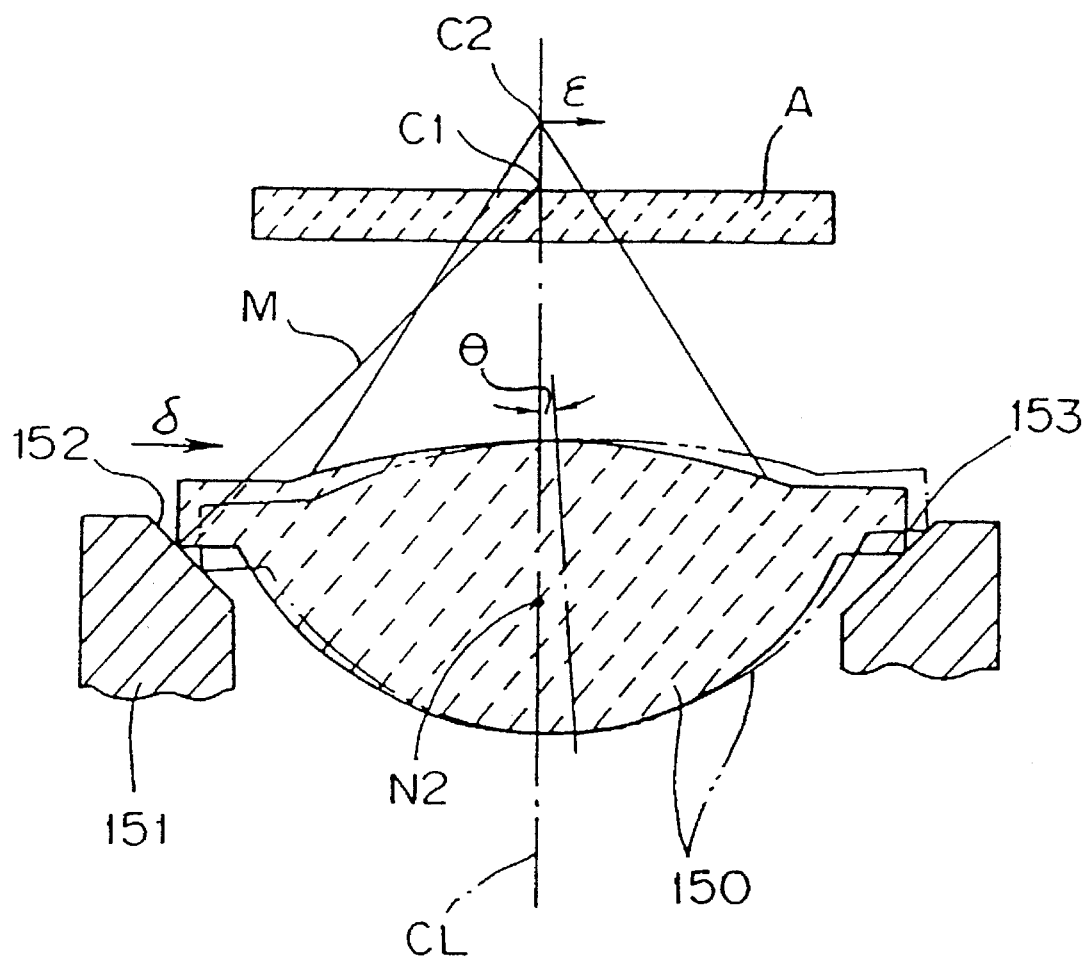
FIG. 11 is an explanatory view of an occurrence of a deviated image point when an objective lens is inclined on a lens holder.

As shown in FIG. 11, the objective lens 150 is supported by the lens supporting surface 152 of the lens supporting member (lens holder) 151. The supporting surface 152 is a conically oblique surface. The objective lens 150 is, for example, a single glass mold lens with opposite aspherical lens surfaces. The single objective lens 150 is provided on the outer peripheral surface thereof with a peripheral or annular flange 153 which comes into contact with the supporting surface 152. The lens supporting surface 152 may be spherical.

It is now assumed that the center line CL of the supporting surface 152 is identical to the optical axis of the objective lens 150 and that the objective lens 150 is parallel with the glass cover "A". If the objective lens 150 is displaced by the lateral force applied thereto through a displacement δ, the displacement of the flange 153 of the lens 150 takes place along the supporting surface 152, so that the objective lens 150 is rotated about the intersecting point C1 of the straight line M normal to the supporting surface 152 and the center axis CL in a cross section, as indicated at two-dotted and dashed line in FIG. 11. Namely, there is an inclination angle θ of the optical axis of the objective lens 150, and the convergence point C2 of the objective lens is moved, so that the deviation ε of the image point occurs. The inclination θ causes the coma, so that the distortion of the interference fringes B (FIG. 1) increases.

Furthermore, the number of the tilt fringes (interference fringes B) is increased by the deviation ε of the image point. This makes it difficult for an operator to observe the magnitude of the distortion of the interference fringes. To prevent this, it is desirable that only the inclination θ occurs without causing the deviation ε of the image point, upon the adjustment of the inclination of the objective lens 150.

No deviation ε of the image point occurs due to the inclination of the objective lens 150, when the objective lens 150 is rotated about the rear principal point (i.e., principal point adjacent to the image) N2 thereof, provided that the incident light is collimated light. However, in case where the objective lens 150 is displaced with respect to the supporting surface 152, as mentioned above, the intersecting point C1 of the optical axis and the straight line which passes through the contacting point of the supporting surface 152 and the flange 153 and which is perpendicular to the supporting surface 152 must coincide with the center line CL which contains the rear principal point N2, in order that the objective lens 150 rotates about the rear principal point N2. It is however difficult to support the objective lens in such an arrangement. Therefore, in the first through sixth embodiments, if the number of the interference fringes increases due to the occurrence of the deviation ε of the image point during the adjustment of the inclination of the lens, so that it is difficult to measure or detect the magnitude or degree of the coma, the whole lens inclination detecting apparatus 200 or the hemispherical lens 202 (or the concave mirror 240) is displaced in the direction perpendicular to the optical axis of the objective lens to attenuate the deviation ε of the image point or reduce the number of the interference fringes to thereby measure the coma. The adjustment of the inclination of the objective lens 150 will be discussed hereinafter.

Figure 12:
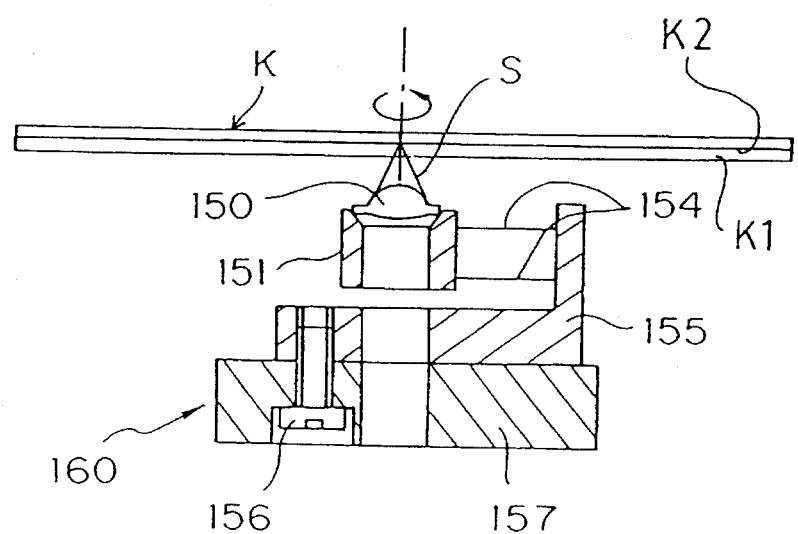
FIG. 12 is a schematic view of a mounting portion of an objective lens to a tracking mechanism.

FIG. 12 schematically shows the mounting structure of the objective lens 150 to the focusing and tracking mechanism 160.

The focusing and tracking mechanism (i.e., coarse actuator) 160 is provided below the photo magnetic disc K, so that the objective lens 150 emits the laser beam S towards the photo magnetic disc K from the lower side thereof. The lens holder (fine actuator) 151 is connected to the securing member 155 through the springs 154. The securing member 155 is secured to the movable member 157 by the screw 156. Consequently, the lens holder 151 is displaced with respect to the securing member 155 when an elastic deformation of the springs 154 takes place. As mentioned above, since the inclination of the objective lens 150 is adjustable with respect to the lens holder 151 and the securing member 155 is integrally connected to the movable member 157, it is not necessary to provide a mechanism which relatively inclines the securing member 155 or the movable member 157, unlike prior art in which such a mechanism is indispensable. Thanks to this, it is not necessary to provide any component which provides for inclinable movement of the securing member 155 with respect to the movable member 157. Consequently, not only can the focusing and tracking mechanism 160 be considerably lightened, but also the speed of the tracking operation for the photo magnetic disc can be increased.

Figure 13:
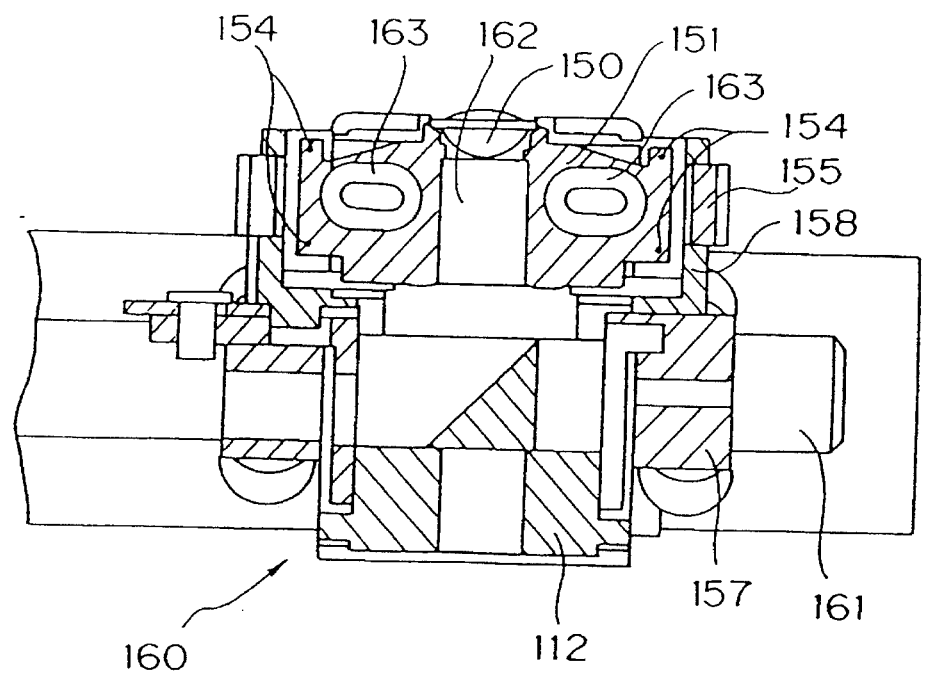
FIG. 13 is a sectional view of a tracking mechanism.

FIG. 13 shows the internal structure of the split type focusing and tracking mechanism 160 of photo magnetic disc apparatus.

The movable member 157 is movably supported on rails 161, for example, through a ball bearing (not shown), so that the movable member 157 is moved along the rail 161 to a position corresponding to a predetermined track of the photo magnetic disc apparatus. The movable member 157 is provided with the mirror 112 (FIG. 1) through which the laser beam is made incident upon the objective lens 150 and the laser beam emitted from the objective lens 150 is made incident upon the detecting system (not shown). The securing member 155 is secured to the movable member 157 through the connecting member 158. Note that the connecting member 158 is not shown in FIG. 12.

The springs 154 extend in the direction perpendicular to the sheet of the drawings in FIG. 13. The lens holder 151 is spaced from the securing member 155 and the connecting member 158, and is supported only by the springs 154. The lens holder 151 is provided with a hole 162 which extends in the vertical direction under the objective lens 150. There are a plurality of solenoid coils 163 surrounding the hole 162. The connecting member 158 is provided with magnets 169 (FIG. 14) corresponding to the solenoid coils 163. As is well known, to record or reproduce data on or from the photo magnetic disc K, the solenoid coils 163 are selectively activated or energized in accordance with the tracking error signals or focusing error signals, so that a slight displacement of the lens holder 151 occurs to adjust the relative positional relationship between the objective lens 150 and the focus position and the track position of the photo magnetic disc K.

The mounting mechanism of the objective lens 150 is not limited to that shown in FIGS. 12 and 13, and the present invention can be applied to any type of adjusting apparatuses which adjust the relative inclination of the objective lens and the photo magnetic disc.

Figure 14:
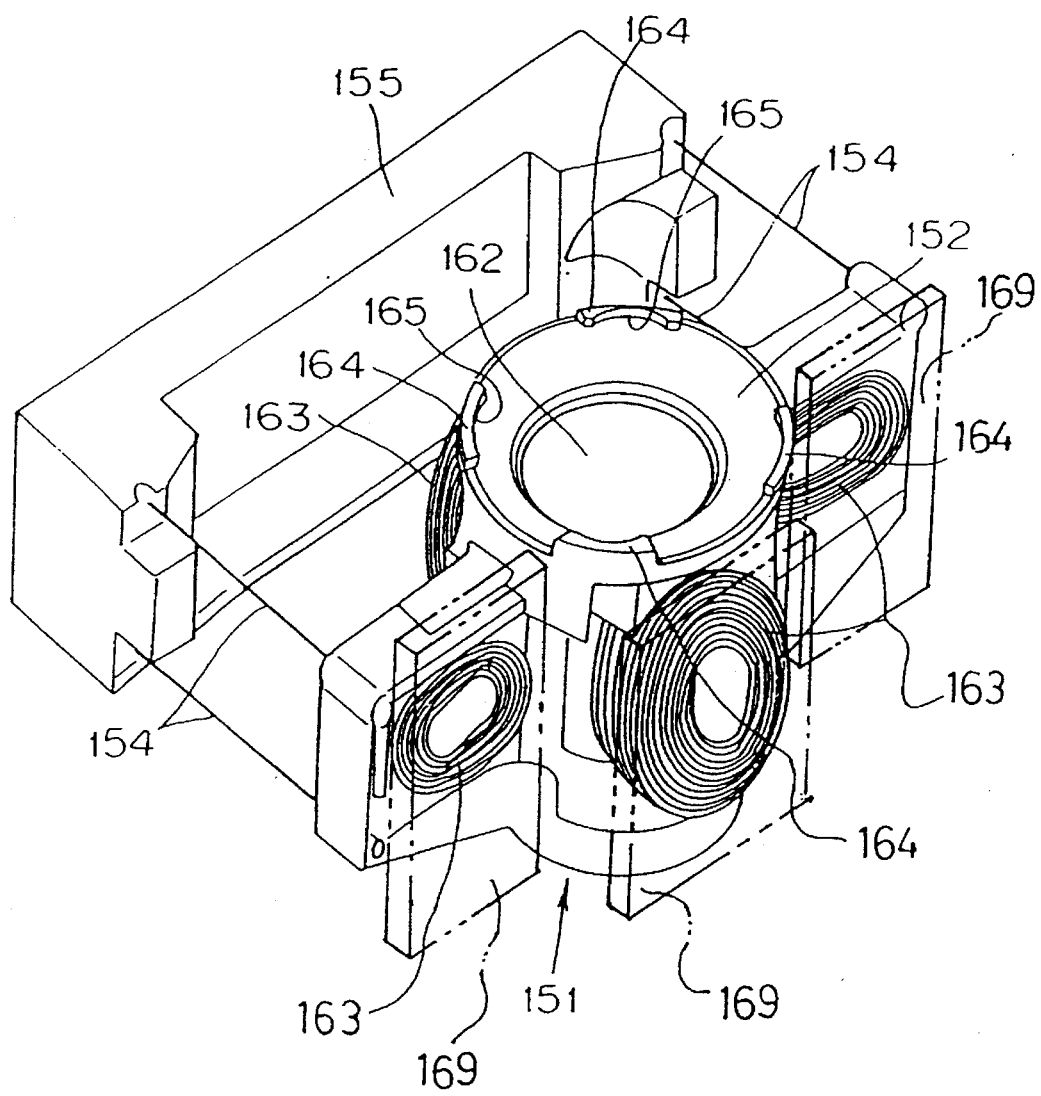
FIG. 14 is a perspective view of a lens holder.

FIG. 14 shows the lens holder 151, in which the supporting surface 152 on which the objective lens 150 is supported and the surroundings thereof are exaggerated.

The conical lens supporting surface 152 is made of a part of a cone whose apex is located on the center axis of the hole 162. The diameter of the conical supporting surface 152 decreases towards the lower end (inner end) thereof. There are four projections 164 which project upward from the outer peripheral edge (upper edge) of the supporting surface 152. The projections 164 are spaced at an equi-angular distance and are provided on inner surfaces thereof with recessed portions 165 which form adhesive reservoirs. The adhesive reservoirs 165 receive an excess amount of adhesive between the objective lens 150 and the supporting surface 152. Namely, if the adhesive expands when it sets, the excess adhesive can be absorbed by the adhesive reservoirs 165, so that no adhesive is discharged onto the lens surface of the objective lens 150.

The following discussion will be directed to the adjusting operation of the inclination of the objective lens 150 that is disposed on the lens holder 151, with reference to FIGS. 15 through 29.

Figure 15:
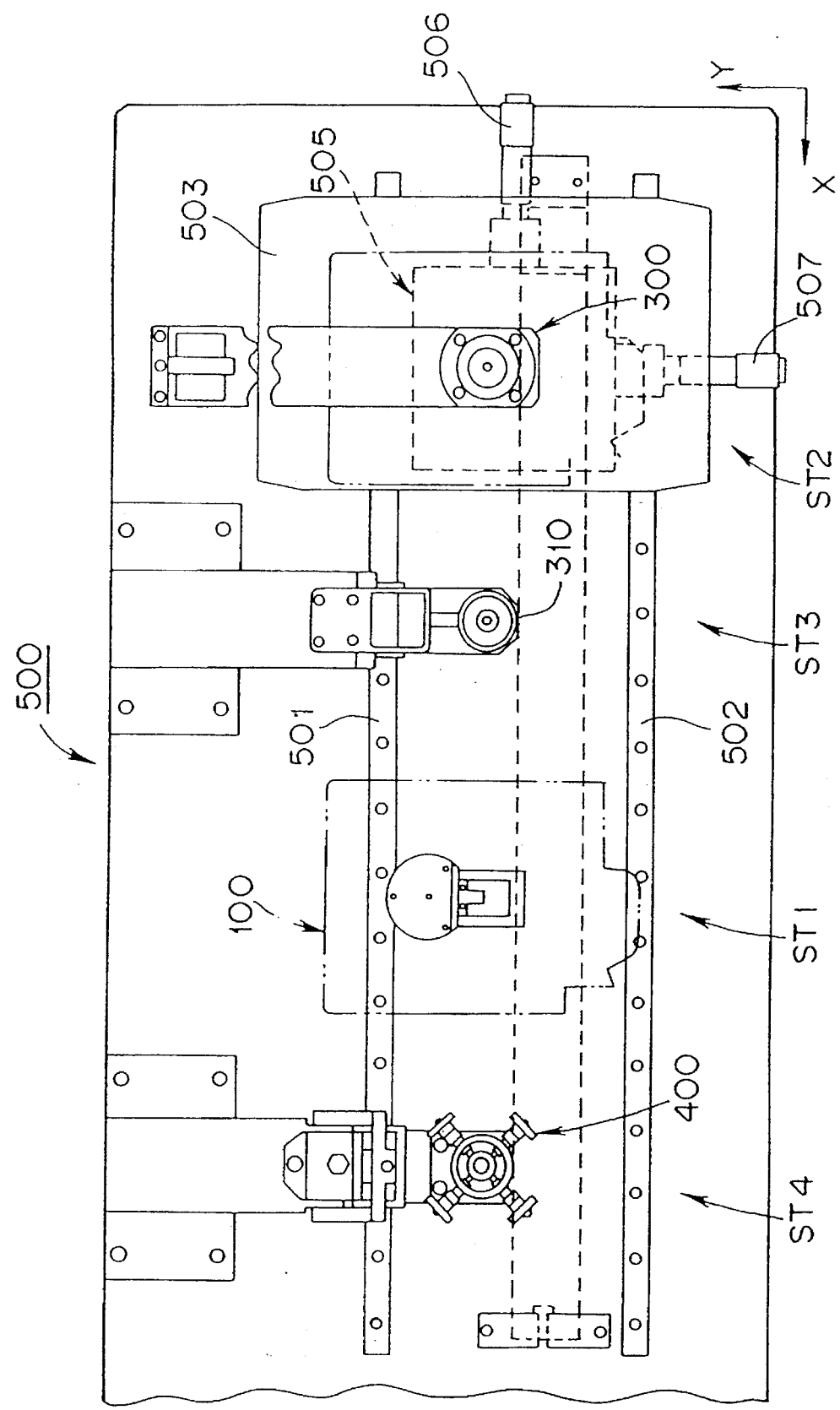
FIG. 15 is a schematic plan view of an optical disc apparatus mounting device.

FIG. 15 shows a plan view of the mounting apparatus 500 of the photo magnetic disc apparatus. The mounting apparatus 500 includes a pair of parallel guide members 501 and 502 on which a pallet 503 is slidably supported. The photo magnetic disc apparatus 100 is disposed on the pallet 503 at a first stage ST1.

Figure 16:
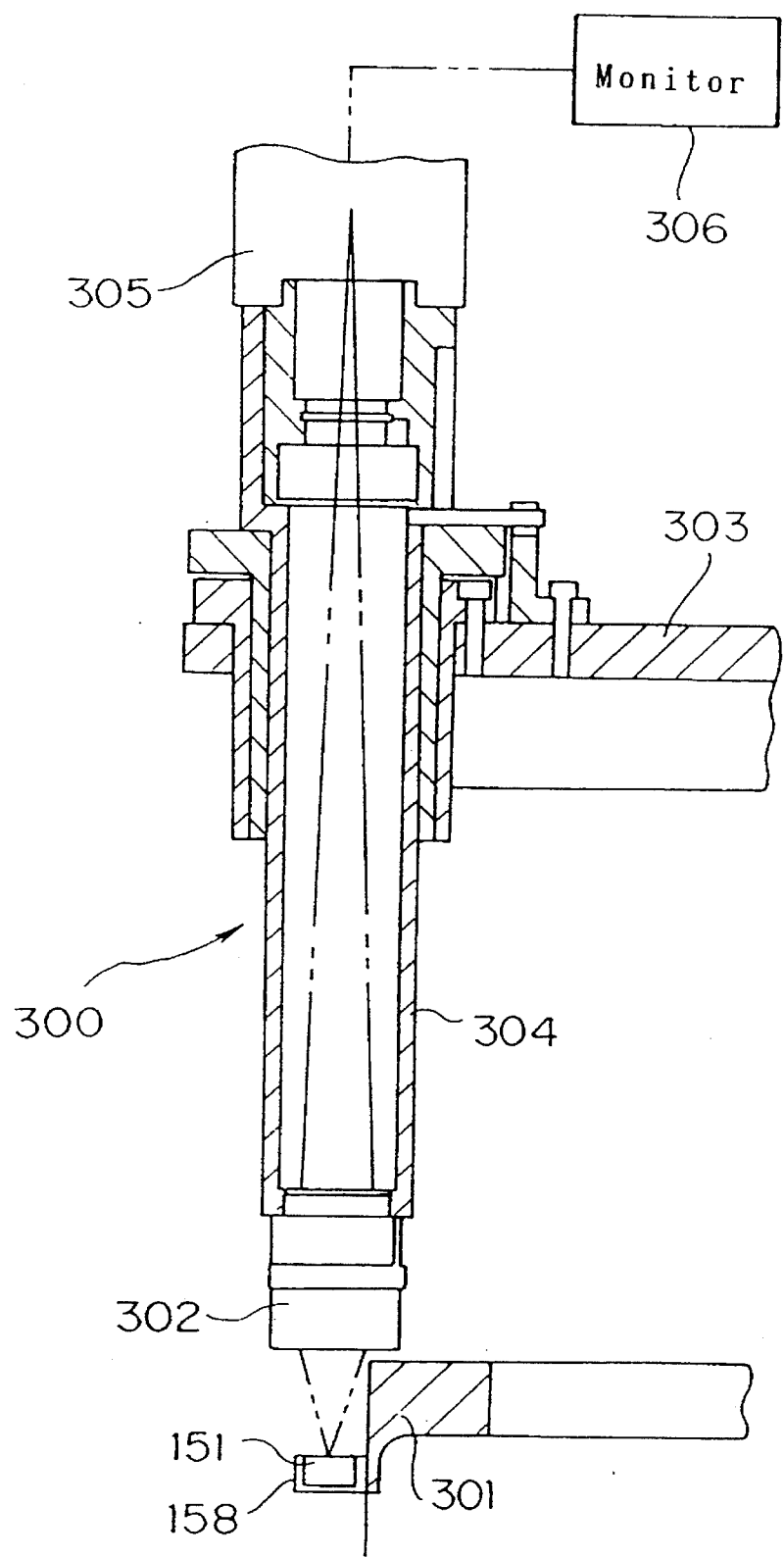
FIG. 16 is a sectional view of a positioning device.

Thereafter, the pallet 503 is transferred in the right direction in FIG. 15 and stopped at a second stage ST2 at which a positioning apparatus 300 is provided, as shown in FIG. 16. The positioning apparatus 300 is adapted to determine the position of the lens holder 151 with respect to the rails 161 (FIG. 13). The rails 161 extend in the left and right directions in FIG. 13. A stop 301 is provided on the mounting apparatus 500 to restrict the movement of the lens holder 151 with respect to the rails 161, so that the connecting member 158 abuts against the stop 301 to carry out the substantial positioning of the lens holder 151. Thereafter, a lock mechanism (not shown) is actuated to lock the focusing and tracking mechanism 160 to the rails 161, and the stop 301 is rotated upward to disconnect the same from the connecting member 158.

To confirm the positioning state, there is a microscopic objective lens 302 above the front end of the stop 301. The microscopic objective lens 302 is secured to the lower end of the cylindrical holder 304 mounted to a securing plate 303. The holder 304 is provided on the upper end thereof with a CCD camera 305 to which the monitor 306 is connected. If the image of the lens holder 151 does not concur with a mark which represents a predetermined position (i.e., reference position) of the lens holder in the monitor, the fine adjustment of the position of the photo magnetic disc apparatus 100 is carried out to adjust the lens holder 151 by a horizontal position adjusting mechanism 505 (FIG. 15) so as to make the image coincidental with the reference mark.

The horizontal position adjusting mechanism 505 is provided on the lower surface of the pallet 503 so as to move the photo magnetic disc apparatus 100 with respect to the pallet 503 in the X-axis direction parallel with the guide members 501 and 502 and the Y-axis directions perpendicular to the X-axis direction. Namely, when an X-axis adjusting knob 506 is rotated about the axis thereof, the fine adjustment of the photo magnetic disc apparatus 100 in the X-axis direction is effected, and when a Y-axis adjusting knob 507 is rotated about the axis thereof, the fine adjustment of the photo magnetic disc apparatus 100 in the Y-axis direction is effected, respectively.

Thereafter, the pallet 503 and, accordingly, the photo magnetic disc apparatus 100 is moved to the left (with respect to FIG. 15) along the guide members 501 and 502, and is stopped at a third stage ST3. At the third stage ST3, the objective lens 150 is disposed on the lens holder 151 by the lens feeding apparatus 310 which will be discussed below, and the adhesive is supplied between the lens holder 151 and the objective lens 150.

Figure 17:
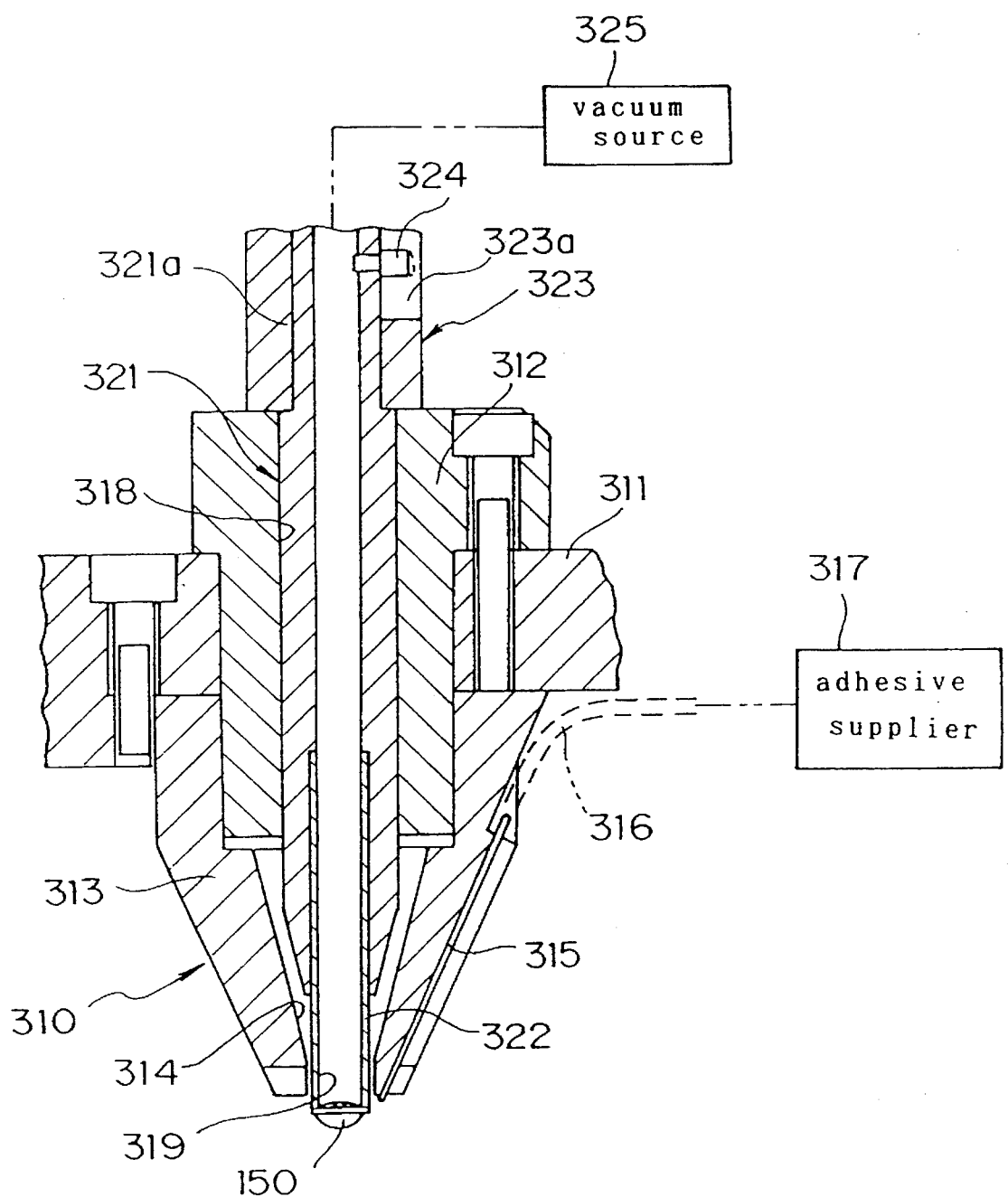
FIG. 17 is a sectional view of a lens feeding device.

FIG. 17 shows the lens feeder 310 provided at the third stage ST3.

A cylindrical bearing member 312 is secured to the securing plate 311 to project therefrom. The projecting end of the bearing member 312 from the securing plate 311 is fitted in the hollow conical guide member 313. The guide member 313 is provided with a inner conical surface 314. The guide member 313 is provided on the outer periphery thereof with four adhesive applying members 315 which are spaced at an equi-angular distance about the center axis of the guide member 313. Each of the adhesive applying members 315 is made of an elongated tube which is connected to an adhesive supplier 317 through a flexible tube 316. The adhesive supplier 317 is controlled to supply a predetermined amount of adhesive.

An insertion tube 321 having a sucking tube 322 at the front end thereof is slidably fitted in the inner wall surface 318 of the bearing member 312. The insertion tube 321 is connected to a vacuum source 325, so that the objective lens 150 can be held at and by the front end of the sucking tube 322 with the help of the vacuum. The base end 321a of the insertion tube 321 is slidably supported by and in a supporting pipe 323 which is provided with a guide groove 323a in which a bolt 324 secured to the base end 321a is engaged. Namely, the bolt 324 is guided in the guide groove 323a so that the insertion tube 321 is relatively movable with respect to the supporting tube 323 in the axial direction.

Figure 18:
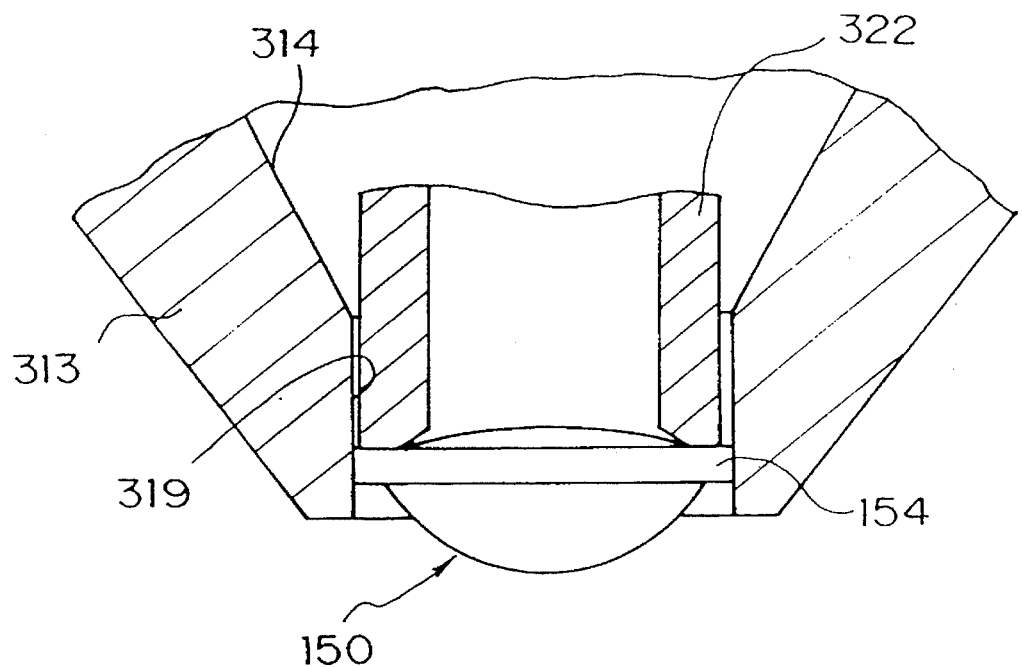
FIG. 18 is a schematic view of a guide mechanism having an oblique guide surface for an objective lens.
Figure 19:
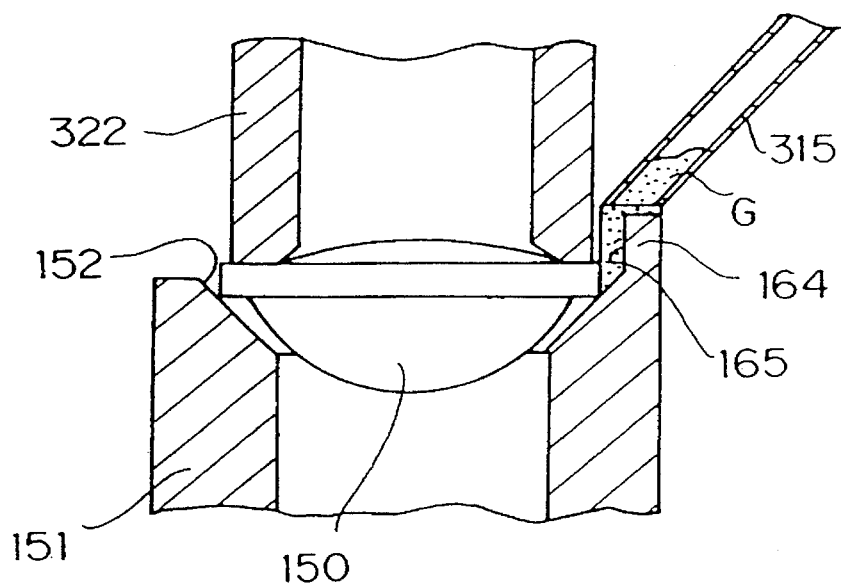
FIG. 19 is an explanatory view of an adhesive reservoir in which an adhesive is introduced by an adhesive application member.

The supporting tube 323, the insertion tube 321, and the sucking tube 322 are originally detached from the bearing member 312. In this state, the objective lens 150 is picked up at the front end of the sucking tube 322. When the objective lens 150 is held by the front end of the sucking tube 322, the insertion tube 321 and the sucking tube 322 are inserted in the bearing member 312 and the guide member 313. During the insertion, the outer peripheral surface 154 of the objective lens 150 is guided by the tapered surface 314 of the guide member 313 and the circular hole 319 at the front end thereof, as shown in FIG. 18. Consequently, the positioning of the objective lens 150 relative to the circular hole 319 in the radial direction, i.e., the centering of the objective lens 150 is executed. Further insertion of the insertion tube 321 and the sucking tube 322 causes the lower end of the supporting pipe 323 to come into contact with the upper end of the bearing member 312. Consequently, the front end of the sucking tube 322, and accordingly, the objective lens 150 project downward from the circular hole 319 of the guide member 313, as shown in FIG. 17.

Thereafter, the insertion tube 321 and the sucking tube 322 are moved downward with respect to the supporting pipe 323, the bearing member 312 and the guide member 313, so that the objective lens 150 is disposed on the supporting surface 152 of the lens holder 151. As soon as the vacuum supply to the insertion tube 321 and the sucking tube 322 is stopped, the sucking tube 322 is slightly separated from the objective lens 150. In this state, the front ends of the four adhesive applying members 315 are opposed to the center portions of the upper surfaces of the corresponding projections 164 of the lens holder 151. A predetermined amount of adhesive G is fed from the adhesive applying members 315 into the respective adhesive reservoirs 165 that are spaced at an equi-angular distance. It should be appreciated here that since the adhesive G is introduced in the adhesive reservoirs 165, the adhesive G can be uniformly applied to the outer peripheral edge of the objective lens 150 supported on the supporting surface 152 of the lens holder 151. In the illustrated embodiment, the adhesive G is an ultra violet setting type adhesive.

After the adhesive G has been applied, the insertion tube 321 and the sucking tube 322 are moved upward to come away from the objective lens 150 by a return spring (not shown) and are stopped at a position away from the objective lens 150.

Thereafter, at a fourth stage ST4, the inclination of the objective lens 150 is adjusted, and the adhesive G is set to secure the objective lens 150 to the lens holder 151. The adjustment of the inclination of the objective lens 150 will be discussed below with reference to FIGS. 20 and 21 which show flow charts of the adjusting operation.

Figure 24:
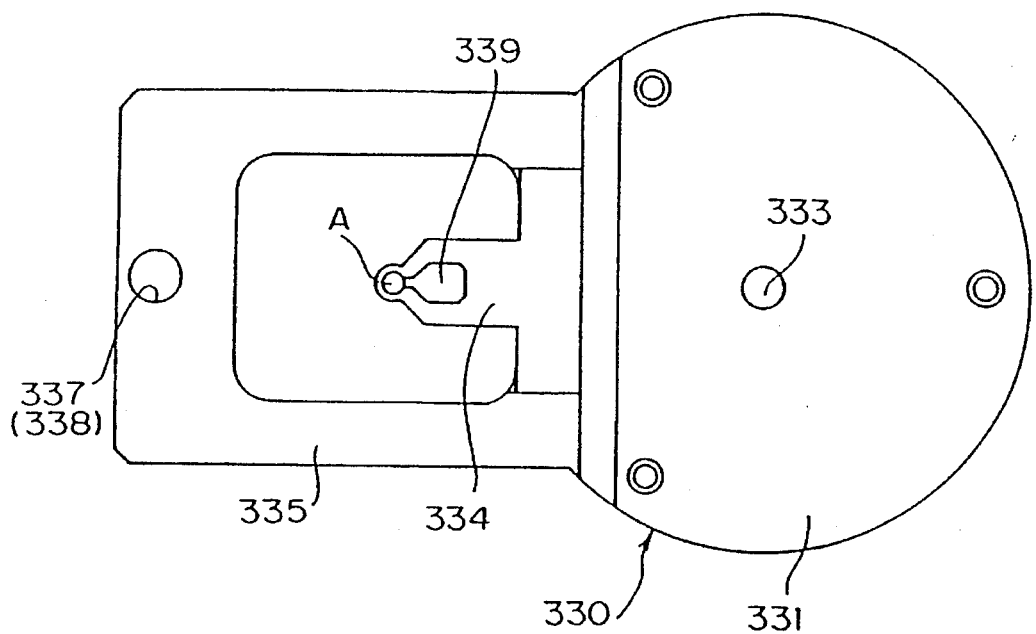
FIG. 24 is a plan view of an inserting member.
Figure 25:
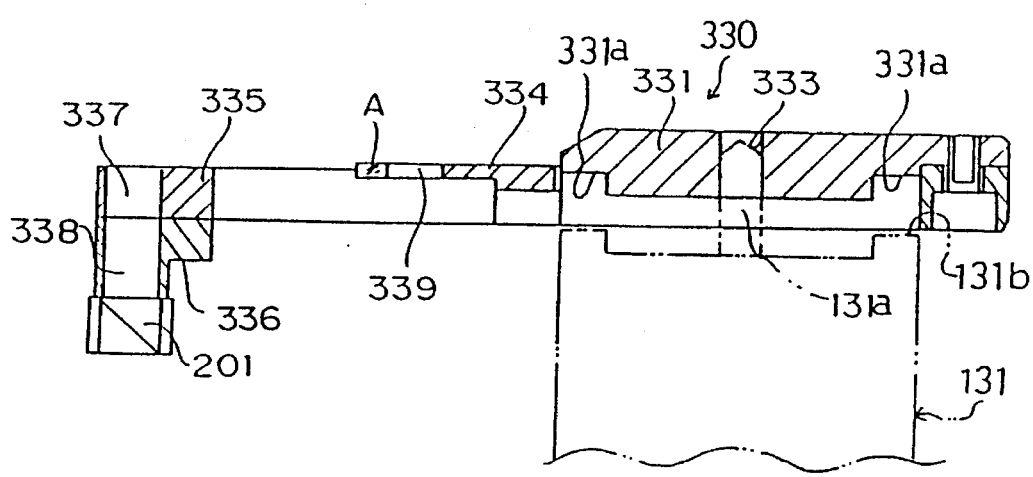
FIG. 25 is a sectional view of an inserting member.
Figure 26:
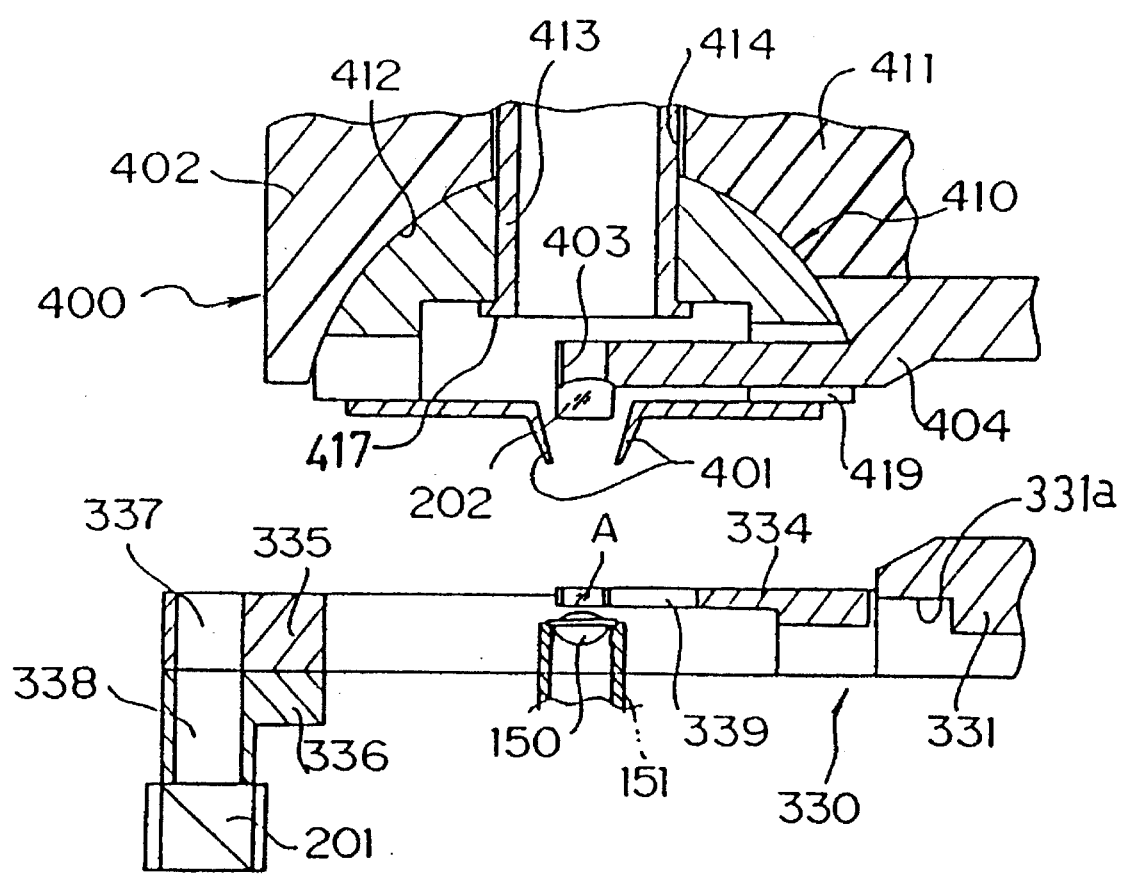
FIG. 26 is a sectional view of an inclination adjusting apparatus in an initial position.
Figure 27:
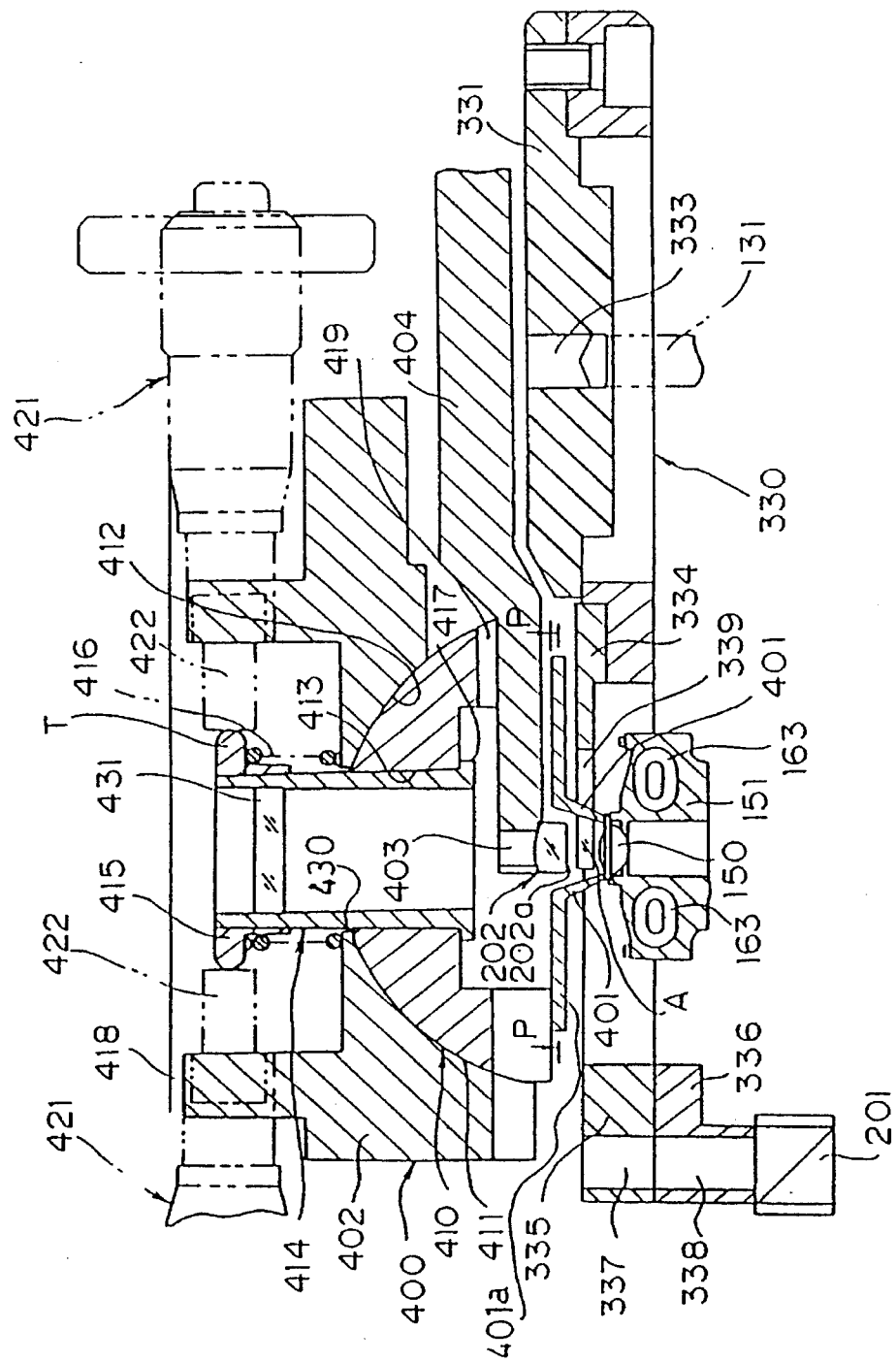
FIG. 27 is a sectional view of an inclination adjusting apparatus in an operative position in which the inclination of an objective lens is adjusted.

At step S10, an insertion member 330, as shown in FIGS. 24 and 25 is attached to the photo magnetic disc apparatus 100 which has been transferred again to the first stage ST1 after the operation at the third stage ST3 has been completed (FIGS. 26 and 27).

The insertion member 330 has a cylindrical body 331 which is provided on the center portion thereof with a center hole 333 in which an output shaft 131a of a spindle motor 131 is fitted. A first arm 334 projects from the cylindrical body 331 in the radial direction. The glass cover "A" is attached to the front end of the first arm 334. In the insertion member 330, a contacting surface 331a of the cylindrical body 331 abuts a contacting surface 131b of the spindle motor 131 to make the glass cover "A" parallel to a reference surface (i.e., the contacting surface 131b). The contacting surface 131b is arranged parallel to the photo magnetic disc K.

A second arm 335 which is in the form of a rectangle to surround the first arm 334 as viewed from above is provided on the front end thereof with a supporting portion 336 which extends downward therefrom. The insertion prism 201 is attached to the supporting portion 336. Namely, the insertion prism 201 is located below the glass cover "A". Note that the front end of the second arm 335 and the supporting portion 336 have holes 337 and 338 through which light reflected by the insertion prism 201 passes, respectively. The first arm 334 is provided with an opening 339 through which the inclination adjusting pawl 401 can extend.

At step S11, the photo magnetic disc apparatus 100 is conveyed to the fourth stage ST4 where the inclination adjusting apparatus 400 is provided. The inclination adjusting apparatus 400 which is adapted to adjust the inclination of the objective lens 150 with respect to the glass cover "A" includes the hemispherical lens 202 and the inclination adjusting pawls 401. In the state shown in FIG. 27, the flat surface portion 202a of the hemispherical lens 202 is parallel with the glass cover "A". Note that the inclination adjusting apparatus 400 will be discussed hereinafter.

The photo magnetic disc apparatus 100 is secured at a predetermined position underneath the inclination adjusting apparatus 400. The inclination adjusting apparatus 400 which has been originally located above and away from the objective lens 150, as shown in FIG. 26, is moved down at step S12 to a position close to the objective lens 150, as shown in FIG. 27. In this state, the positioning of the hemispherical lens 202 in the axis direction is executed, and the inclination adjusting pawls 401 are located close to the objective lens 150.

At step S13, the fine adjustment of the objective lens 150 in the optical axis direction (Z-axis direction) thereof is effected so that the image point (FIG. 4) indicated in the alignment detector 215 (FIG. 1) and the image point D indicated in the image point viewing portion 214 are clear spot images, i.e., the convergence point of the objective lens 150 is located on the flat surface portion 202a of the hemispherical lens 202. This fine adjustment is carried out by controlling the activation of the solenoid coils 163 (FIG. 14) to move the objective lens 150 only or moving the whole photo magnetic disc apparatus 100 by a driver (not shown), while observing the monitors of the alignment detector 215 and the image point viewing portion 214. The fine adjustment of the objective lens 150 can be replaced with the fine adjustment of the hemispherical lens 202 in the optical axis direction.

At step S14, the fine adjustment of the objective lens 150 in the direction normal to the optical axis is carried out so that the convergence point of the objective lens 150 concurs with the center of curvature of the spherical surface portion 202b of the hemispherical lens 202, while observing the interference fringes B and the image points C and D (FIG. 3) displayed in the monitors of the interference fringe viewing portion 205, the image point viewing portion 214, and the alignment detector 215, respectively. Namely, the fine adjustment causes the image point C to move close to the image point D. This fine adjustment is effected by the slight displacement of the photo magnetic disc apparatus 100 in the X-axis direction and the Y-axis direction by the horizontal position adjusting mechanism 505. As a result, an appropriate number of tilt fringes (for example, three tilt fringes) and the coma are added to the interference fringes B, so that the distortion of the interference fringes, i.e., the coma can be easily and clearly viewed. It is alternatively possible to execute a fine adjustment of the hemispherical lens 202 in the X-axis direction and Y-axis direction, instead of the fine adjustment of the objective lens 150.

At step S15, the tilt fringe(s) of an optional direction indicated in the monitor of the interference fringe viewing portion 205 is (or are) selected and observed to measure the degree of the coma contained in the light emitted from the objective lens 150. If the degree of the coma is not within an allowable limit, i.e., if the magnitude of the distortion of the interference fringes B is above a predetermined value, it is determined that the inclination of the objective lens 150 with respect to the glass cover "A" is too large. Consequently, the inclination of the objective lens 150 is adjusted by the inclination adjusting apparatus 400 in steps subsequent to step S20. Conversely, if the coma is within the allowable limit, no adjustment of the inclination of the objective lens 150 is carried out, and the control proceeds to step S26.

The structure of the inclination adjusting apparatus 400 will be described below, referring to FIGS. 27 through 29.

There is a hemispherical lens holder 404 provided on the lower surface of the body 402 of the inclination adjusting apparatus 400. The hemispherical lens holder 404 is provided on the front end thereof with the vertically extending hole 403. The hemispherical lens 202 is secured to the lower end of the hole 403.

Figure 28:
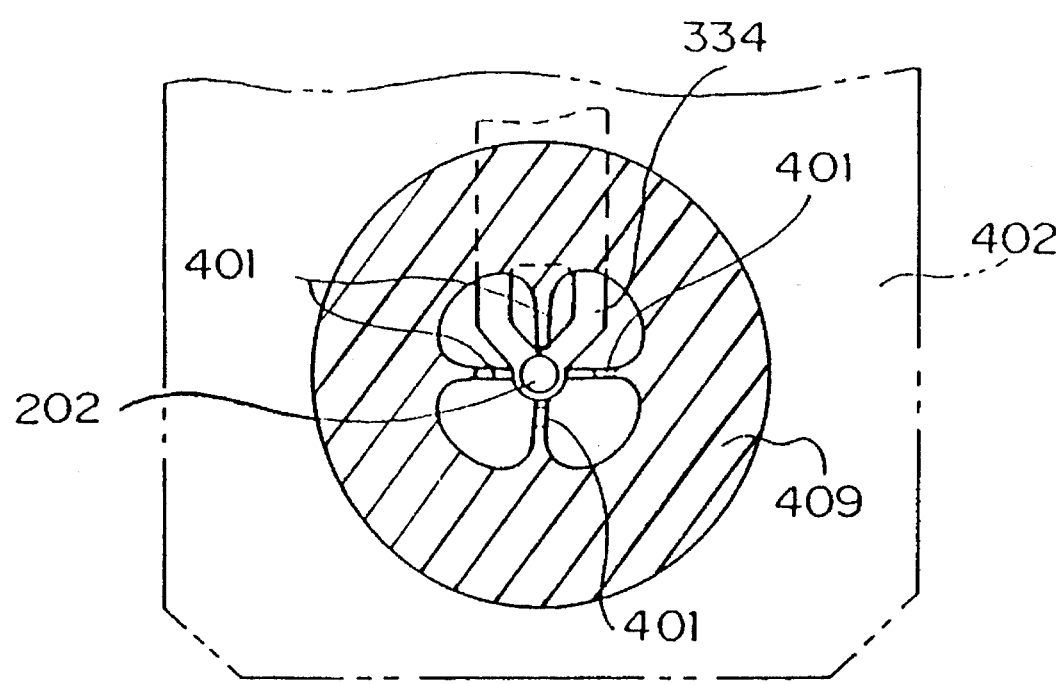
FIG. 28 is a sectional view taken along the line P—P in FIG. 27.

As can be seen in FIG. 28, the four adjusting pawls 401 are formed by cutting the center portion of the circular disc plate 409 into a predetermined shape. The adjusting pawls 401 extend in the radial directions. The circular disc plate 409 is attached to the lower surface of a hemispherical rotatable member 410. The center of the circular disc 409 is located within the hemispherical lens 202. The adjusting pawls 401 are spaced at an equi-angular distance of 90 degrees, and are bent at the front ends thereof to project below the level of the hemispherical lens 202. The front ends of the adjusting pawls 401 extend to the vicinity of the center of curvature of the hemispherical outer peripheral surface of the rotatable member 410, so that the front ends are located below the level of the lower surface of the glass cover "A" upon adjustment of the inclination of the objective lens 150, as shown in FIG. 27.

One of the four adjusting pawls 401 is located within the opening 339 of the first arm 334. The rotatable member 410 is provided with a cut-away portion 419 which prevents the hemispherical lens holder 404 from interfering with the rotatable member 410.

The hemispherical outer peripheral surface 411 of the rotatable member 410 is slidably supported in and by the hemispherical recess 412 formed on the lower surface of the body 402. The center of curvature of the hemispherical outer peripheral surface 411 and the corresponding hemispherical recess 412 is located on the optical axis of the objective lens 150 in the vicinity of the center of rotation C1 of the objective lens 150 (FIG. 11). Namely, the center of rotation of the rotatable member 410 is located in the vicinity of the center of rotation C1 (FIG. 11) of the objective lens 150, the center of rotation C1 being located on the optical axis of the objective lens 150.

The rotatable member 410 is provided with a vertically extending connecting hole 413 in which a hollow cylindrical operation shaft 414 is fitted. The operation shaft 414 is provided on the lower end thereof with a flange 417 whose diameter is larger than the diameter of the connecting hole 413, so that the flange 417 comes into surface contact with the lower surface of the rotatable member 410. The operation shaft 414 projects upward from the connecting hole 413 and extends through a passage 430 formed on the body 402. An annular pressing member 415 is fitted to the upper end of the operation shaft 414. Between the pressing member 415 and the body 402 is provided a spring 416 which continuously biases the rotatable member 410 upwardly through the pressing member 415.

The operation shaft 414 is provided therein with a parallel plate (transparent glass) 431 which is in parallel with a reference surface of the adjusting pawls 401. The parallel plate 431 is adapted to confirm an initial position of the inclination of the adjusting pawls 401 at step S12 in the inclination adjusting operation of the objective lens 150.

There are four microadjusters 421 screwed in the cylindrical wall 418 provided on the upper end of the body 411 to surround the pressing member 415. A spindle 422 of each microadjuster 421 extends inward through a cylindrical wall 418 to abut against the outer peripheral surface of the pressing member 415. The rotation of the microadjusters 421 about the respective axes causes the handles to move in the respective axial directions to vary the length of the inward projection of the microadjusters 421 from the cylindrical wall 418. Consequently, the pressing member 415 can be displaced in the horizontal direction by decreasing the length of projection of two of the microadjusters 421 and increasing the length of projection of the remaining two microadjusters 421, so that the operation shaft 414 is inclined to rotate the rotatable member 410. The rotation of the rotatable member 410 varies the inclination of the adjusting pawls 401 to adjust the inclination of the objective lens 150, as will be discussed hereinafter.

The distance between the center of rotation of the rotatable member 410 and the contact portions T of the microadjusters 421 and the pressing member 415 is larger than (for example, about ten times) the distance between the center of rotation C1 of the objective lens 150 and the supporting surface 152 (FIG. 11). Consequently, when the axial displacement of the microadjusters 421 caused by the rotation thereof takes place, the displacement of the objective lens 150 is about one-tenth (1/10) the displacement of the handles 421. Thus, the fine adjustment of the inclination of the objective lens 150 can be accurately effected by the microadjusters 421.

Figure 29:
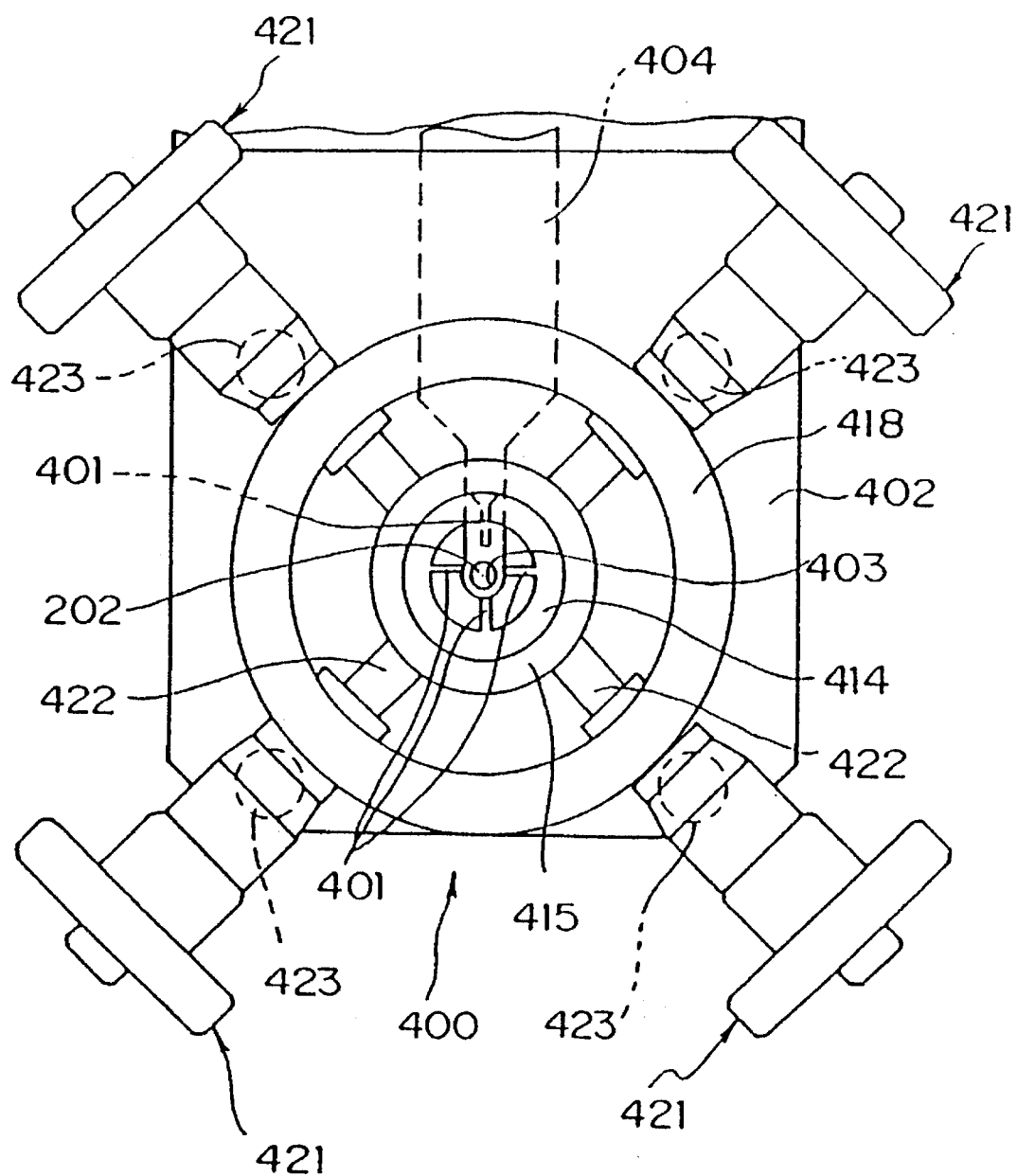
FIG. 29 is a plan view of an inclination adjusting apparatus.

As may be seen in FIG. 29, there are springs 423 within the body 402 to correspond to the microadjusters 421. The springs 423 abut at one end thereof, for example, against the outer peripheral surface of the circular disc 409, and abut at the other ends thereof against the upper portion of the body 402, respectively. The rotatable member 410 is continuously biased upwards by the springs 423, so that the rotatable member 410 can be stably held in the inclined state.

Turning back to FIGS. 20 and 21, the inclination of the objective lens 150 is carried out as follows.

At step S20, the inclination adjusting apparatus 400 slightly descends until the adjusting pawls 401 come into contact with the outer peripheral edge of the objective lens 150. At step S21, the microadjusters 421 are rotated to rotate the rotatable member 410 to thereby incline the adjusting pawls 401. The direction and degree of the inclination of the adjusting pawls 401 are determined in accordance with the interference fringes B viewed at step S20. Namely, if it is detected from the interference fringes B that the coma appears inclined, for example, at 45 degrees from the X-axis direction in the horizontal plane, the adjusting pawls 401 are inclined in that direction. As a result, the objective lens 150 is displaced along the supporting surface 152 to vary the contact portion of the objective lens 150 with the supporting surface 152 to thereby adjust the inclination of the objective lens 150. At step S22, a slight upward movement of the inclination adjusting apparatus 400 takes place to move the adjusting pawls 401 away from the objective lens 150.

At step S21, the convergence point C2 of the objective lens 150 is displaced as a result of the inclination of the objective lens 150, as mentioned above with reference to FIG. 11. Consequently, the number of the tilt fringes of the interference fringes B is increased. The increase in the number of the tilt fringes may make it difficult for an operator to determine the degree of coma. Thereafter, at step S22.5, the number of the tilt fringes of the interference fringes B is checked to see if the number is too large to measure the coma. If the number is too large, the photo magnetic disc apparatus 100, and accordingly, the objective lens 150 are moved in the direction to reduce the number of the tilt fringes (step S23), i.e., in the direction opposite to the direction of the inclination of the adjusting pawls 401 at step S21 by actuating the horizontal position adjusting mechanism 505. Alternatively, it is possible to move the hemispherical lens 202. If the number is not too large, the operation proceeds directly to step S24. At step S24, the direction of the maximum coma is detected by the fine adjustment of the horizontal position adjusting mechanism 505 to check whether or not the coma is still present.

At step S25, whether or not the coma is within the allowable limit is checked, similar to step S15. If the coma is not within the allowable limit, the operations at steps S20 through S24 are performed again.

Consequently, if the coma is attenuated to be within the allowable limit, the control proceeds to step S26 at which the periphery of the objective lens 150 is illuminated with the ultra violet radiation to set the adhesive G. As a result, the objective lens 150 is secured to the supporting surface 152 of the lens holder 151.

At step S27, the inclination adjusting apparatus 400 and the hemispherical lens holder 404 are moved upward to retract the inclination adjusting pawls 401 from the objective lens 150. Namely, the inclination adjusting apparatus 400 is returned to the initial position shown in FIG. 26. At step S28, the four handles 421 are rotated to adjust the adjusting pawls 401 whose inclination is returned to the reference position, i.e., the position in which reference plate 401a, which is integral with adjusting pawls 401, is parallel to the contacting surface 131b of the spindle motor 131 (FIG. 25). In the course of the adjustment of the reference plate 401a, the laser beam is emitted towards the parallel plate 431, so that the laser beam reflected by the parallel plate 431 is made coincident with the reference mark provided in the monitor. In this state, the parallel plate 431 and the adjusting pawl reference plate 401a are parallel with the contacting surface 131b and the glass cover "A".

Thereafter, at step S29, the photo magnetic disc apparatus 100 is returned to the initial position, i.e., the first stage ST1. At step S30, the insertion member 330, and accordingly, the glass cover "A" and the insertion prism 201 are removed from the photo magnetic disc apparatus 100. Thereafter, at step S31, the photo magnetic disc apparatus 100 is removed from the optical disc apparatus mounting apparatus 500. Thus, the adjustment of the inclination of the objective lens 150 of the photo magnetic disc apparatus 100 is completed.

Figure 20:
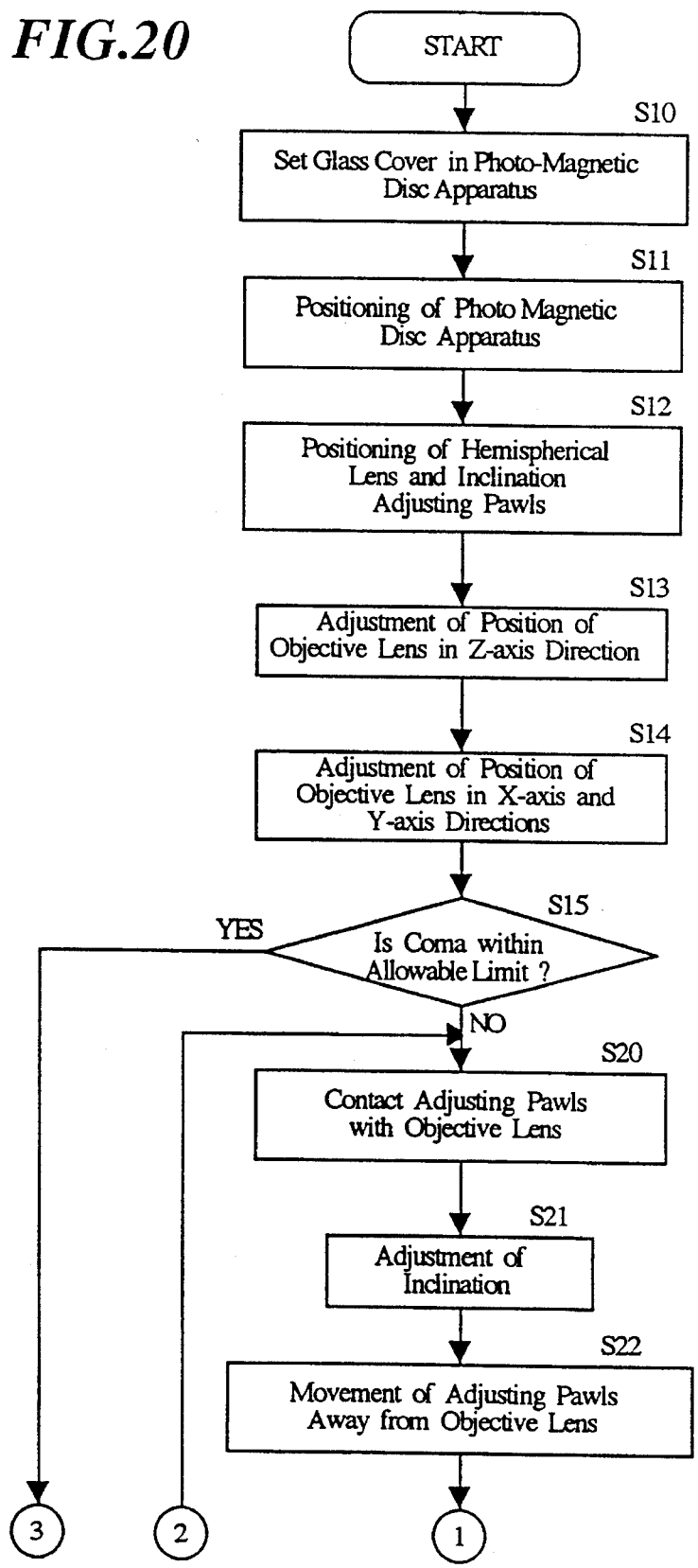
FIGS. 20 and 21 are flow charts of an inclination adjusting operation.
Figure 21:
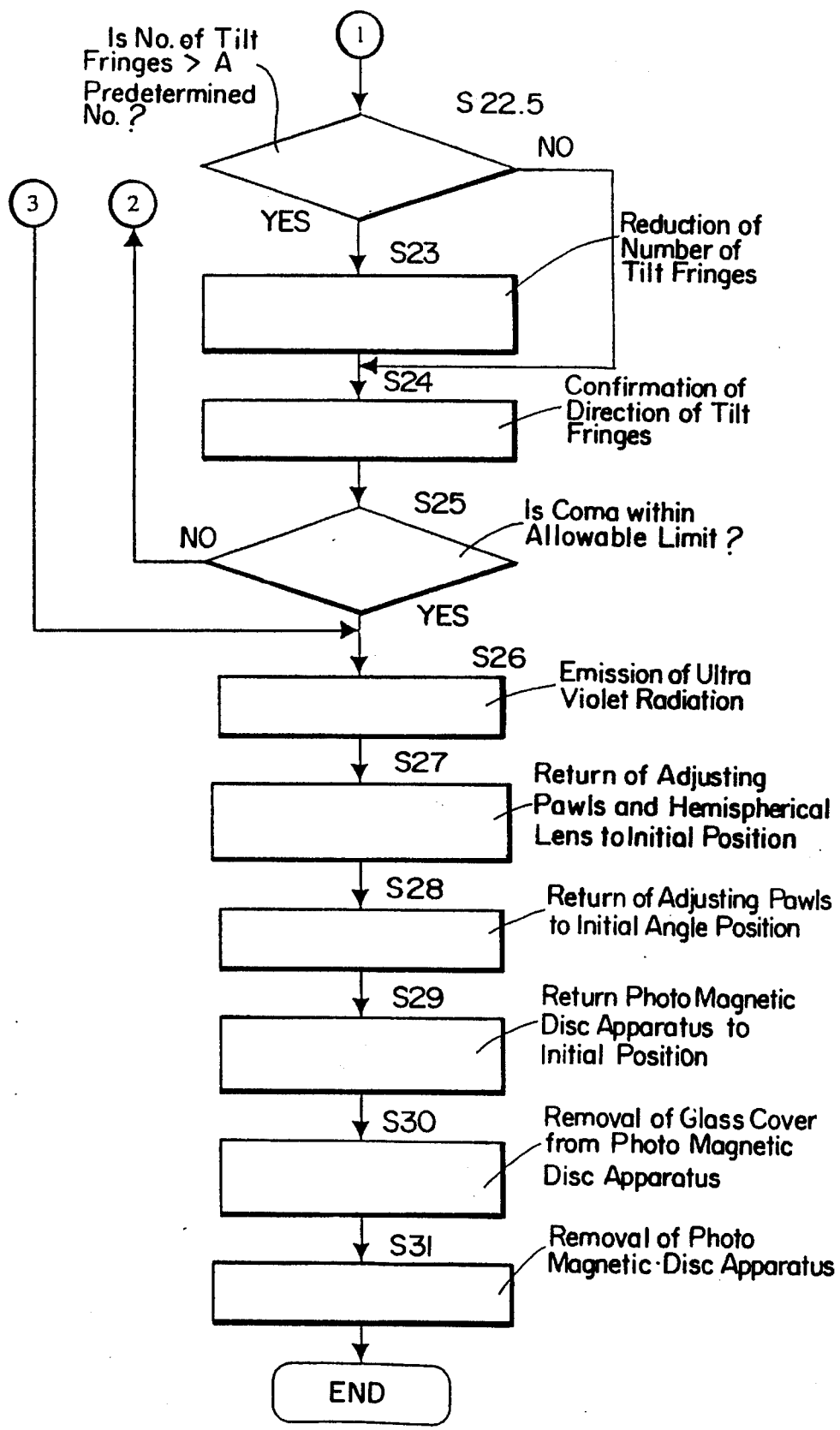

As can be understood from the foregoing, according to the inclination adjusting method as shown in FIGS. 20 and 21, the inclination of the objective lens 150 with respect to the lens holder 151 can be easily and accurately adjusted since the adjustment of 150 is carried out on a real-time basis while the variation of the coma is being observed. Moreover, although the inclination detecting apparatus 200 (FIG. 1) according to the first embodiment is used to effect the inclination method, the adjusting method can be equally applied also to the inclination detecting apparatuses shown in the second through sixth embodiments.

Figure 30:
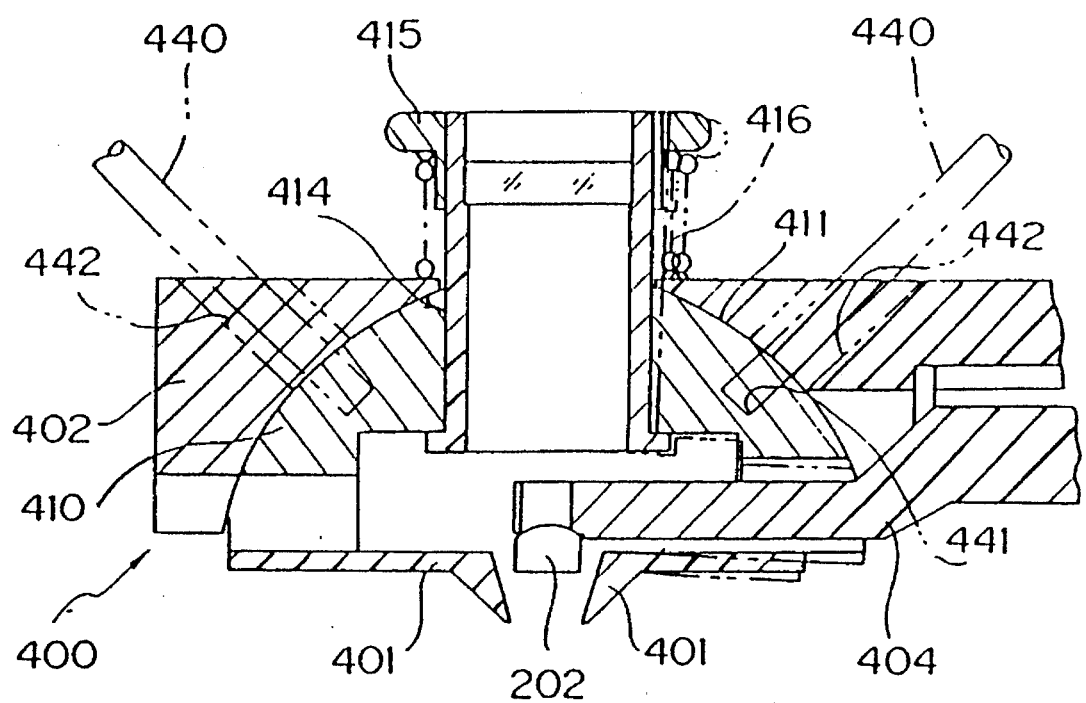
FIG. 30 is a sectional view of another embodiment of an inclination adjusting apparatus.

FIG. 30 shows another embodiment of the inclination adjusting apparatus 400.

In this embodiment, the microadjusters 421 shown in FIG. 27 are replaced with sticks 440 which extend in the radial directions of the rotatable member 410. The sticks 440 are secured at the lower ends thereof to corresponding holes 441 formed in the hemispherical outer surface 411 of the rotatable member 410. The body 402 is provided with openings 442 through which the sticks 440 extend. The sticks 440 project outward from the openings 442 of the body 402. The diameter of the openings 442 is larger than the diameter of the sticks 440, so that the sticks 442 are movable (swingable) within the respective openings 440 about the center of curvature of the rotatable member 410. The remaining structure of the apparatus shown in FIG. 30 is the same as that shown in FIG. 27.

In the embodiment illustrated in FIG. 27, the rotatable member 410 is rotated when the microadjusters 421 are selectively rotated to vary the projection length of the spindle 422 thereof, as mentioned above. Consequently, if the direction in which the objective lens 150 is to be inclined to eliminate the coma is identical to the axial direction of none of the four microadjusters 421, it is necessary to actuate all the microadjusters 421 in combination to thereby incline the rotatable member 410 in the desired direction.

In the embodiment illustrated in FIG. 30, the sticks 440 are selectively inclined in the direction in which the rotatable member 410 is to be rotated. Namely, the sticks 440 allow for a more precise and easier adjustment than the microadjusters 421, since the rotatable member 410 is directly rotated.

Figure 31:
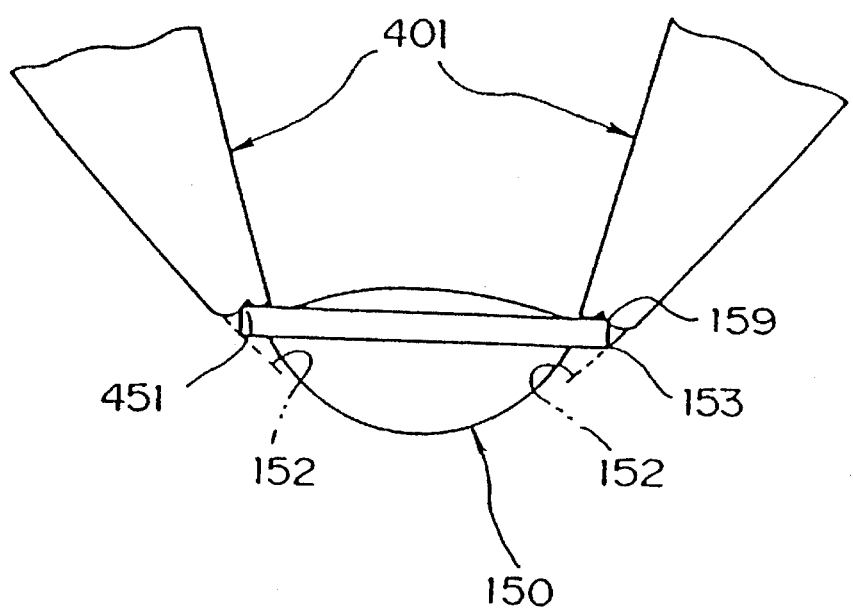
FIG. 31 is a view of another example of inclination adjusting pawls.

FIG. 31 shows another embodiment of the adjusting pawls 401 whose front ends are different in shape from those in FIGS. 26 and 27.

In the arrangement shown in FIG. 31, the adjusting pawls 401 are provided on the front ends thereof with recesses (notches) 451 in which the upper corner or edge portion 159 of the objective lens 150 is engaged. When the objective lens 150 is pressed by the adjusting pawls 401 to move the lens holder 151 downward, the objective lens 150 tends to laterally slide. However, the engagement of the upper corner edge 159 in the recesses 451 prevents the objective lens 150 from moving in the transverse direction. Consequently, it is ensured that a smooth inclination of the objective lens 150 takes place and the lens holder 151 is returned to the initial position by the restoring force of the spring 154.

Figure 32:
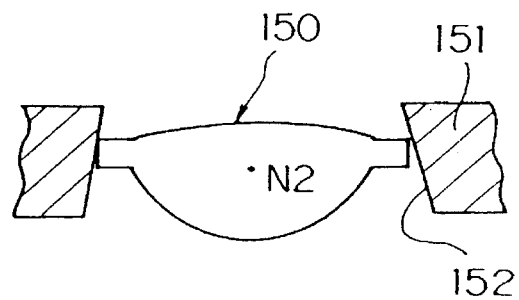
FIGS. 32, 33 and 34 are schematic views of three different examples of an objective lens.
Figure 33:
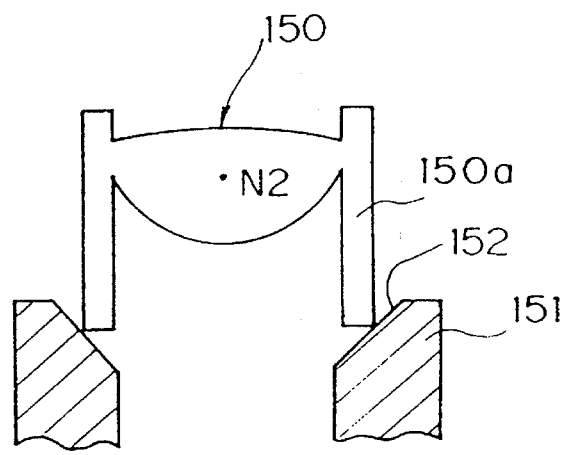
Figure 34:
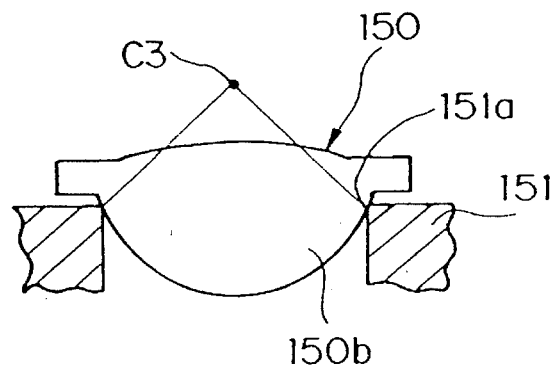

FIGS. 32 through 34 show different examples of the objective lens 150 and the lens holders 151.

As mentioned above, in the embodiment shown in FIG. 11, the objective lens 150 is supported on the tapered supporting surface 152 of the lens holder 151. Consequently, the center of rotation of the objective lens 150 is located at a level higher than the objective lens 150 during the adjustment of the inclination of the objective lens 150. Therefore, the inclination of the objective lens 150 causes the convergence point C2 to move, thus resulting in the occurrence of the deviation ϵ of the image point. This results in an increase in the number of the interference fringes B. One of the solutions to such a deviation of the image point is to provide a conical supporting surface 152 which expands downward (i.e., in the direction opposite to the convergence point of the objective lens 150), as shown in FIG. 32. Namely, the diameter of the conical supporting surface 152 increases towards the lower end thereof. In the arrangement shown in FIG. 32, the center of rotation of the objective lens 150 is located in the vicinity of the rear principal point N2 of the objective lens 150. Note that, in the modification shown in FIG. 32, it is necessary to always suck the objective lens 150 from the upper side thereof, for example, by the use of vacuum in the course of the inclination adjustment of the objective lens.

Also, in another solution shown in FIG. 33, the center of rotation of the objective lens 150 is located in the vicinity of the rear principal point N2 of the objective lens 150. Namely, in FIG. 33, the supporting surface 152 of the lens holder 151 is defined by a conical surface which expands towards the upper end thereof (i.e., towards the convergence point of the objective lens), similar to the supporting surface shown in FIG. 11. The difference between the arrangements shown in FIG. 11 and FIG. 33 resides in the annular or cylindrical holding ring 150a provided on the peripheral edge of the objective lens 150 and having a center located on the optical axis of the objective lens 150 in FIG. 33. The lower end of the holding ring 150a is supported on and by the supporting surface 152 of the lens holder 151. The objective lens 150 with the holding ring 150a is integrally made of a plastic lens which is molded, for example, in an injection molding process.

FIG. 34 shows a modified embodiment of the objective lens 150. The objective lens 150 shown in FIG. 34 has a lower surface 150b which is supported on and by a tapered inner peripheral edge 151a of the lens holder 151. In this arrangement, it is impossible to incline (or rotate) the objective lens 150 about the rear principal point N2 of the objective lens 150, but the center of rotation C3 of the objective lens is located closer to the rear principal point N2 than the embodiment shown in FIG. 11.

Figure 22:
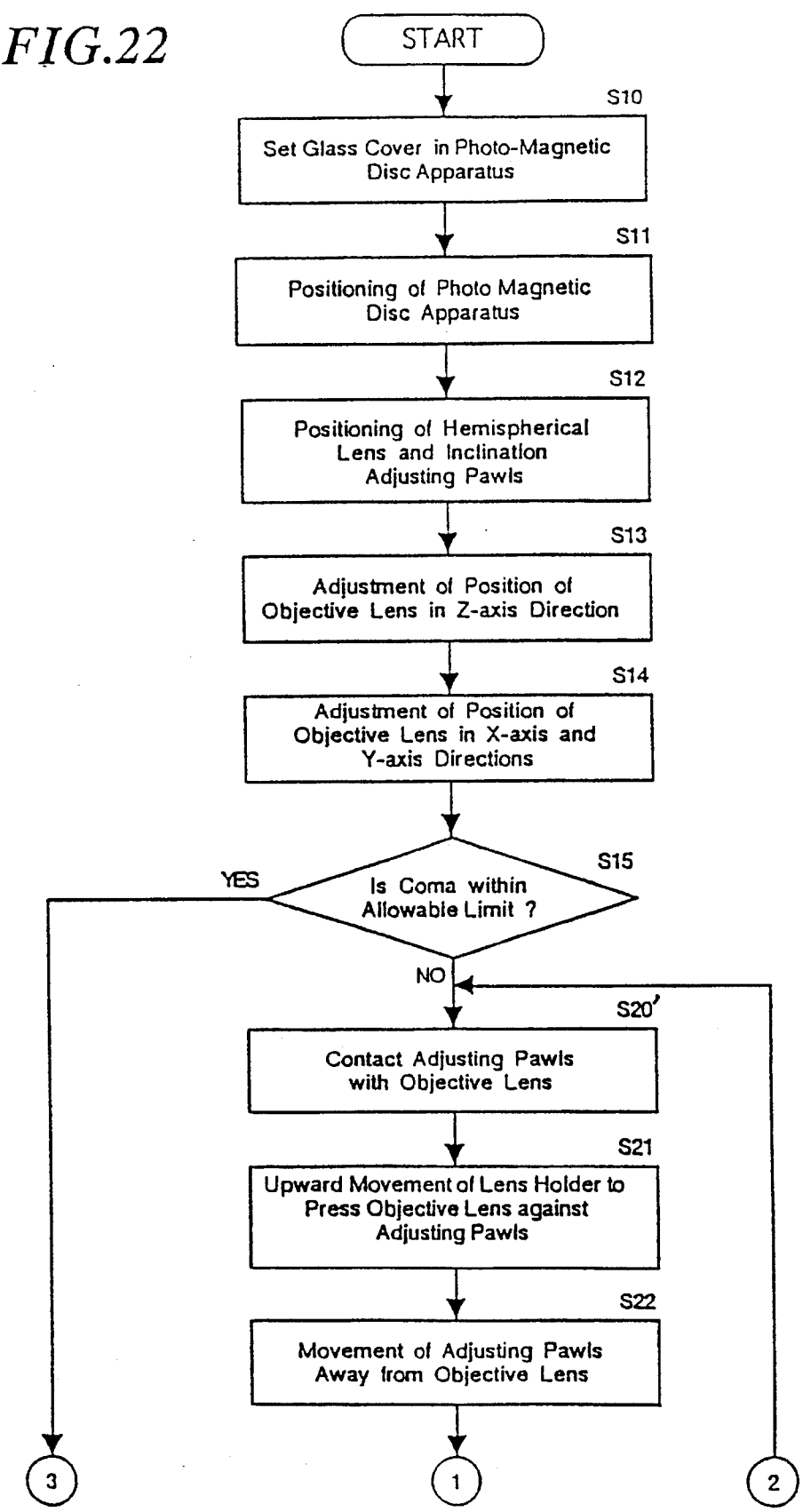
FIGS. 22 and 23 are flow charts of another inclination adjusting operation.
Figure 23:
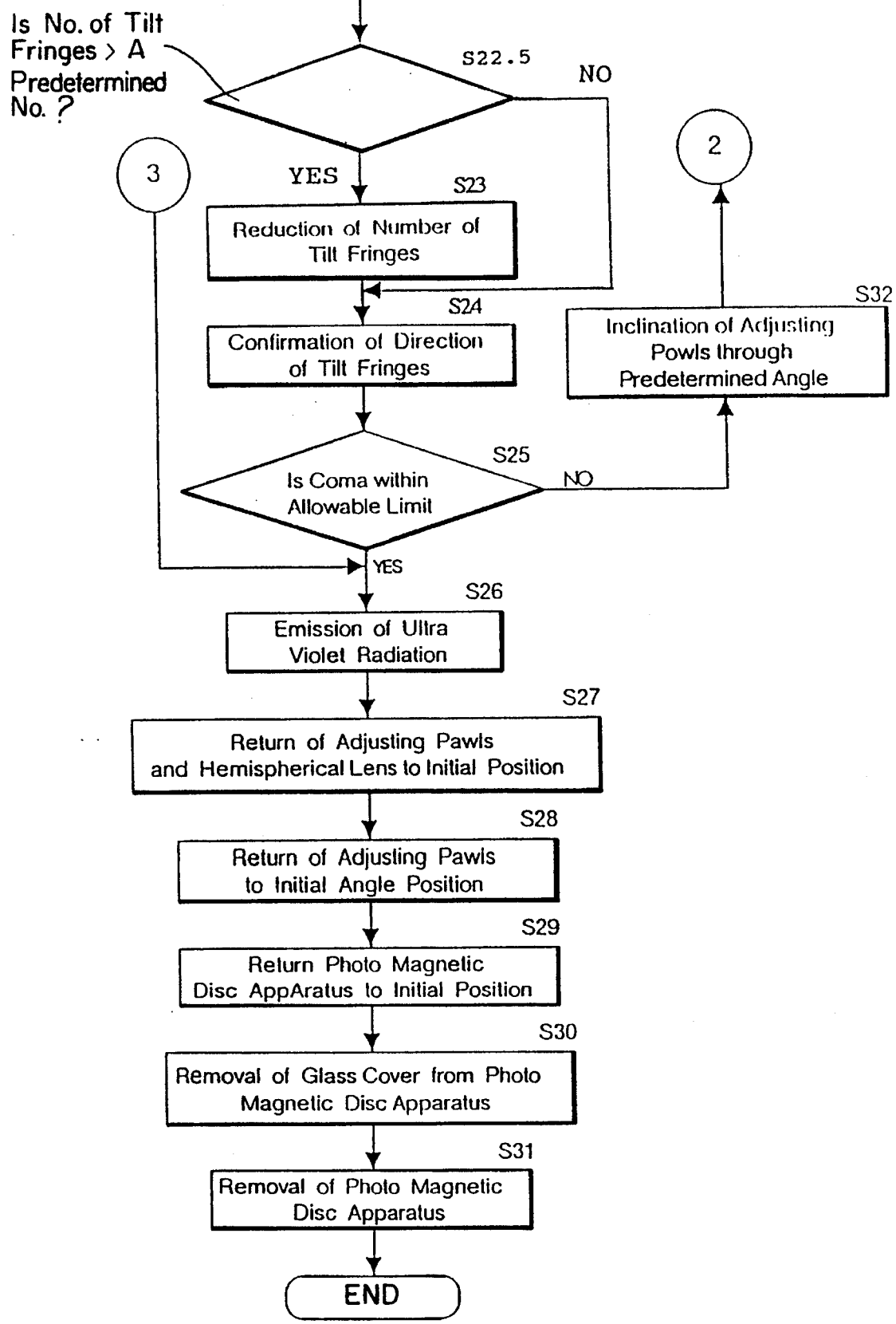

FIGS. 22 and 23 show flow charts of the inclination adjusting operations of the objective lens 150 different from those shown in FIGS. 20 and 21. The operations up to steps S15 are the same as those in FIGS. 20 and 21, and accordingly, no explanation therefor will be given herein below. Accordingly, the following explanation will begin with step S20. Note that in the flow charts shown in FIGS. 22 and 23, although the inclination detecting apparatus 200 of the objective lens shown in FIG. 1, according to the first embodiment mentioned above is used, it goes without saying that the inclination detecting apparatus according to any one of the second through sixth embodiments can be also equally used.

At step S20, the inclination adjusting apparatus 400 is slightly moved downward until the inclination adjusting pawls 401 come into contact with the peripheral edge of the objective lens 150. Thereafter, at step S21, the solenoid coils 163 are activated to bias the lens holder 151 upward. As a result, the upward movement of the lens holder 151 takes place, so that the objective lens 150 is pressed against the adjusting pawls 401. Namely, the objective lens 150 is held between the adjusting pawls 401 and the lens holder 151

(FIG. 27), so that the objective lens 150 can be smoothly displaced on the supporting surface 152 to be inclined at an inclination angle identical to the inclination angle of the adjusting pawls 401. At step S22, the slight upward movement of the inclination adjusting apparatus 400 occurs to move the adjusting pawls 401 away from the objective lens 150.

As a result of the inclination of the objective lens 150 at step S21', the convergence point C2 of the objective lens 150 is displaced, as mentioned above with reference to FIGS. 11, and consequently, an operator may have difficulty in measuring the degree of coma, due to the increase in the number of the tilt fringes of the interference fringes B. To prevent this, at step S22.5, whether or not the there are too many tilt fringes to measure the coma is checked. If the number of the tilt fringes is above a predetermined value, the photo magnetic disc apparatus 100, and accordingly, the objective lens 150 are moved by the operation of the horizontal position adjusting mechanism 505 in the direction to reduce the number of the tilt fringes (step S23), i.e., in the direction opposite to the direction of the inclination of the objective lens obtained at step S21'. Alternatively, it is possible to move the hemispherical lens 202. If the number of the tilt fringes is not above a predetermined value, the operation proceeds directly to step S24.

At step S24, the fine adjustment of the horizontal position adjusting mechanism 505 varies the direction of the tilt fringes of the interference fringes B to find the direction of the maximum coma to check whether or not the coma is still present.

At step S25, the magnitude of the coma is determined, similar to step S15. If the coma is not within a predetermined limit, the control proceeds to step S32 to incline the adjusting pawls 401 by a predetermined angle. The angle by which the adjusting pawls 401 are to be inclined, corresponding to the inclination angle of the objective lens 150, is determined in accordance with the distortion of the interference fringes B measured at step S23. The relationship between the variation of the inclination angle of the objective lens 150 and the variation of the coma (distortion of the interference fringes B) is obtained in advance by experiments or calculation. Namely, one variation of the inclination angle of the objective lens 150 corresponds to one variation of the coma (i.e., 1:1). For example, in case of the objective lens 150 whose NA is 0.55 (NA=0.55), it is necessary to incline the objective lens 150 by about 34' (minutes) in order to vary one interference fringe. This value is arrived at by dividing the magnitude of the curvature or inclination of the interference fringes B by the distance or pitch of the interference fringes B. Note that the calculation of the variation of the inclination angle of the objective lens 150 and the variation of the coma is per se known. Also, note that the direction of the adjusting pawls 401 has been already obtained at step S24.

The following discussion will be addressed to the adjusting operation of the inclination of the adjusting pawls 401 at step S32 in more detail.

The laser beam is emitted from the upper side of the parallel plate 431 (FIG. 27) and a image point of the light reflected therefrom is observed in the monitor (not shown). The image point is displaced in the monitor in accordance with the inclination angle of the adjusting pawls. The reference mark provided in the monitor is adapted to detect or measure the displacement of the image point, i.e., the inclination angle of the adjusting pawls 401. Namely, the inclination of the adjusting pawls 401 is carried out by rotating the rotatable member 410 which is in turn rotated by the rotation of the microadjusters 421, while observing the image point in the monitor.

The inclination angle of the adjusting pawls 401 can be detected by a special angle detector which is additionally provided, instead of the measurement of the image point of the light reflected from the parallel plate 431.

After the operation at step S32 is completed, the control is returned to step S20 in which the adjusting pawls 401 are brought into contact again with the objective lens 150, and then, the lens holder 151 is biased upward at step S21. Consequently, the objective lens 150 is held between the adjusting pawls 401 and the lens holder 151, and is displaced along the supporting surface 152 of the lens holder 151 to be inclined at an inclination angle identical to that of the adjusting pawls 401. As a result of the inclination of the objective lens 150, the image point of the light reflected from the spherical surface portion 202b of the hemispherical lens 202 is displaced in the monitor of the alignment detector 215 (FIG. 1). Also, in the monitor of the interference fringe viewing portion 205, the number of the tilt fringes of the interference fringes B is increased owing to the occurrence of the deviation $\epsilon$ of the image point (FIG. 11). If there are too many tilt fringes to measure the coma, the control proceeds to step S23 to reduce the number of the tilt fringes, and thereafter, whether or not the coma is within the allowable limit is checked at step S25. If the displacement of the image point caused by the change of the inclination angle of the objective lens 150 at step S21 is small in the monitor of the alignment detector 215, it is possible to measure the displacement of the image point in the monitor of the image point viewing portion 214.

If the coma is within the allowable limit, the control proceeds to step S26 where the peripheral edge of the objective lens 150 is illuminated with the ultra violet radiation through the parallel plate 431 to set the adhesive G. Consequently, the objective lens 150 is secured to the supporting surface 152 of the lens holder 151.

Thereafter, at step S27, the inclination adjusting apparatus 400 and the hemispherical lens holder 404 are moved upward to retract the adjusting pawls 401 from the objective lens 150. Namely, the inclination adjusting apparatus 400 is returned to the initial position as shown in FIG. 26. Thereafter, at step S28, the adjusting pawls 401 are returned to the initial position (horizontal position) by rotating the four microadjusters 421. During the return operation, the adjustment is effected such that the image point of the light reflected from the parallel plate 431 comes to a predetermined position in the monitor. Thereafter, at step S29, the photo magnetic disc apparatus 100 is returned to the initial position, i.e., the first stage ST1. At step S30, the insertion member 330, i.e., the glass cover "A" and the insertion prism 201 are removed from the photo magnetic disc apparatus 100. Thereafter, at step S31, the photo magnetic disc apparatus 100 is removed from the optical disc apparatus mounting apparatus 500. Thus, the adjustment of the inclination of the objective lens 150 of the photo magnetic disc apparatus 100 is completed.

As can be understood from the foregoing, according to the inclination adjusting method as shown in FIGS. 22 and 23, the inclination angle of the objective lens 150 is determined in accordance with the distortion of the interference fringes B to incline the objective lens 150 by the inclination angle thus determined, without changing the inclination angle of the adjusting pawls 401 while observing the distortion of the interference fringes B. The inclination angle can be detected by the displacement of the image point in the monitor. In the case that the inclination of the objective lens 150 which is made of a single glass mold lens with opposite aspheric lens surfaces as used in the illustrated embodiments is adjusted by an inclined supporting surface, the deviation ε of the image point corresponding to the value of the inclination to be adjusted to eliminate the coma is large, thus resulting in an increased displacement of the image point in the monitor. Namely, there is a relatively large displacement of the image point with respect to the magnitude of the coma to be eliminated, so that the adjustment of the inclination angle can be easily effected.

In this embodiment, the objective lens 150 is held between the lens holder 151 which is biased towards the adjusting pawls 401 whose inclination angle has been adjusted and the adjusting pawls 401, so that the objective lens 150 is rotated and displaced on the supporting surface 152 of the lens holder 151. Accordingly, the objective lens 150 can be smoothly inclined in accordance with the inclination of the adjusting pawls 401, against the spring 154 provided between the lens holder 151 and the securing member 155.

The inclination adjusting apparatus and method according to the present invention are not limited to those for the photo magnetic disc apparatus and can be applied to adjust the inclination of a lens in other optical instruments.

As can be seen from the foregoing, according to the lens inclination detecting apparatuses of the above first, second, forth, fifth, and sixth embodiments of the present invention, the coherent light which is emitted from the semi-conductor laser beam source 101 and transmitted through the objective lens 150 and the cover glass "A" can be introduced, at a point far from the objective lens 150 within the optical system of the optical data recording and reproducing apparatus 100, to the optical system of the lens inclination detecting apparatus 200 by reflecting the coherent light at the hemispherical lens 202 or the concave mirror 240 to return the same to the optical system of the optical data recording and reproducing apparatus.

Moreover, according to the lens inclination detecting apparatus of the third embodiment of the present invention, the coherent light which is emitted from the He-Ne laser beam source 230 and transmitted through the objective lens 150 and the cover glass "A" can be introduced, at point far from the objective lens 150 within the optical system of the optical data recording and reproducing apparatus 100, to the optical system of the lens inclination detecting apparatus 200 by reflecting the coherent light at the hemispherical lens 202 to return the same to the optical system of the optical data recording and reproducing apparatus.

In the lens inclination detecting apparatus 200, as is above explained, the cover glass "A" and the hemispherical lens 202 (or the concave mirror 240), both of which can be made small in size, are placed opposite the objective lens 150, while an interference fringe optical system including the interference fringe observing portion 205 is located far from the position opposite to the objective lens 150. This arrangement results in a large space opposite the objective lens 150 outside of the optical data recording and reproducing apparatus 150. Accordingly, the inclination adjusting apparatus 400 can be positioned in the large space. Furthermore, the inclination of the objective lens 150 can be adjusted from a position at which the optical magnetic disc K is normally placed when the optical recording and reproducing apparatus 100 is used. In this adjustment operation, the adjusting pawls 401 of the inclination adjusting apparatus 400 are inserted between the cover glass "A" and the objective lens 150. As a result, adjustment of the inclination of the objective lens 150 can be effectively carried out while observing interference fringes.

The elimination of coma by the adjustment of the inclination of the objective lens 150 will be discussed below, with reference to simulation results.

Figure 35:
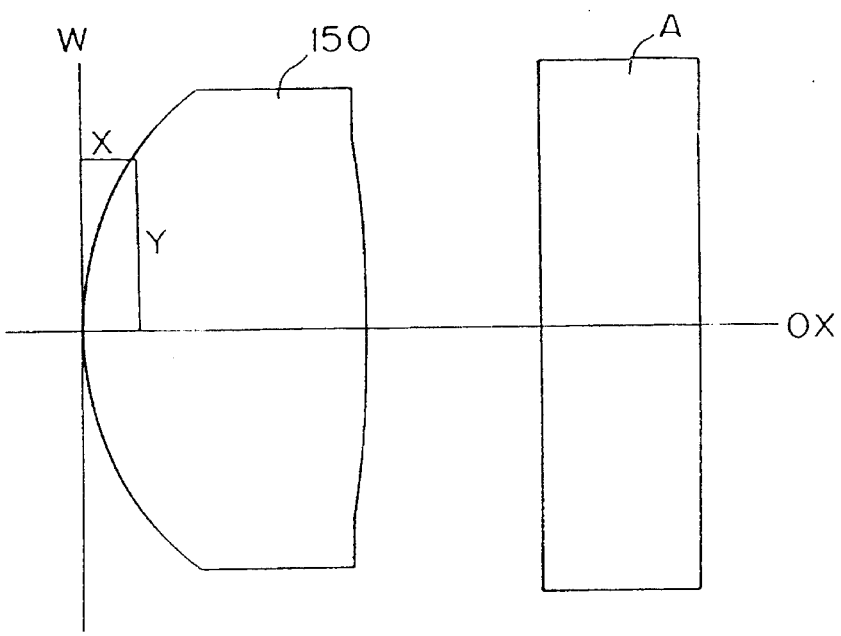
FIG. 35 is a schematic view of an objective lens and glass cover used in a simulation.

FIG. 35 shows the shape of the objective lens 150 which is in the form of a single lens having opposite aspheric surfaces and the glass cover "A" used in the simulations.

Numerical data of the objective lens 150 used in the simulations is as follows:

NA (numerical aperture)=0.55; focal length=3.3 mm; ω (angle of view)=1.7°; paraxial radius of curvature of the first lens surface=2.124 mm; paraxial radius of curvature of the second lens surface=−6.837 mm; lens thickness=2.180 mm; and, refractive index=1.53677.

Data for the glass cover "A" used in the simulation is as follows:

thickness=1.200 mm and refractive index=1.57346.

Figure 36:
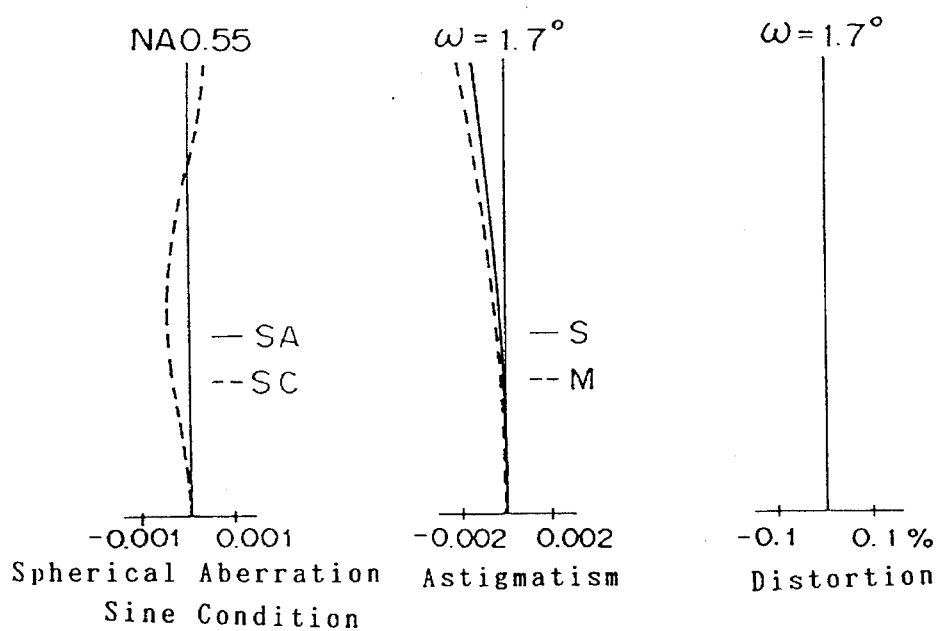
FIG. 36 shows diagrams of optical characteristics of an objective lens shown in FIG. 35.

The aspheric surface of the objective lens 150 is defined by the following equation:

$$X=C \times Y^2/(1+(1-(1+K)\times C^2\times Y^2)^{1/2})+A_4\times Y^4+A_6\times Y^6+A_8\times Y^8\times A_{10}\times Y^{10}$$

wherein "X" designates the distance from the tangential plane W; "Y" the distance from the optical axis OX; and, "C" the curvature of the aspherical apex; respectively. The constant of cone K and the constants of the aspheric surface $A_4$, $A_6$, $A_8$, and $A_{10}$ are as follows;

for the first lens surface, $K=-0.4377$; $A_4=-0.7167\times10^{-3}$; $A_6=-0.6080\times10^{-4}$; $A_8=-0.1060\times10^{-4}$; and, $A_{10}=-0.2730\times10^{-5}$ and for the second lens surface, $K=0.0000$; $A_4=0.1665\times10^{-1}$; $A_6=-0.3180\times10^{-2}$; $A_8=0.5060\times10^{-3}$; and, $A_{10}=-0.3960\times10^{-4}$ FIG. 36 shows the optical characteristics of the objective lens 150, i.e., the spherical aberration, the sine condition, and the astigmatism. As can be seen from FIG. 36, the objective lens 150 has the corrected sine condition, etc., and accordingly has little or no aberration.

Figure 37:
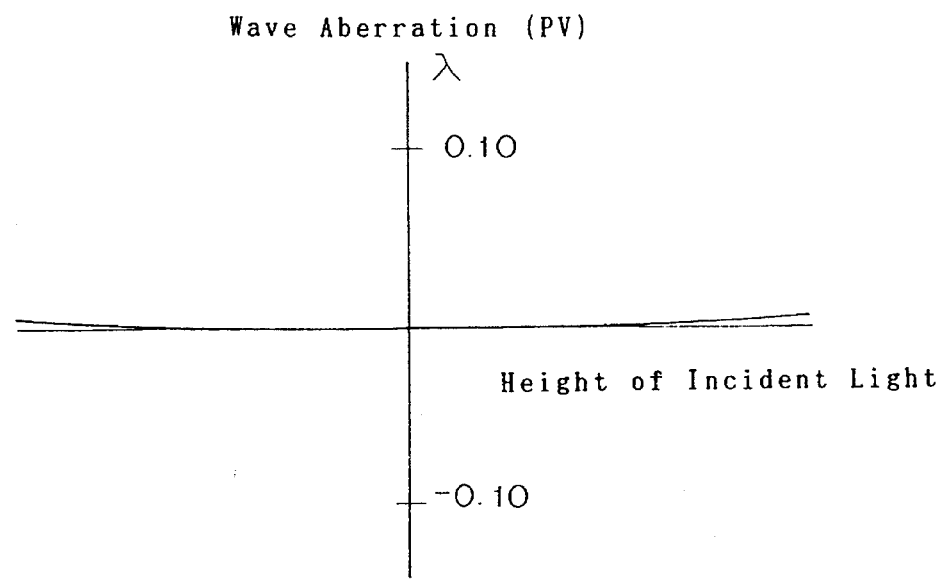
FIG. 37 is a diagram of a wavefront aberration on an optical axis, that is represented by the PV value when there is no inclination of an objective lens with respect to a glass cover.

FIG. 37 shows the wave aberration on the optical axis, that is represented by PV value (difference between the maximum value and the minimum value) when the inclination of the objective lens 150 with respect to the glass cover "A" is zero.

Figure 38:
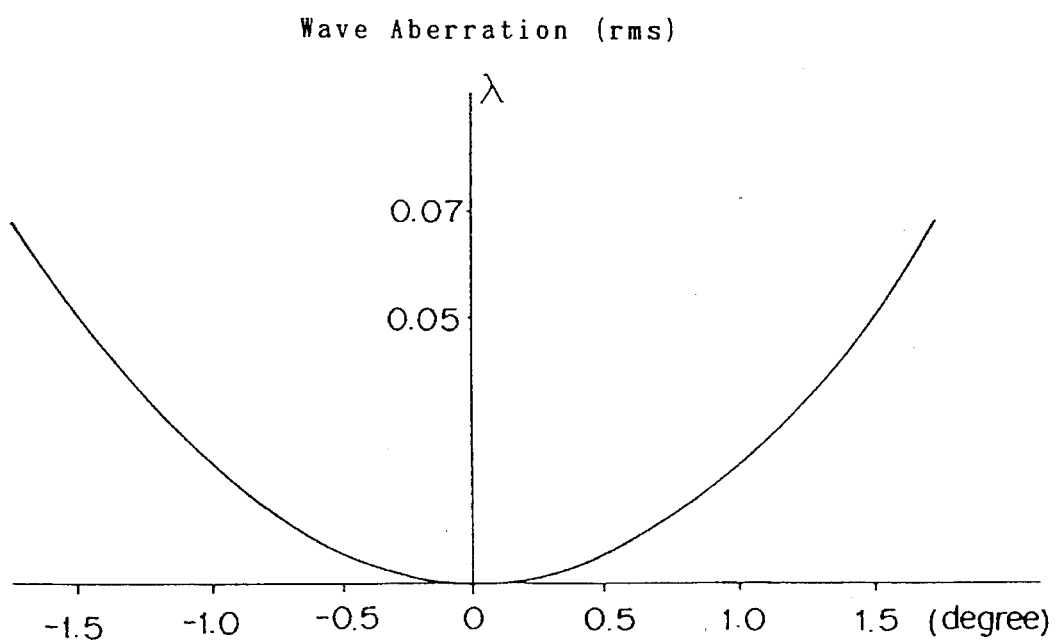
FIG. 38 is a diagram of a wavefront aberration that is varied by the change in the angle of incident light with respect to the optical axis when there is no inclination of an objective lens with respect to a glass cover.

FIG. 38 shows the variation of the wave aberration which is represented by rms (root mean square) when the inclination of incident light with respect to the optical axis changes. As can be seen in FIGS. 37 and 38, the objective lens 150 is an aplanatic lens having a corrected sine condition. If the incident light is inclined at about 1.5 degrees with respect to the optical axis, the wave aberration is smaller than ¼ of λ.

Figure 39:
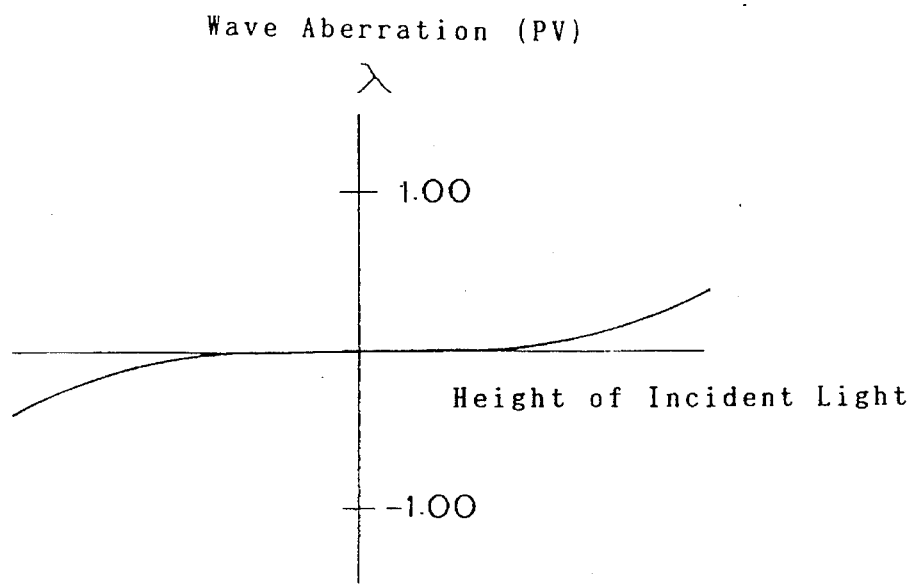
FIG. 39 is a diagram similar to FIG. 37, when a first lens surface of an objective lens is decentered from the optical axis.
Figure 40:
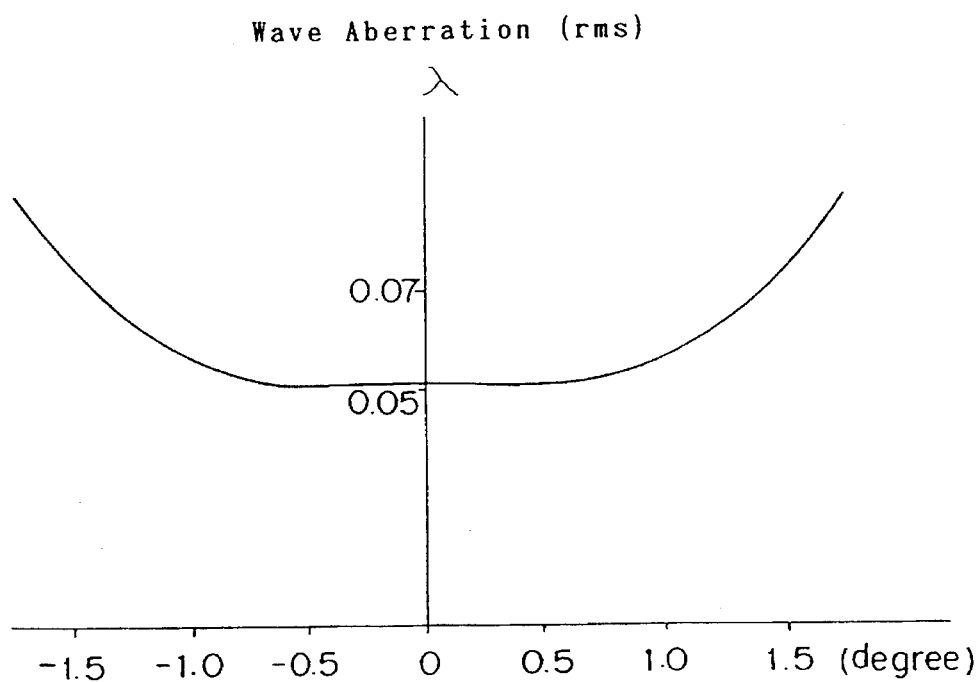
FIG. 40 is a diagram similar to FIG. 38, when a first lens surface of an objective lens is decentered from the optical axis.

FIGS. 39 and 40 show the wave aberration when there is a manufacturing error in the objective lens 150, i.e., when the first lens surface thereof is decentered from the optical axis by 10 μm in the vertical direction. FIGS. 39 and 40 correspond to FIGS. 37 and 38, respectively. Namely, in FIGS. 39 and 40, the wave aberration is represented by PV value and rms, respectively. As may be seen in FIGS. 39 and 40, the manufacturing error of the objective lens 150 has a considerable influence on the wave aberration. In FIG. 39, the wave aberration is 0.9 λ (PV value).

Figure 41:
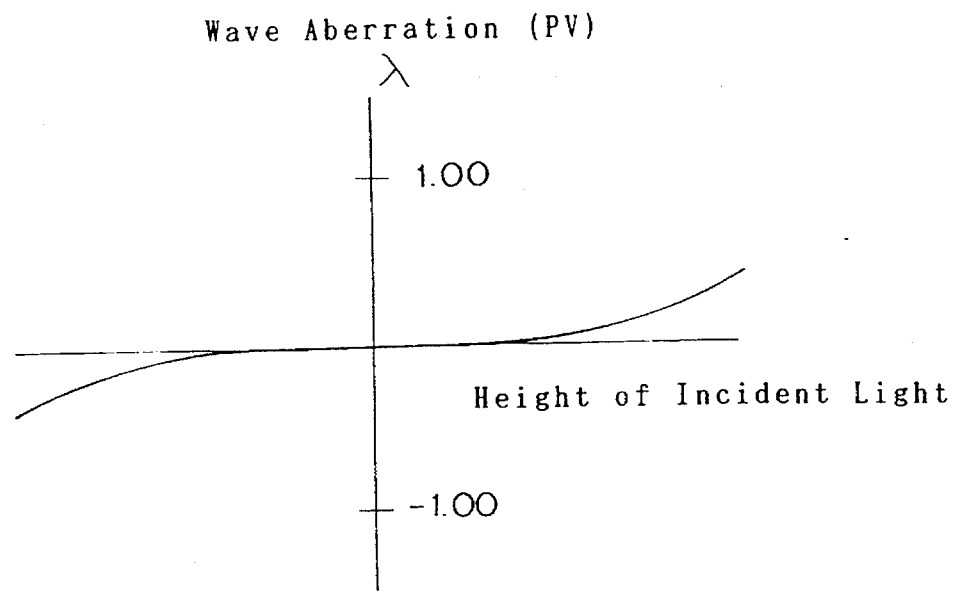
FIG. 41 is a diagram similar to FIG. 37, when a first lens surface of an objective lens is inclined.
Figure 42:
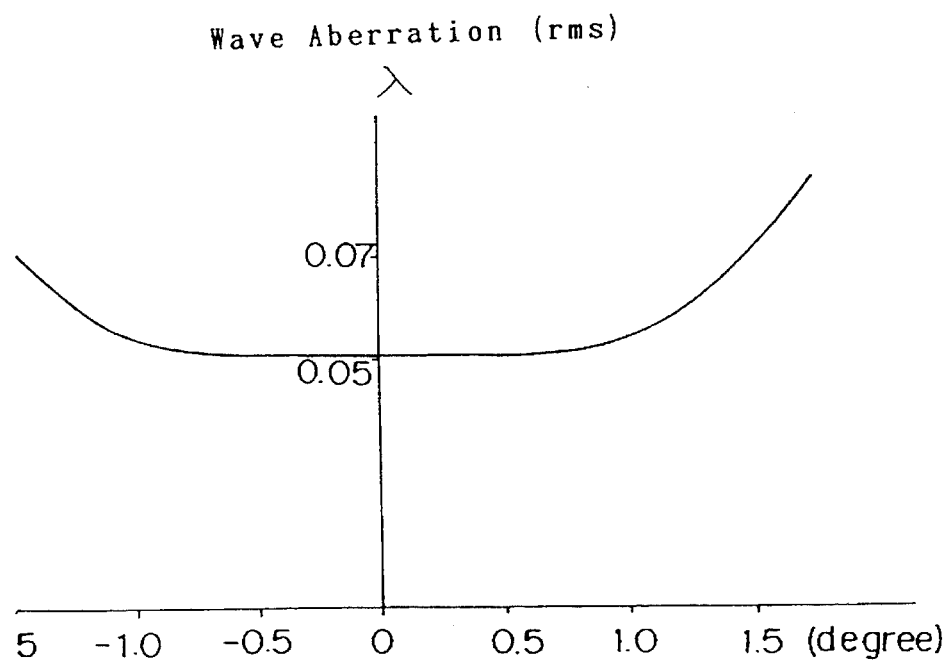
FIG. 42 is a diagram similar to FIG. 38, when a first lens surface of an objective lens is inclined.

FIGS. 41 and 42 show the wave aberration when the first lens surface is inclined at 4 minutes, as a manufacturing error of the objective lens 150. In FIGS. 41 and 42, the wave aberration is represented by PV value and rms, respectively. As may be seen in FIGS. 41 and 42, if the first lens surface of the objective lens 150 is inclined, there is a large wave aberration, similar to the case where the first lens surface is decentered. The tendency of the wave aberration in FIGS. 41 and 42 is similar to that in FIGS. 39 and 40. Such a tendency occurs in a lens having a corrected sine condition.

Figure 43:
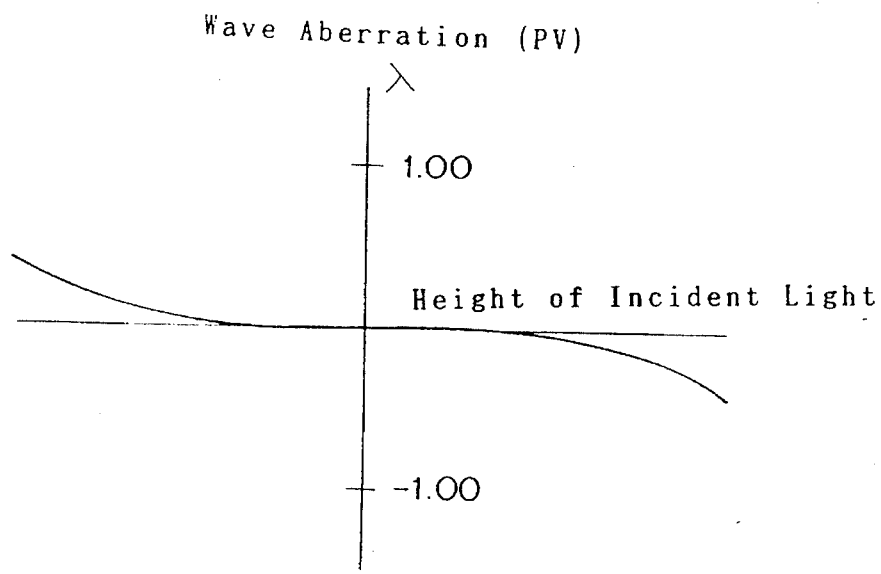
FIG. 43 is a diagram similar to FIG. 37, when an objective lens is inclined at 25 minutes (') with respect to a glass cover.
Figure 44:
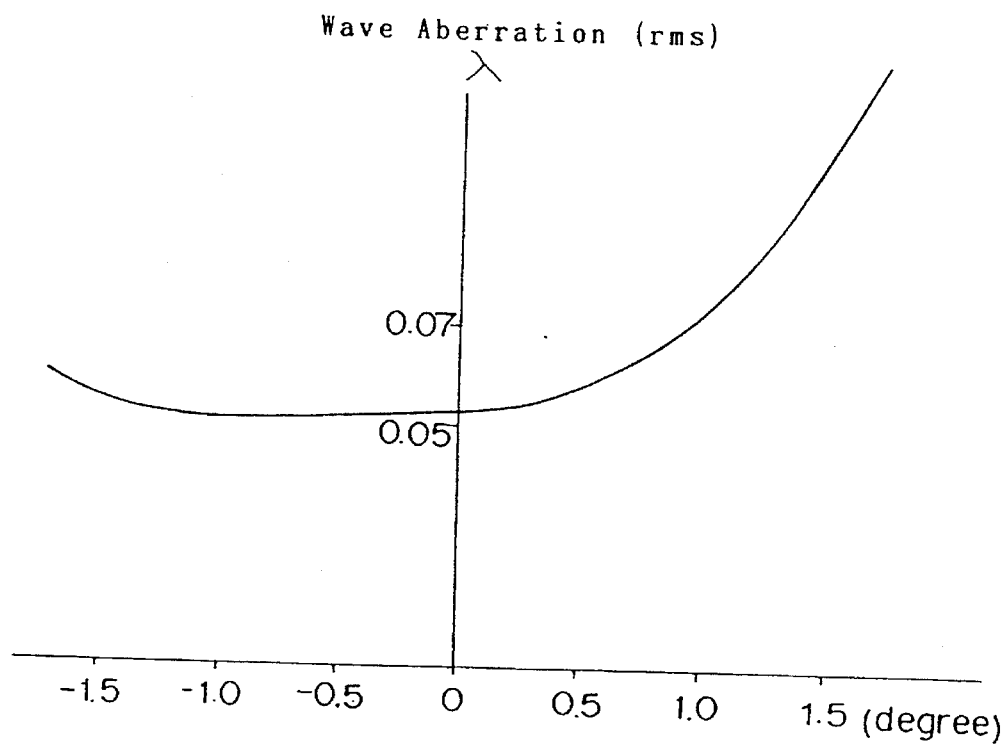
FIG. 44 is a diagram similar to FIG. 38, when an objective lens is inclined at 25 minutes (') with respect to a glass cover.

FIGS. 43 and 44 show the wave aberration when the objective lens 15 fails to be located at a correct position. Namely, the objective lens 150 is inclined at an angle of 25 minutes with respect to the glass cover "A". In FIGS. 43 and 44, the wave aberration is represented by PV value and rms, respectively. As can be seen in FIG. 43, a coma occurs when the objective lens 150 is inclined with respect to the glass cover "A". The wave aberration in FIG. 43 is identical in magnitude to that in FIG. 39 or 41 and is symmetrical with respect to the optical axis. Moreover, since the incident light upon the objective lens 150 is inclined with respect thereto, the wave aberration by rms value with respect to the incident angle is not symmetrical with respect to the optical axis, as shown in FIG. 44.

Figure 45:
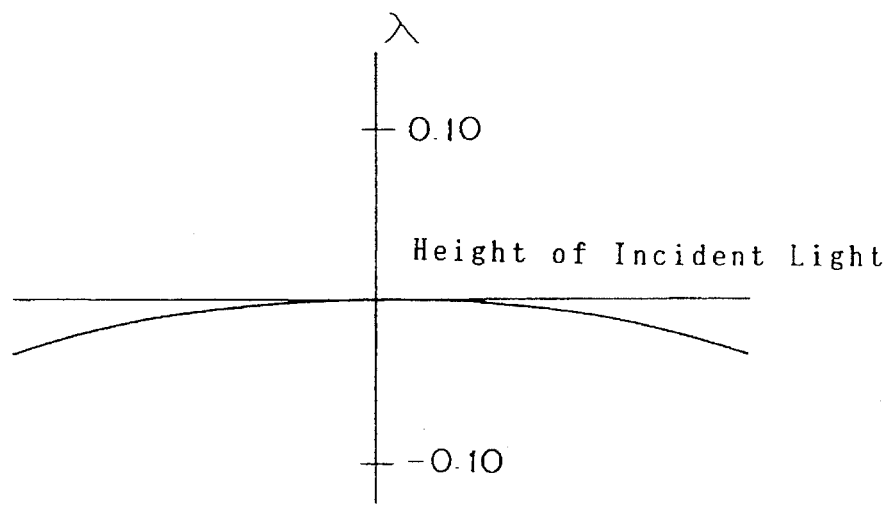
FIG. 45 is a diagram similar to FIG. 37, when an objective lens is inclined with respect to a glass cover to compensate a wavefront aberration which is caused when a first lens surface of an objective lens is decentered from the optical axis; and, FIG. 46 is a diagram similar to FIG. 38, when an objective lens is inclined with respect to a glass cover to compensate a wavefront aberration which is caused when a first lens surface of an objective lens is decentered from the optical axis.
Figure 46:
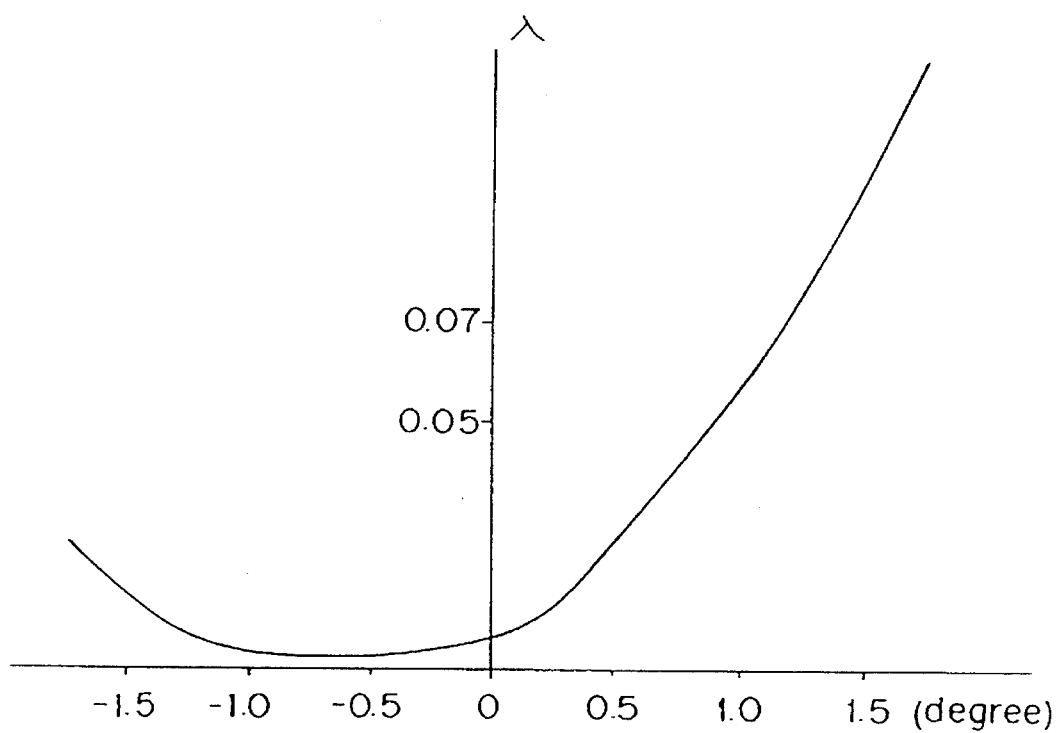

FIGS. 45 and 46 show the wave aberration which is caused when the first lens surface of the objective lens 150 is decentered by 10 μm from the optical axis in the vertical direction and which is corrected by inclining the objective lens 150 at an angle of 24.6 minutes with respect to the glass cover "A". In FIGS. 45 and 46, the wave aberration is represented by PV value and rms, respectively. As can be seen in FIGS. 45 and 46, the wave aberration due to the manufacturing error (assembly error) of the objective lens 150 can be substantially eliminated by inclining the objective lens 150 with respect to the glass cover. In FIG. 45, although a slight wave aberration remains, since the slight wave aberration arises mainly due to the defocus (out of focus) component, substantially no deterioration of the image occurs.

In FIG. 46, the minimum wave aberration occurs approximately at −0.5 degrees, and the wave aberration by rms is asymmetric with respect to the ordinate. This is because the light incident upon the objective lens 150 is inclined relative to the optical axis by the inclination of the objective lens 150. In the adjustment to eliminate the wave aberration, since the adjustment is effected such that the wave aberration on the optical axis is reduced to be a predetermined value, there is no problem with the asymmetrical wave aberration with respect to the ordinate.

It can be understood from the simulations mentioned above that the wave aberration can be varied by the inclination of the objective lens 150 with respect to the glass cover "A" (FIGS. 43 and 44). Therefore, even if there is a wave aberration caused by the first lens surface of the objective lens 150 decentered from the optical axis due to a manufacturing error as seen in FIGS. 39 and 40, the wave aberration can be eliminated by inclining the objective lens 150 (FIGS. 45 and 46).

If the first lens surface is inclined by the manufacturing error (FIGS. 41 and 42), the wave aberration due to the inclination of the first lens surface can be compensated by varying the inclination of the objective lens 150. The same would be true for the second lens surface of the objective lens 150. Furthermore, a wave aberration caused by a manufacturing error of an optical element (for example, collimating lens) other than the objective lens 150 or by a positioning error of any optical elements, etc., can also be corrected.

Namely, the coma (wave aberration) which is produced in the optical system can be cancelled by the coma (wave aberration) that is identical in magnitude and opposite in direction to the first-mentioned coma and that is positively produced in the optical system by the adjustment of the relative inclination of the objective lens and the glass cover.

Consequently, the wave aberration (coma) produced in the optical system can be eliminated merely by adjusting the inclination angle of the objective lens which is located at the terminal stage of the optical system 150 without increasing the tolerance of the optical elements of the optical system. Furthermore, since it is only necessary to adjust the inclination angle of the objective lens in order to eliminate the aberration, the assembling operation and the adjusting operation of the optical system are simplified and require less time.

As can be understood from the above discussion, according to the present invention, not only can the adjustment of the inclination of the objective lens with respect to the recording medium be performed from the side of the objective lens opposite to the recording medium, but also there is no restriction to the mounting mechanism of the objective lens. Moreover, in the supporting apparatus of the objective lens according to the present invention, the number of the elements of the optical pick-up can be reduced, thus resulting in a light-weight pick-up and a fast tracking operation.

In the optical data recording and reproducing apparatus of the present invention, the fine adjustment of the objective lens relative to the recording medium can be executed to eliminate the tracking error and focusing error which would be otherwise caused upon recording and reproducing data on and from the recording medium. Namely, the supporting member (lens holder) of the objective lens is elastically connected to the securing member through an elastic means, such as a spring. Accordingly, the objective lens is slightly displaceable through the elastic deformation of the elastic means, for example, when the electromagnetic force is applied. In the optical data recording and reproducing apparatus, if the objective lens is disposed on the movable lens holder and is engaged at the upper surface thereof by the adjusting member to adjust the inclination of the objective lens with respect to the lens holder, it is impossible to smoothly move the objective lens with respect to the lens holder since the lens holder is displaced by the deformation of the spring which is caused when the lens holder is pressed. However, in the positioning apparatus of the present invention, the inclination of the objective lens can be easily and smoothly adjusted with respect to the lens holder.

Furthermore, in the adjusting method to correct the coma according to the present invention, not only can the optical elements having less manufacturing accuracy than the prior art be used, but also the assembling operation of the optical elements can be simplified.

Although the invention has been described with reference to particular means, materials and embodiments, it is to be understood that the invention is not limited to the particulars disclosed and extends to all equivalents within the scope of the claims.

We claim:

1. A detecting apparatus for detecting an inclination of an objective lens relative to a reference surface, said objective lens being part of an optical data recording and reproducing apparatus in which data is optically recorded on and reproduced from a recording medium which is placed parallel to said reference surface, comprising;

a transparent parallel plate which is opposite said objective lens, parallel to said reference surface, and made of a material that is substantially optically equivalent to a transparent material of said recording medium;

reflecting means for reflecting a coherent light which has passed through said objective lens and said transparent parallel plate back towards said transparent parallel plate and said objective lens;

beam splitting means for splitting said coherent light into a first beam and a second beam;

wavefront rotating means for rotating said first beam and said second beam about an optical axis in a manner such that said first beam and said second beam are rotated through 180 degrees with respect to one another; and, means for superposing said first beam and said second beam to produce an optical interference.

2. The detecting apparatus of claim 1, wherein said reflecting means, said beam splitting means, said wavefront rotating means, and said superposing means comprise a single hemispherical lens positioned adjacent to said transparent parallel plate on the opposite side of said objective lens.

3. The detecting apparatus of claim 2, wherein said hemispherical lens comprises a flat reflecting surface and a spherical reflecting surface whose center of curvature is located on said flat reflecting surface, and wherein said hemispherical lens splits said coherent light by reflecting segments of said coherent light at said flat reflecting surface and said spherical reflecting surface, thereby creating said first beam and said second beam, respectively.

4. The detecting apparatus of claim 3, further comprising:

an interference fringe observing portion for observing interference fringes which are produced by said superposing means, and a prism for introducing said first beam and said second beam, which have been reflected by said hemispherical lens toward said objective lens and superposed with each other by said hemispherical lens, to said interference fringe observing portion from an optical path of an optical system of said optical data recording and reproducing apparatus, wherein said prism is an insertion prism which is inserted into said optical path so as to split said first and said second beams from said optical path.

5. The detecting apparatus of claim 3, further comprising:

an interference fringe observing portion for observing interference fringes which are produced by said superposing means, and a beam splitter for introducing said first beam and said second beam, which have been reflected by said hemispherical lens toward said objective lens and superposed with each other by said hemispherical lens, to said interference fringe observing portion from an optical path of an optical system of said optical data recording and reproducing apparatus, wherein said beam splitter introduces said first and second beams, which have been split from said optical path to be emitted to the outside of said optical data recording and reproducing apparatus, to said interference fringe observing portion.

6. The detecting apparatus of claim 3, wherein said recording medium is a photo magnetic disc, and wherein said flat reflecting surface corresponds to a data recording surface of said photo magnetic disc, and further wherein said objective lens is adjusted in a manner such that a converging point of said objective lens is coincident with said center of curvature of said spherical reflecting surface.

7. The detecting apparatus of claim 3, further comprising:

an alignment detector for detecting a positional relationship between a convergence point of light converged by said objective lens and said flat reflecting surface.

8. The detecting apparatus of claim 7, wherein said coherent light reflected by said reflecting means and transmitted through a signal detecting system of said optical data recording and reproducing apparatus is introduced to said alignment detector from said optical data recording and reproducing apparatus.

9. The detecting apparatus of claim 8, further comprising:

an image point observing portion for observing a coma component contained in said coherent light reflected by said reflecting means, wherein said coherent light reflected by said reflecting means and transmitted through said signal detecting system is introduced into said alignment detector.

10. The detecting apparatus of claim 1, wherein said reflecting means is a concave mirror for reflecting said coherent light back towards said transparent parallel plate.

11. The detecting apparatus of claim 10, wherein said beam splitting means is a half mirror for splitting coherent light, which has been reflected by said reflecting means and has passed through said objective lens and said transparent parallel plate twice, into said first beam and said second beam.

12. The detecting apparatus of claim 11, wherein said wavefront rotating means comprises two Dove prisms positioned in such a manner that, when said first beam and said second beam split by said half mirror pass through said two Dove prisms, said beams are rotated through 180 degrees with respect to one another.

13. The detecting apparatus of claim 11, wherein said wavefront rotating means includes a corner-cube prism for rotating a wavefront of one of said first beam or of said second beam about said optical axis by 180 degrees.

14. The detecting apparatus of claim 11, wherein said wavefront rotating means includes a condenser lens and a reflecting mirror for rotating said first beam or said second beam about said optical axis by 180 degrees, wherein said reflecting mirror is positioned at a converging point of said condenser lens.

15. The detecting apparatus of claim 1, further comprising:

an interference fringe observing portion for observing interference fringes which are produced by said superposing means.

16. The detecting apparatus of claim 15, wherein said coherent light, which has passed through said superposing means said optical system of said optical data recording and reproducing apparatus, and has proceeded outside of said optical data recording and reproducing apparatus, is introduced to said interference fringe observing portion.

17. The detecting apparatus of claim 15, wherein said optical data recording and reproducing apparatus includes a semiconductor laser light source which emits said coherent light.

18. The detecting apparatus of claim 17, wherein said detecting apparatus further includes a He-Ne lapser source for introducing a visible light portion of a spectrum of said coherent light to said objective lens.

19. The detecting apparatus of claim 17, further comprising means for introducing said coherent light emitted by said semiconductor laser light source into said objective lens, for reflecting said coherent light by a half-mirror within an optical path of an optical system of said optical data recording and reproducing apparatus, said coherent light having been reflected by said reflecting means and having twice passed through said objective lens and said transparent parallel plate, and for introducing said coherent light reflected by said half-mirror into said interference fringe observing portion.

20. The detecting apparatus of claim 19, wherein said second beam splitting means is a prism, which is positioned within a parallel bundle of rays of said optical system, for preventing said coherent light from returning to said semiconductor laser light source.

21. The detecting apparatus of claim 19, wherein said second beam splitting means comprises a wave plate for enabling selecting a polarization direction of said coherent light emitted from said semiconductor laser light source.

22. A lens supporting apparatus which supports an objective lens of an optical data recording and reproducing apparatus in which data is optically recorded on and reproduced from a recording medium, which is placed parallel to a reference surface, comprising:

an oblique annular lens supporting surface inclined relative to a peripheral edge of said objective lens for supporting said objective lens in a manner such that an inclination of said objective lens can be adjusted with respect to said reference surface;

means for moving said lens supporting surface to bring a peripheral edge of said objective lens into contact with an adjusting device to thereby move said objective lens along said lens supporting surface in order to vary an inclination of said objective lens relative to said reference surface.

23. The lens supporting apparatus of claim 22, further comprising:

a lens supporting member connected to a securing portion of said optical data recording and reproducing apparatus, said lens supporting surface formed on said lens supporting member.

24. The lens supporting apparatus of claim 23, said moving means comprises a solenoid coil provided on said lens supporting member, and a magnet provided on said securing portion, and wherein said lens supporting member is moved by energizing said solenoid coil.

25. The lens supporting apparatus of claim 23, wherein said objective lens is provided on a peripheral edge thereof with a flange supported by said lens supporting surface.

26. The lens supporting apparatus of claim 25, wherein said peripheral edge of said objective lens is integrally provided with a plurality of cylindrical portions extending parallel to said optical axis, said cylindrical portions being supported at one of ends thereof by said lens supporting surface.

27. The lens supporting apparatus of claim 26, wherein a rotational center of said objective lens with respect to said lens supporting surface is positioned by said plurality of said cylindrical portions to make said rotational center substantially coincident with a rear principal point of said objective lens.

28. The lens supporting apparatus of claim 22, wherein said lens supporting surface is tapered in a direction away from a position at which said recording medium is placed.

29. The lens supporting apparatus of claim 22, wherein said lens supporting surface is tapered in a direction towards a position at which said recording medium is placed, and wherein said tapered lens supporting surface is formed in a manner such that said objective lens can be rotated about a center which is substantially coincident with a rear principal point of said objective lens.

30. The lens supporting apparatus of claim 22, wherein said lens supporting surface is a conical section.

31. The lens supporting apparatus of claim 22, wherein said lens supporting surface is a spherical section.

32. The lens supporting apparatus of claim 22, wherein said objective lens is rotatable about a rotational center thereof, said rotational center being substantially coincident with a rear principal point of said objective lens.

33. A lens supporting apparatus for supporting an objective lens of an optical data recording and reproducing apparatus in which data is optically recorded on and reproduced from a recording medium placed parallel to a reference surface, comprising:

an annular supporting portion for supporting said objective lens;

a supported surface formed on said objective lens and supported on said annular supporting portion in a manner such that said supported surface can be moved on said annular supporting portion to be inclined relative to said reference surface; and means for moving said annular supporting portion to bring a peripheral edge of said objective lens into contact with an adjusting device to thereby move said objective lens along said annular supporting portion in order to vary an inclination of said objective lens relative to said reference surface.

34. An inclination adjusting method for adjusting an inclination, relative to a reference surface, of an objective lens of an optical data recording and reproducing apparatus in which data is optically recorded on and reproduced from a recording medium which is positioned parallel to said reference surface, comprising:

a first step of positioning a lens supporting member which supports said objective lens at a predetermined position;

a second step of placing said objective lens on said lens supporting member;

a third step of adjusting said inclination of said objective lens while observing interference fringes to reduce a coma, said interference fringes being caused by an inclination of said objective lens relative to a transparent plate, said transparent plate being positioned parallel to said reference surface and made of a material that is substantially optically equivalent to said recording medium; and, a fourth step of fixing said objective lens to said lens supporting member.

35. The inclination adjusting method of claim 34, wherein said second step further includes a step of introducing an adhesive, which solidifies when ultraviolet rays are applied thereto, between said objective lens and said lens supporting member, and wherein, in said fourth step, said objective lens is fixed to said lens supporting member by applying ultraviolet rays to said adhesive so as to solidify said adhesive.

36. The adjusting method of claim 34, wherein said lens placing step comprises positioning said objective lens relative to a sucking tube which holds said objective lens by a vacuum force and which places said objective lens on said lens supporting member by releasing the vacuum force.

37. A positioning apparatus which positions a lens relative to a lens supporting member, comprising:

a sucking tube which holds said lens by a vacuum force; and, a guide portion which has a circular hole, an inner surface of said circular hole guiding said lens in a radial direction of said sucking tube so as to position said lens in said radial direction when said sucking tube is inserted into said circular hole, wherein said circular hole is formed in a manner such that a diameter of said circular hole is larger than a diameter of said sucking tube and substantially corresponds to a diameter of said lens.

38. The positioning apparatus of claim 37, wherein said guide portion further includes a tapered portion having a conical shape for introducing said sucking tube into said circular hole, and an adhesive applying member provided in an outer circumferential portion of said guide portion for applying an adhesive to secure said lens, whose position relative to said lens supporting member has been adjusted, to said lens supporting member.

39. The positioning apparatus of claim 38, further comprising a plurality of said adhesive applying member, said plurality of said adhesive applying members being provided at equal intervals around a center axis of said guiding portion.

40. An inclination adjusting apparatus, comprising:
a body;
an oblique annular lens supporting surface which is inclined relative to a peripheral edge of an objective lens and which supports said objective lens in a manner such that said objective lens can be inclined with respect to said lens supporting surface;
a rotational portion which is rotatably supported by said body in a manner such that a rotational center of said rotational portion is positioned in the vicinity of a rotational center of said lens when said lens is inclined with respect to said lens supporting surface; and
an adjusting pawl which is supported by said rotational portion for engaging with a peripheral edge of said lens;
wherein said rotational portion comprises a rotatable member having a spherical surface to which said adjusting pawl is secured, and a recess having a spherical surface formed in said body to slidably support said rotatable member having a spherical surface.

41. The inclination adjusting apparatus of claim 40, wherein said adjusting pawl is provided with a recess with which an upper corner of said peripheral edge of said lens can be engaged.

42. The inclination adjusting apparatus of claim 40, wherein said rotational portion comprises a passage formed on said recess having a spherical surface; a pressed member which passes through said passage to be connected to said rotatable member having a spherical surface; and, a microadjuster which abuts against said pressed member in a plurality of directions to move said pressed member, wherein said rotatable member having a spherical surface is rotated when said pressed member is moved by operating said microadjuster.

43. The inclination adjusting apparatus of claim 42, wherein a distance between a rotational center of said rotatable member having a spherical surface and a contacting portion of said microadjuster which abuts against said pressed member is set larger than a distance between a peripheral edge of said lens and a rotational center of said lens.

44. The inclination adjusting apparatus of claim 40, wherein said rotational portion comprises a passage formed on said recess having a spherical surface, and a rod which passes through said passage and is connected to said rotatable member having a spherical surface, and wherein said rotatable member having a spherical surface is rotated by moving said rod.

45. The inclination adjusting apparatus of claim 40, further comprising a detecting means for detecting state in which said adjusting pawl is located at a reference position.

46. The inclination adjusting apparatus of claim 45, wherein said detecting means comprises a transparent glass sheet that is parallel with a reference plate of said adjusting pawl, and wherein said adjusting pawl is initially positioned with respect to said lens based upon a bundle of rays reflected on said transparent glass sheet.

47. An inclination adjusting method for adjusting an inclination of a lens which is supported on an oblique annular lens supporting surface that is inclined relative to a peripheral edge of said lens, wherein said lens is positioned by an inclination adjusting member on said oblique annular lens supporting surface to incline said lens at a predetermined angle, comprising:
determining an angle at which said lens is to be inclined;
inclining said inclination adjusting member at said angle;
contacting said inclination adjusting member with said lens; and
displacing said oblique annular lens supporting surface in a direction toward said inclination adjusting member to abut said lens against said inclination adjusting member.

48. An inclination adjusting apparatus which adjusts an inclination of a lens, comprising:
a lens supporting member having an oblique annular supporting surface which supports said lens in a manner such that said lens can be inclined with respect to said supporting surface;
an inclination adjusting member which comes into contact with a surface of said lens, the surface being located opposite to said lens supporting member;
alignment detector for defining an inclination of said inclination adjusting member; and,
biasing means for biasing said lens supporting member towards said inclination adjusting member while bringing a part of said inclination adjusting member into contact with said lens to thereby abut said lens against said inclination adjusting member.

49. The inclination adjusting apparatus of claim 48, wherein said lens supporting member is connected to a securing portion of an optical data recording and reproducing apparatus through a biasing means in a manner such that said lens supporting member can be moved with respect to said securing portion.

50. The inclination adjusting apparatus of claim 49, wherein said biasing means comprises a solenoid coil provided on said lens supporting member, and a magnet provided on said securing portion, so that when said solenoid coil is energized, said lens supporting member is moved to incline said lens to thereby abut said lens against said inclination adjusting member.

* * * * *

UNITED STATES PATENT AND TRADEMARK OFFICE
CERTIFICATE OF CORRECTION

PATENT NO. : 5,553,052
DATED : September 3, 1996
INVENTOR(S) : M. OONO et al.

It is certified that error appears in the above-indentified patent and that said Letters Patent is hereby corrected as shown below:

On cover page, in item [22], change "Aug. 2, 1994" to
---Mar. 2, 1994---.

At column 32, line 54 (claim 2, line 18), change "lapser" to ---laser---.

At column 36, line 5 (claim 45, line 2), delete "a" (first occurrence).

At column 36, line 5 (claim 45, line 2), before "state" insert ---a---.

Signed and Sealed this

Twenty-fifth Day of February, 1997

Attest:

BRUCE LEHMAN

*Attesting Officer*     *Commissioner of Patents and Trademarks*